US012724797B2

(12) United States Patent
Tirupati et al.

(10) Patent No.: US 12,724,797 B2
(45) Date of Patent: Sep. 1, 2026

(54) SYSTEMS AND METHODS FOR ORGANIZING AND VISUALIZING RELATED DATA AND WORK DATA RELATIONSHIPS

(71) Applicant: Salesforce, Inc., San Francisco, CA (US)

(72) Inventors: Srinivas Tirupati, Bothell, WA (US); Twisha Shailesh Mehta, Fremont, CA (US); Leo Duy Tran, Piedmont, CA (US); Paul Camille Sigurd Ekeland, Vancouver (CA)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 19/030,356

(22) Filed: Jan. 17, 2025

(65) Prior Publication Data

US 2026/0079966 A1 Mar. 19, 2026

Related U.S. Application Data

(60) Provisional application No. 63/694,889, filed on Sep. 15, 2024, provisional application No. 63/694,888, filed on Sep. 15, 2024.

(51) Int. Cl.
*G06F 16/00* (2019.01)
*G06F 3/0482* (2013.01)
(Continued)

(52) U.S. Cl.
CPC .......... *G06F 16/287* (2019.01); *G06F 3/0482* (2013.01); *G06F 9/451* (2018.02);
(Continued)

(58) Field of Classification Search
CPC ................................ G06F 16/287; G06F 16/28
See application file for complete search history.

(56) References Cited

U.S. PATENT DOCUMENTS 10,152,508 B2 * 12/2018 Weissman ........... G06F 16/2462
11,080,041 B1 * 8/2021 Ah Kun .............. G06F 9/44505
(Continued)

OTHER PUBLICATIONS

Tirupati Ex-Parte Quayle Office Action, U.S. Appl. No. 19/030,948, May 20, 2026, 8 pgs.

*Primary Examiner* — Cheryl Lewis
(74) *Attorney, Agent, or Firm* — Morgan, Lewis & Bockius LLP

(57) ABSTRACT

A multi-tenant system receives a request to generate a first workspace according to at least a subset of tenant data stored in a plurality of data spaces. The system determines a collection of components of the first workspace and determines a respective data and/or metadata source for each component of the collection of components. The respective data and/or metadata source corresponds to a data space of the plurality of data spaces. The system receives, via the plurality of data spaces, data and/or metadata for each component of the collection of components and stores the data and/or metadata of the first workspace to each component. The system also stores, in a multi-tenant junction table, relationships between the first workspace, the collection of components of the first workspace, and respective objects from the plurality of data spaces.

20 Claims, 33 Drawing Sheets

(51) Int. Cl.
*G06F 9/451* (2018.01)
*G06F 16/27* (2019.01)
*G06F 16/28* (2019.01)
*G06F 21/53* (2013.01)
*G06F 21/62* (2013.01)

(52) U.S. Cl.
CPC ............ *G06F 16/273* (2019.01); *G06F 21/53* (2013.01); *G06F 21/62* (2013.01)

(56) References Cited

U.S. PATENT DOCUMENTS

| | | | |
|---|---|---|---|
| 2013/0246450 | A1 | 9/2013 | Weissman et al. |
| 2016/0307210 | A1 * | 10/2016 | Agarwal .......... G06Q 10/06316 |
| 2022/0350933 | A1 | 11/2022 | Bono et al. |
| 2026/0079966 | A1 | 3/2026 | Tirupati et al. |
| 2026/0080053 | A1 | 3/2026 | Tirupati et al. |

* cited by examiner

Dashed lines indicate referenced objects, not owned objects

1250

Home

Tableau Einstein

Production Org ACME Co.

Home

Following

Task Manage (5)

1254

Learn & Guides

Community

Administration

Good morning, Leah.
Check out the latest Production Org content for sharing and re-use.

Explore ACME Co. Production Content

1252

Notifications — Mark All as Read ×

Promotion Request: New Dashboard from Samantha Adams
Samantha Adams has requested a promotion review for New Dashboard in the New Workspace in Samantha's Org.
Apr 04, 2024, 7:38 PM Recents | Everything | Shared With Me | Any type | Any Owner

| Title | Dependencies | Original Owner | Source Workspace | Source Org | Last Modified |
|---|---|---|---|---|---|
| | 4 | Annabelle Thompson | Finance 2024 | Mel D's Org | Apr 04, 2024 |
| | 4 | Yolanda Singh | Finance 2024 | Bethany S' Org | Apr 03, 2024 |
| | 2 | Bethany Smith | Finance 2024 | Bethany S' Org | Apr 02, 2024 |
| | 2 | Brian Lee | Finance 2024 | My Org | Apr 01, 2024 |
| | 2 | Gary Krompart | Finance 2024 | Mel D's Org | Mar 28, 2024 |
| | 2 | Andre Penn | Samantha's Workspace | Samantha's Org | Mar 27, 2024 |
| | 1 | Kenny Ruthbridgo | Finance 2024 | Kenny R's Org | Mar 25, 2024 |
| | 1 | Amanda Till | Fin Projections 24 | Amanda T's Org | Mar 24, 2024 |
| | 2 | Eli Cruz | Fin Projections 24 | Eli C's Org | Mar 23, 2024 |
| | 2 | Mel Donaldson | Marketing 101 | Andre P's | Mar 22, 2024 |
| | 8 | Mel Donaldson | Marketing Ops | Karl W's Org | Mar 11, 2024 |
| | 8 | Andrew Turnbull | Marketing Ops | Anabelle T's Org | Mar 10, 2024 |
| | 17 | Bethany Smith | Marketing 101 | Yolanda S' Org | Mar 09, 2024 |
| | 17 | Karl Weather | Marketing OPs | Henry M's Org | Mar 08, 2024 |
| | 6 | Henry Mustard | Marketing OPs | Brian L's Org | Mar 07, 2024 |
| | 0 | Ruth Rawlings | Finance 2023 | Ruth R's Org | Mar 07, 2024 |

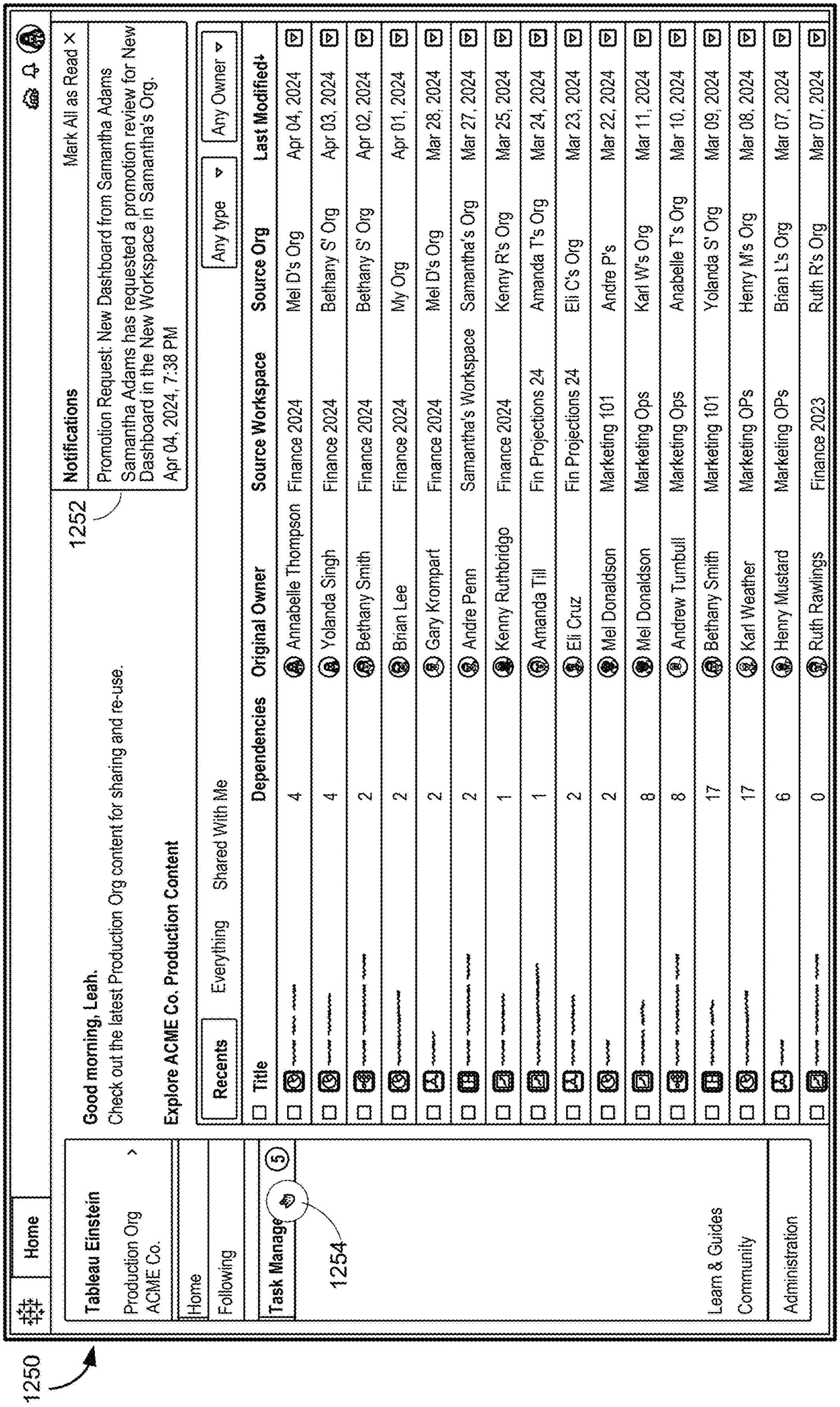

Figure 12D

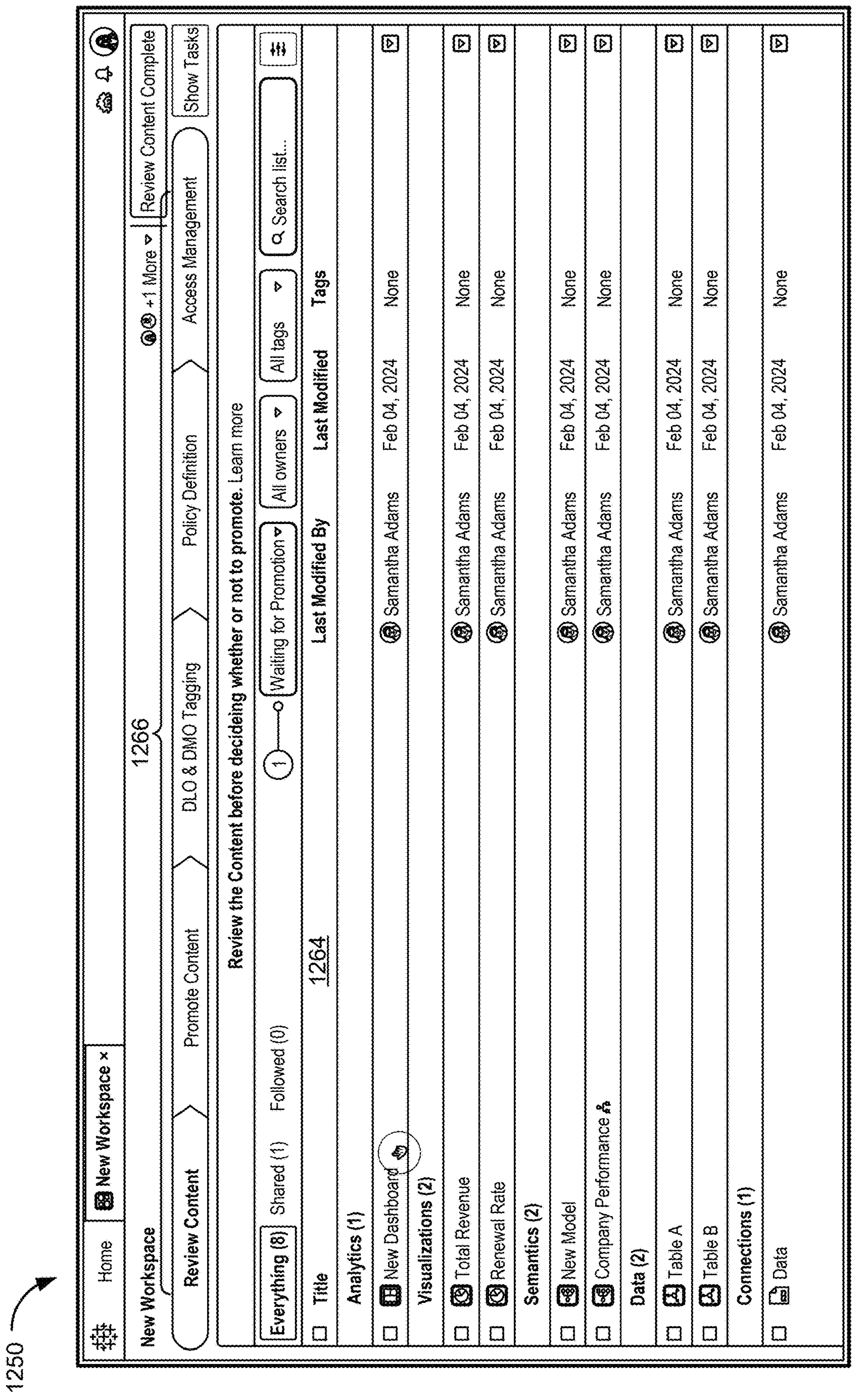

Home | New Workspace ×

New Workspace

1266

+1 More

Review Content Complete

Review Content | Promote Content | DLO & DMO Tagging | Policy Definition | Access Management Show Tasks

Review the Content before decideing whether or not to promote. Learn more

Everything (8) | Shared (1) | Followed (0)

1 — Waiting for Promotion | All owners | All tags | Search list...

1264

| Title | Last Modified By | Last Modified | Tags |
|---|---|---|---|
| **Analytics (1)** | | | |
| New Dashboard | Samantha Adams | Feb 04, 2024 | None |
| **Visualizations (2)** | | | |
| Total Revenue | Samantha Adams | Feb 04, 2024 | None |
| Renewal Rate | Samantha Adams | Feb 04, 2024 | None |
| **Semantics (2)** | | | |
| New Model | Samantha Adams | Feb 04, 2024 | None |
| Company Performance | Samantha Adams | Feb 04, 2024 | None |
| **Data (2)** | | | |
| Table A | Samantha Adams | Feb 04, 2024 | None |
| Table B | Samantha Adams | Feb 04, 2024 | None |
| **Connections (1)** | | | |
| Data | Samantha Adams | Feb 04, 2024 | None |

1250

1268

Home | New Workspace ×

New Workspace

+1 More ▿ | Accept Promotion | Reject Promotion

✓ > Promote Content > DLO & DMO Tagging > Policy Definition > Access Management | Show Tasks Does this content meet the requirements for promotion? Learn more Everything (8) | Shared (1) | Followed (0) | 1 | Waiting for Promotion ▿ | All owners ▿ | All tags ▿ | Search list...

| Title | Last Modified By | Last Modified | Tags |
|---|---|---|---|
| **Analytics (1)** | | | |
| New Dashboard | Samantha Adams | Feb 04, 2024 | None |
| **Visualizations (2)** | | | |
| Total Revenue | Samantha Adams | Feb 04, 2024 | None |
| Renewal Rate | Samantha Adams | Feb 04, 2024 | None |
| **Semantics (2)** | | | |
| New Model | Samantha Adams | Feb 04, 2024 | None |
| Company Performance | Samantha Adams | Feb 04, 2024 | None |
| **Data (2)** | | | |
| Table A | Samantha Adams | Feb 04, 2024 | None |
| Table B | Samantha Adams | Feb 04, 2024 | None |
| **Connections (1)** | | | |
| Data | Samantha Adams | Feb 04, 2024 | None |

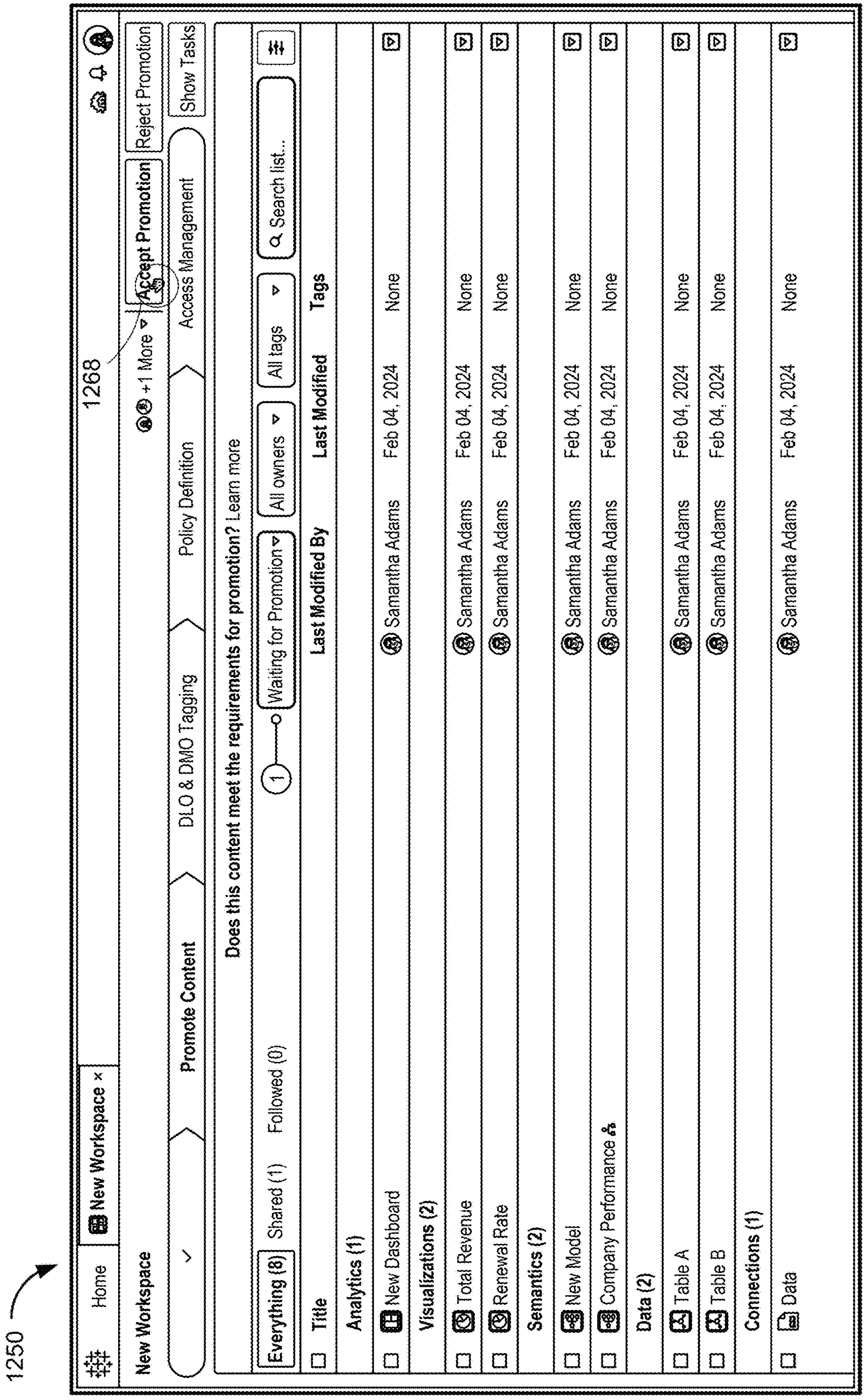

Figure 12G

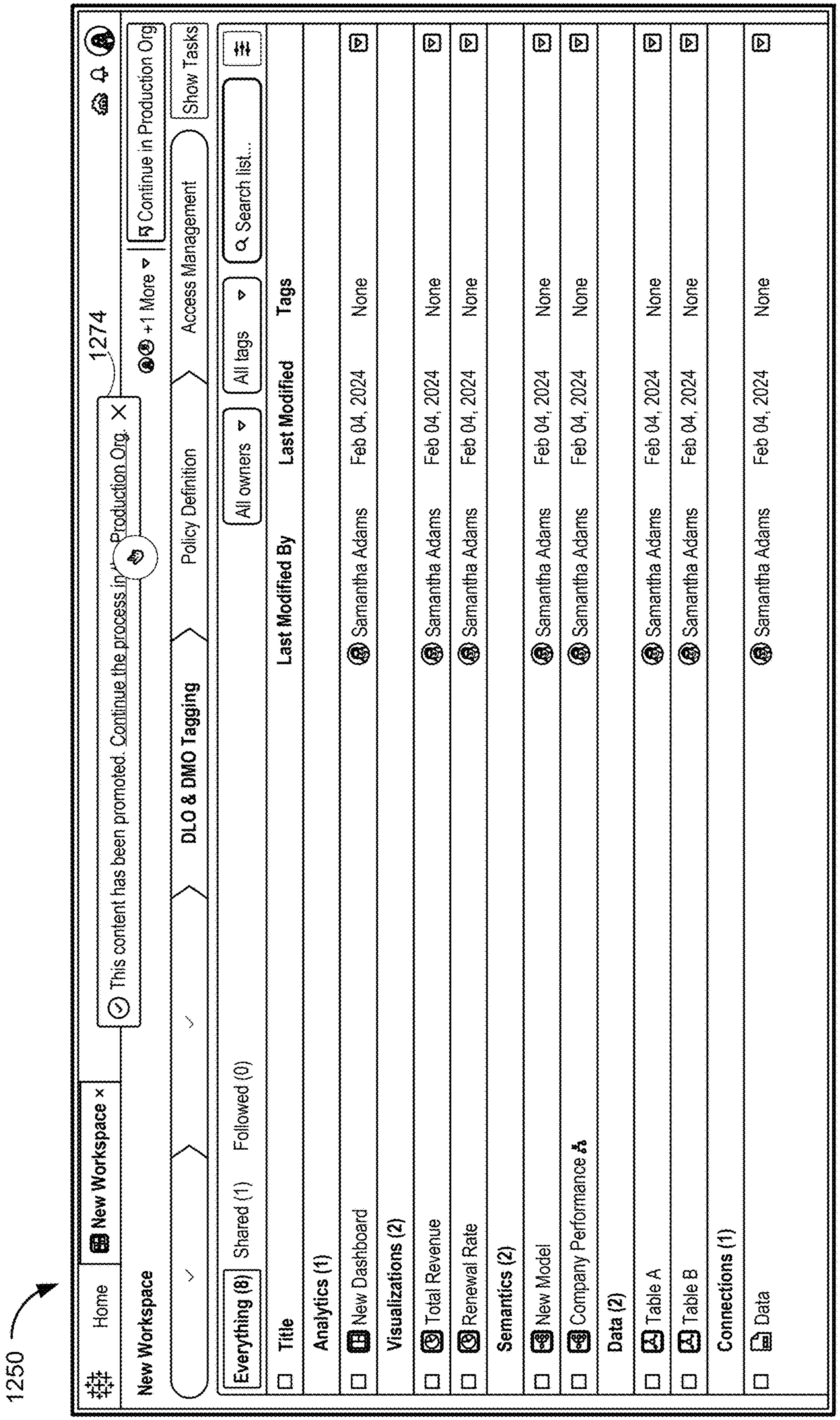

Home | New Workspace ×

New Workspace

This content has been promoted. Continue the process in the Production Org.

1274

+1 More

Continue in Production Org

DLO & DMO Tagging | Policy Definition | Access Management | Show Tasks

Everything (8) | Shared (1) | Followed (0) | All owners | All tags | Search list...

| Title | Last Modified By | Last Modified | Tags |
|---|---|---|---|
| **Analytics (1)** | | | |
| New Dashboard | Samantha Adams | Feb 04, 2024 | None |
| **Visualizations (2)** | | | |
| Total Revenue | Samantha Adams | Feb 04, 2024 | None |
| Renewal Rate | Samantha Adams | Feb 04, 2024 | None |
| **Semantics (2)** | | | |
| New Model | Samantha Adams | Feb 04, 2024 | None |
| Company Performance | Samantha Adams | Feb 04, 2024 | None |
| **Data (2)** | | | |
| Table A | Samantha Adams | Feb 04, 2024 | None |
| Table B | Samantha Adams | Feb 04, 2024 | None |
| **Connections (1)** | | | |
| Data | Samantha Adams | Feb 04, 2024 | None |

1282

DATA CLOUD HOME DATA STREAMS DATA LAKE OBJECTS DATA MODEL DATA GOVERNANCE CALCULATED INSIGHTS DATA EXPLORER SEGMENTS MORE

DMO / WANT > MANAGE TAGS
OPPORTUNITY: TAGS
FILTERED BY STATUS: REVIEW, ATTACHED

TRIGGER AUTO-TAGGING ATTACH NEW TAG DONE

OBJECT TAGS (3)

| TAG | TAXONOMY | CLASSIFICATION | POLICIES | STATUS |
|---|---|---|---|---|
| OPPORTUNITY | PERSONAL DATA | SENSITIVITY.CONFIDENTIAL | 2 | REVIEW |
| OPPT | | SENSITIVITY.CONFIDENTIAL | 2 | REVIEW |
| PROSPET | | SENSITIVITY.CONFIDENTIAL | 4 | ATTACHED |

FIELD TAGS (256)

| FIELD NAME | TAG NAME | TAXONOMY | CLASSIFICATION | POLICIES | STATUS |
|---|---|---|---|---|---|
| ACCOUNT | ID | PERSONAL DATA | IDENTIFIER | 3 | ATTACHED |
| ACCOUNT | IDENTIFIER | CUSTOM ONE | IDENTIFIER | 3 | ATTACHED |
| CONTACT | OPPORTUNITY | CUSTOM ONE | | 1 | REVIEW |
| CONTACT | RESTRICTED | PERSONAL DATA | SENSITIVITY.CONFIDENTIAL IDENTIFIER | 4 | ATTACHED |
| CONTACT | PLL.CONTACT | PERSONAL DATA | SENSITIVITY.CONFIDENTIAL | 1 | ATTACHED |
| NAME | PLL.NAME | | SENSITIVITY.CONFIDENTIAL | 1 | REVIEW |
| OPP OWNER | OWNER | CUSTOM ONE | SENSITIVITY.CONFIDENTIAL IDENTIFIER | 4 | ATTACHED |
| OPP OWNER | OPPORTUNITY | CUSTOM ONE | SENSITIVITY.CONFIDENTIAL | 2 | REVIEW |

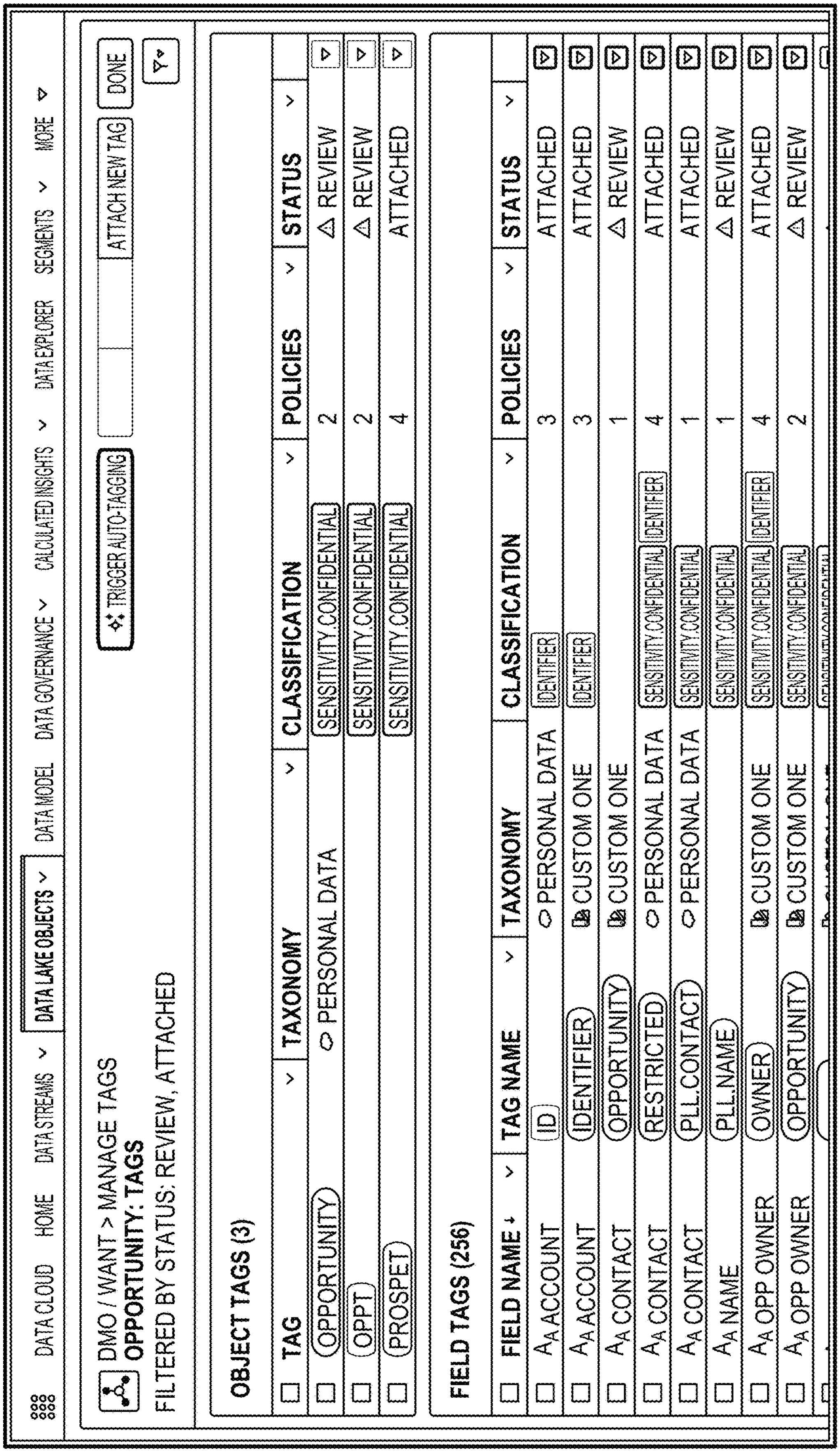

1326 Determine an access control policy that applies to a first user of the workspace 1328 Determine, for each component of the collection of components, a component-level access control policy, including determining a data space source corresponding to the respective component; determining an existing access control policy that applies to the first user with respect to the data space source; and applying the same existing access control policy as the component-level access control policy 1330 Execute a workspace management application, including cause a user interface to be displayed on a client device that is communicatively connected with the multi-tenant system 1332 Cause display of one or more workspace options in the user interface, including one or more of: an option to create a new component in the first workspace, an option to add an existing component from another workspaces, an option to save the first workspace, an option to share the first workspace, an option to view details of the first workspace, an option to delete the first workspace, and an option to display one or more components shared from the first workspace 1334 Cause display of one or more component options in the user interface, including one or more of: an option to open a component for viewing; an option to open a component for editing; an option to view details of a component; an option to share a component; an option to delete a component, and an option to filter and search within the collection of components

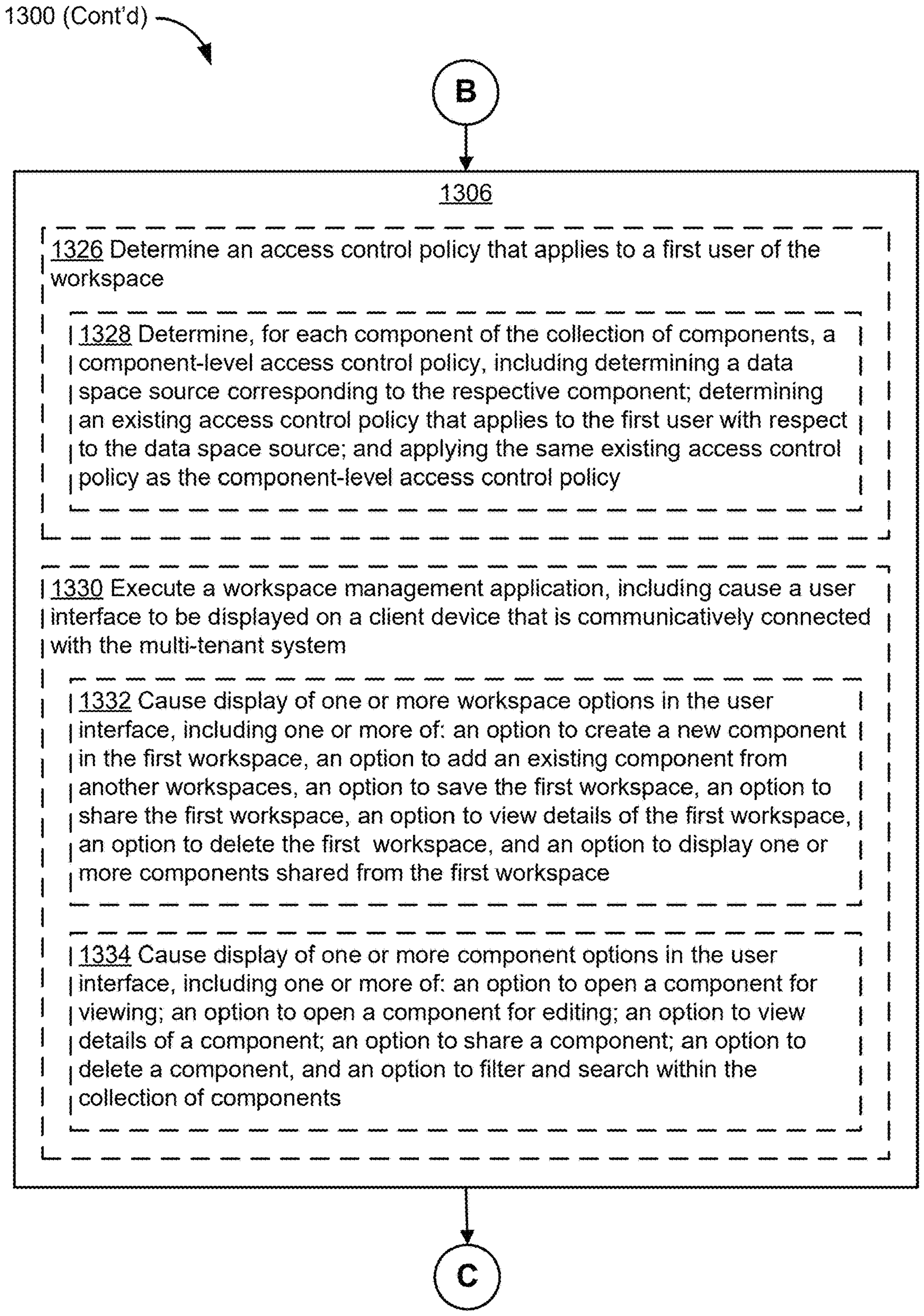

Figure 13C

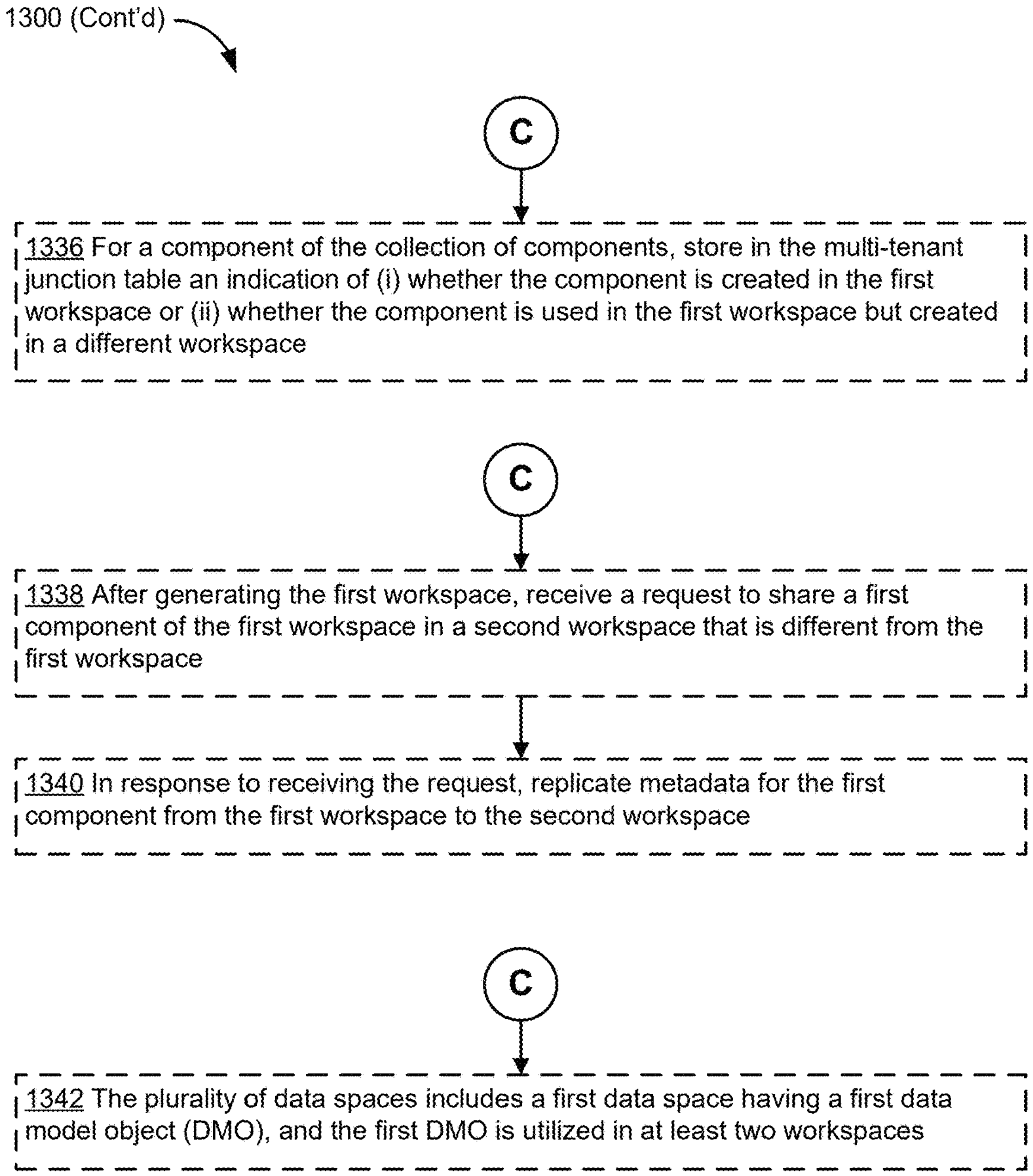

Figure 13D

1336 For a component of the collection of components, store in the multi-tenant junction table an indication of (i) whether the component is created in the first workspace or (ii) whether the component is used in the first workspace but created in a different workspace 1338 After generating the first workspace, receive a request to share a first component of the first workspace in a second workspace that is different from the first workspace 1340 In response to receiving the request, replicate metadata for the first component from the first workspace to the second workspace 1342 The plurality of data spaces includes a first data space having a first data model object (DMO), and the first DMO is utilized in at least two workspaces

1400

1402 Store, by the multi-tenant system, tenant data for a tenant in a data space of the multi-tenant system 1404 Receive, by the multi-tenant system, a request from a user to generate an isolated workspace according to the tenant data stored in the data space. The user has non-administrative access control with respect to the data space of the multi-tenant system 1406 In accordance with receiving the request, provision an isolated organization to the user, including establishing administrative access control for the user with respect to the isolated organization while maintaining the non-administrative access control for the user with respect to the data space 1408 Establishing administrative access control for the user with respect to the isolated organization includes enabling options for the user to provision one or more workspaces within the isolated organization and manage workspaces within the isolated organization 1410 Replicate at least a subset of metadata from the data space to the isolated organization. The subset of metadata is accessible to the user in the data space. The subset of metadata describes a corresponding subset of data 1412 Store, in the isolated organization, all components created in the isolated organization

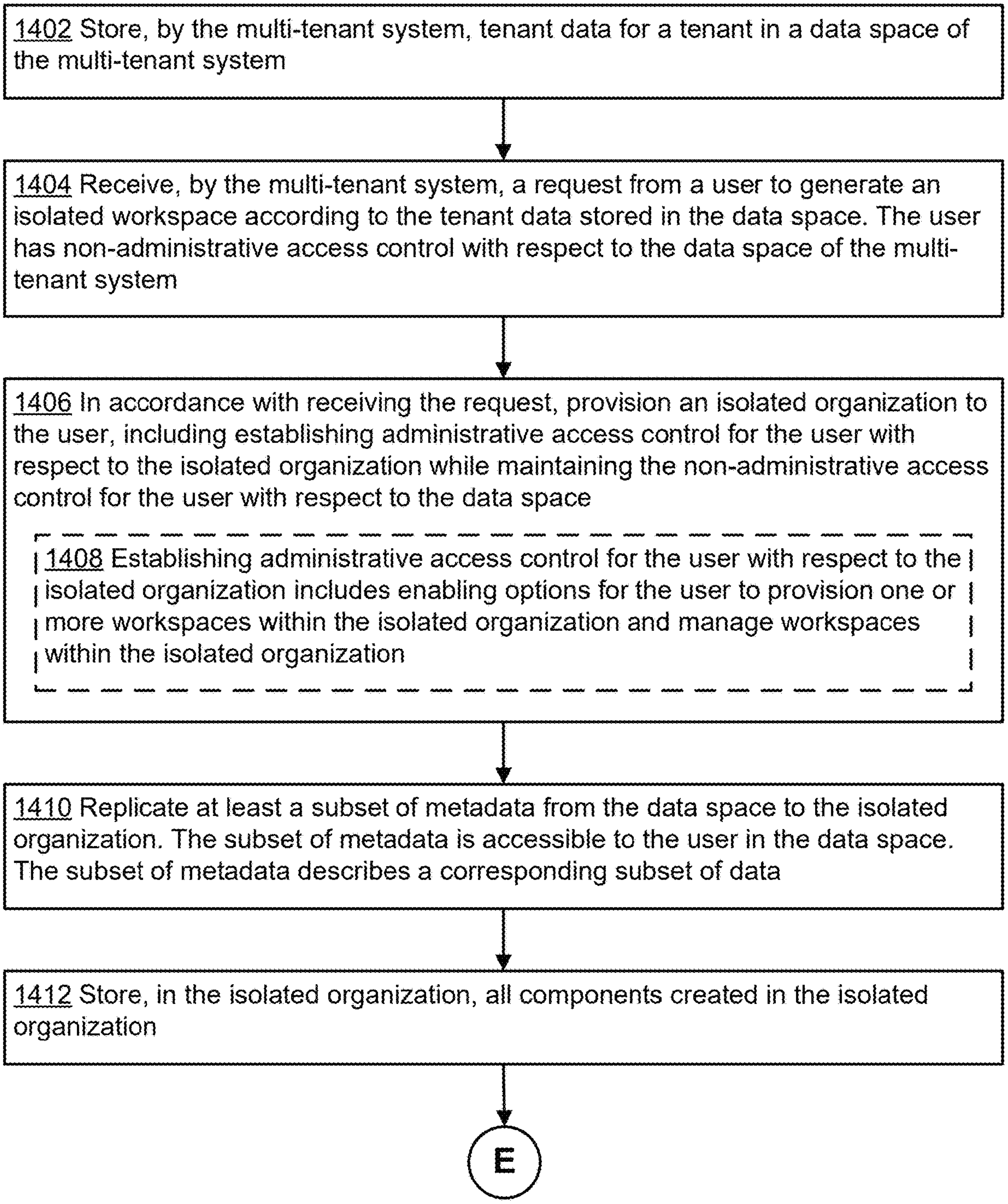

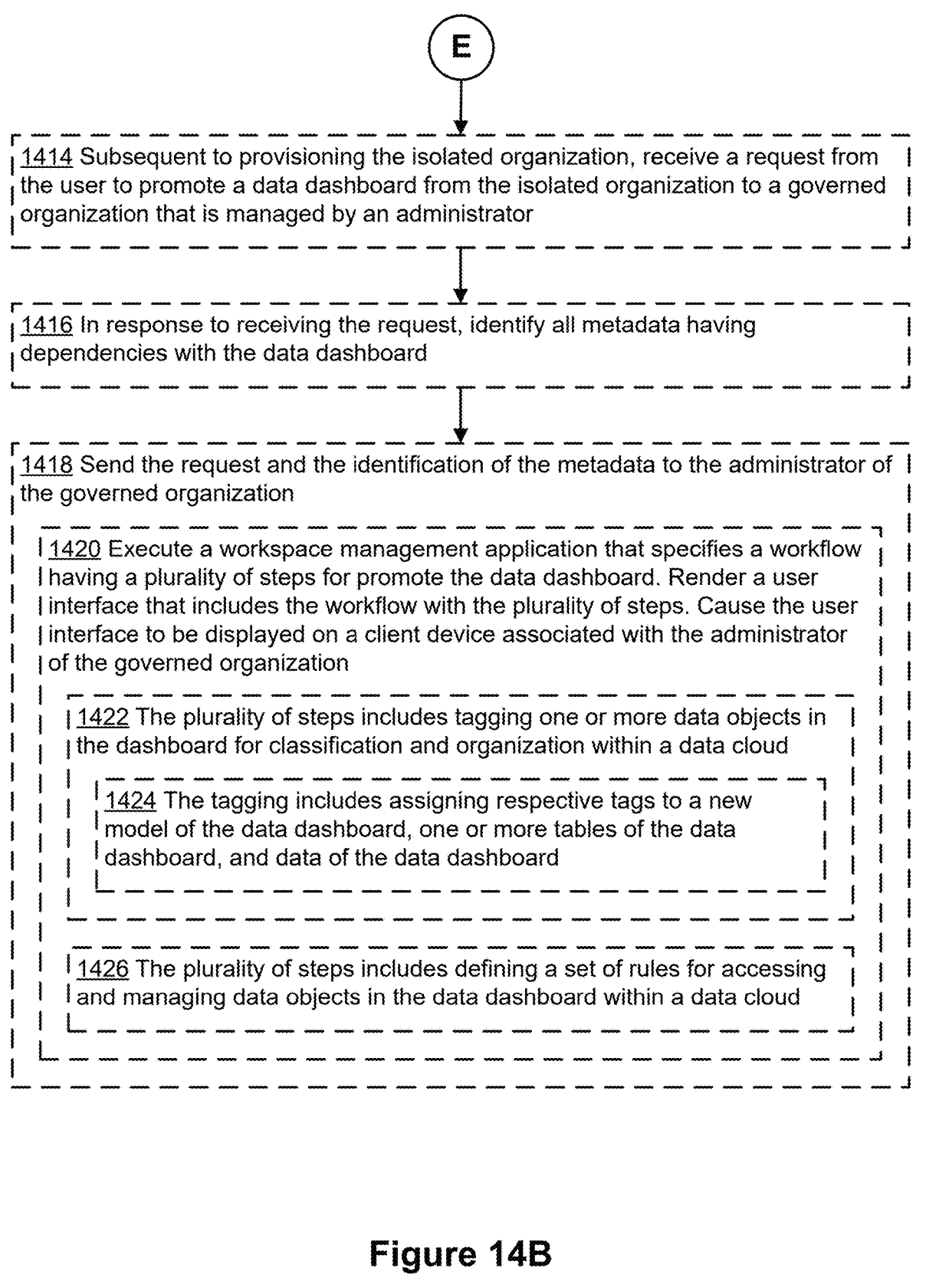

1414 Subsequent to provisioning the isolated organization, receive a request from the user to promote a data dashboard from the isolated organization to a governed organization that is managed by an administrator 1416 In response to receiving the request, identify all metadata having dependencies with the data dashboard 1418 Send the request and the identification of the metadata to the administrator of the governed organization 1420 Execute a workspace management application that specifies a workflow having a plurality of steps for promote the data dashboard. Render a user interface that includes the workflow with the plurality of steps. Cause the user interface to be displayed on a client device associated with the administrator of the governed organization 1422 The plurality of steps includes tagging one or more data objects in the dashboard for classification and organization within a data cloud 1424 The tagging includes assigning respective tags to a new model of the data dashboard, one or more tables of the data dashboard, and data of the data dashboard 1426 The plurality of steps includes defining a set of rules for accessing and managing data objects in the data dashboard within a data cloud

Figure 14B

1428 The isolated organization references a synthetic data source. In accordance with a determination that the request to promote the data dashboard has been approved by the administrator of the governed organization, switch a data source from the synthetic data source to an actual data source 1430 In accordance with a determination that the request to promote the data dashboard has been approved by the administrator of the governed organization: (i) connect the data dashboard to an actual data source ad (ii) generate and render contents for the dashboard according to data from the actual data source.

1432 In accordance with a determination that the request to promote the data dashboard has been approved by the administrator of the governed organization, update references in a multi-tenant junction table to reflect the governed organization while maintaining a lineage of artifacts from the isolated organization

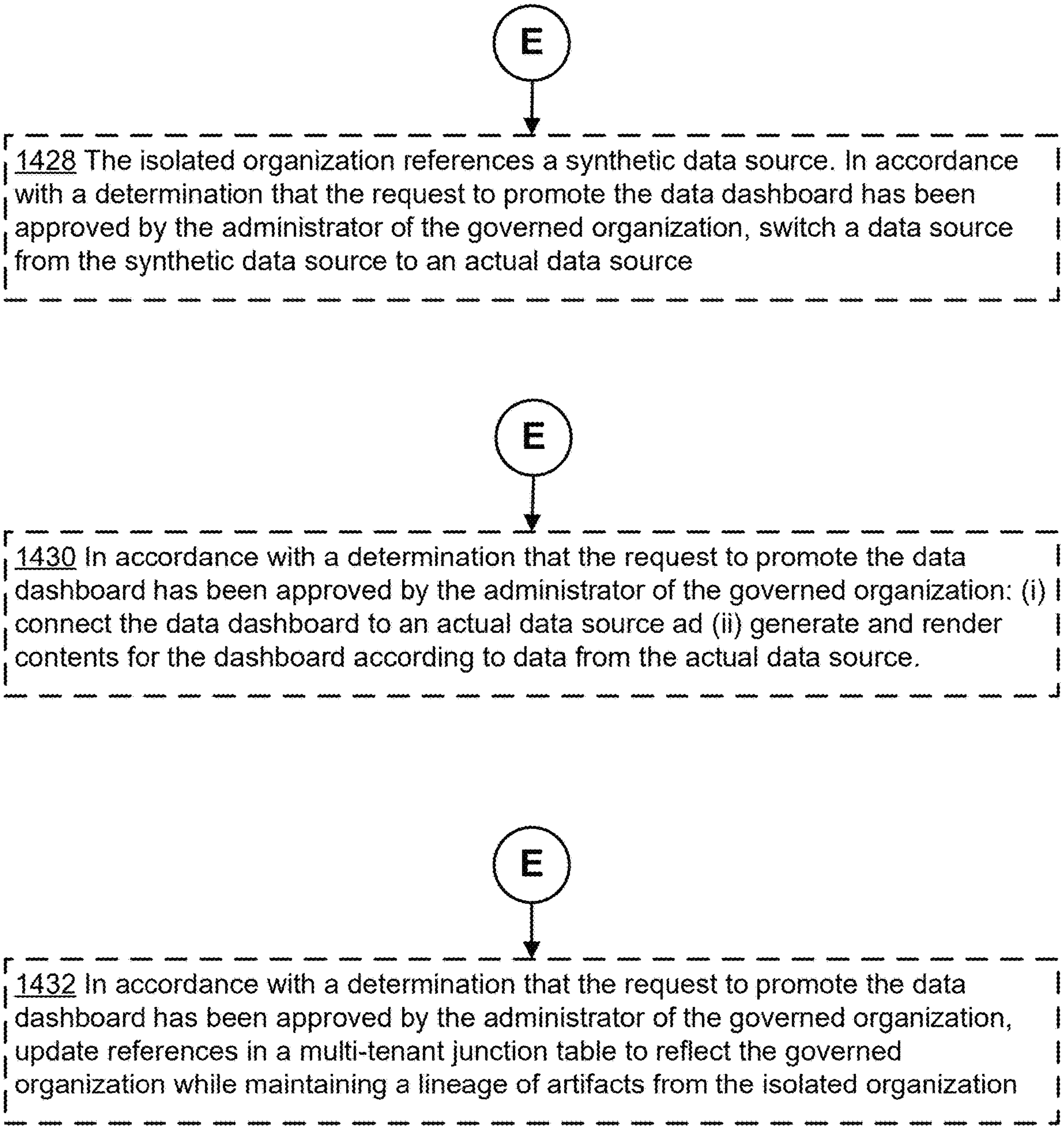

Figure 14C

SYSTEMS AND METHODS FOR ORGANIZING AND VISUALIZING RELATED DATA AND WORK DATA RELATIONSHIPS

RELATED APPLICATIONS

This application claims priority to (i) U.S. Provisional Patent Application Ser. No. 63/694,888, filed Sep. 15, 2024, titled "Systems and Methods for Organizing and Visualization Relationship of Related Data and Data Work" and (ii) U.S. Provisional Patent Application Ser. No. 63/694,889, filed Sep. 15, 2024, titled "Computer Systems and Methods for Providing Isolated, Administrated Environments for Self-Managed Work Encapsulation," each of which is incorporated by reference herein in its entirety.

This application is related to U.S. patent application Ser. No. 19/030,948, filed Jan. 17, 2025, titled "Systems and Methods for Providing Isolated, Administered Environments for Self-managed Work Encapsulation," which is incorporated by reference herein in its entirety.

TECHNICAL FIELD

The disclosed embodiments relate generally to data analysis and more specifically, to systems, methods, and user interfaces for organizing and visualizing tenant data using a multi-tenant system.

BACKGROUND

Organizations have access to more data about consumers of their products and services than ever before. A multi-tenant system can efficiently manage and enable data access within tenant organizations. However, multi-tenant systems may not have systems or methods in-place to support reusability of analytics components created by analysts, or workspaces where analysts can develop and build insights from data.

SUMMARY

Organizations have more data than ever before. In some instances, data of an organization can be scattered across different systems. In other instances, the data can be trapped and disconnected from systems used by the organizations to connect with their customers, such as customer relation management (CRM) systems.

In some scenarios, a multi-tenant system can adopt a "unified data analytics" (or unified analytics) approach by centralizing data for a tenant organization from various sources into a single platform, and integrating various data analytics processes, tools, and workflows into a single, cohesive platform or framework. Unified analytics can break down silos, enhance collaboration, streamline decision-making, improve inefficiency, and provide a holistic view of data.

At the present, data of a tenant organization can be stored in one or more data spaces (e.g., in a data space layer) of a data cloud hosted by the multi-tenant system. A data space is a logical partition to organize the organization's data for profile unification, insights, and marketing in the data cloud. For example, the tenant organization can segregate its data, metadata, and processes into categories, such as brand, region, or department, and then enable users to see and work on data only in the context of their category. In some embodiments, data in data spaces can be further merged and analyzed. In some embodiments, the data of a tenant organization is also referred to herein as tenant data. In some embodiments, the multi-tenant system operates an on-demand database service for multiple tenant organizations (e.g., multiple companies). In some embodiments, the multi-tenant system hosts data for over 50,000 tenants, 100,000 tenants, 250,000 tenants, or 500,000 tenants. Multi-tenancy is a software architecture that allows multiple customers, or tenants, to share a single instance of a software application. It is a common feature in cloud computing, where it allows for resource sharing while keeping data isolated.

In some instances, a data space is still a large container of data cloud metadata. For example, the data space can have tens of thousands or hundreds of thousands of data tables, and the attributes is at the per-table level. The data space creates large partitions and access control that make sense at an organization or department level, but not at the level of an individual analyst or a group of analysts.

In accordance with some embodiments of the present disclosure is the realization that there is a need to develop workspace containers for hosting data cloud data and metadata at a lower level and a smaller scale than that of the data space. In some embodiments, the workspace containers, or "workspaces," are optimized for an individual analyst or groups of analysts. For example, the implementation of workspaces can enable an analyst to organize their analytical datasets, processes, and process definitions. The analyst can also define the scope of permissions for sharing data or metadata with other analysts or groups within the organization. Furthermore, as disclosed, in some embodiments, the implementation of workspaces can enable data artifacts such as visualizations and dashboards that are created in one workspace to be reused across different workspaces, which is currently not permissible at the data space level. Further, as disclosed, in some embodiments the implementation of workspaces can enable data model objects (DMOs), data lake objects (DLOs), and semantic model objects (SMOs) to be referenced in individual workspaces.

As disclosed, in some embodiments, a workspace container can include workspace components. The multi-tenant system can implement a multi-tenant junction table to store membership information of workspace components. As disclosed, the multi-junction junction table is a database table that manages relationships (e.g., many-to-many relationships between different tables corresponding to the metadata sources or the data sources of the respective workspace components.

As disclosed, in some embodiments, the implementation of workspaces advantageously promotes reuse of individual components inside a workspace. Notably, a workspace is not a workbook (e.g., a file such as Tableau® workbook or Microsoft Excel® workbook) that organizes and stores data visualizations and models, because the workspace permits sharing of individual data visualizations and data dashboards with other workspaces. As disclosed, in some embodiments, workspace components (e.g., visualizations and dashboards) and objects in workspace are shareable across various workspaces in an organization and can be referenced in multiple workspaces.

In accordance with some embodiments of the present disclosure is also the realization that while the multi-tenant system provides tenant organizations with a single source of truth of data and metadata (e.g., a "governed organization"), most of the content—and resource governance is overseen at the organizational level. However, in some instances, analysts within a tenant organization may desire individual workspaces where they can develop and build insights for data, sometimes for personal use, sometimes to share with others, and at times promote into that single source of truth. Some embodiments of the present disclosure provide a technical solution for this technical problem by implementing personal space organizations (also referred to herein as "isolated organizations" or "ungoverned organizations") in a multi-tenant system, where analysts of a tenant organization can develop and share analytical content with other "isolated organizations" within that tenant organization. In some embodiments, data cloud features are available in personal space. In some embodiments, an analyst is an administrator in their own personal space. They will be able to do everything an administrator can do in their organization except for user management, personal space management, and resource governance. In some embodiments, an analyst would do their work in the personal space and then with the approval of the administrator promote the finished product to the governed organization for more public use.

The systems, methods, and user interfaces of this disclosure each have several innovative aspects, no single one of which is solely responsible for the desirable attributes disclosed herein.

In accordance with some embodiments, a method for providing contextual data analytics performed by a multi-tenant system that includes one or more processors and memory. The method includes storing, by the multi-tenant system, tenant data for a tenant in a plurality of data spaces of the multi-tenant system. The method includes receiving, by the multi-tenant system, a request to generate a first workspace according to at least a subset of the tenant data stored in the plurality of data spaces. The method includes in accordance with receiving the request, generating the first workspace, including: (i) determining a collection of components of the first workspace; (ii) determining a respective data and/or metadata source for each component of the collection of components, the respective data and/or metadata source corresponding to a data space of the plurality of data spaces; (iii) receiving, via the plurality of data spaces, data and/or metadata for each component of the collection of components; (iv) storing the data and/or metadata of the first workspace to each component; and (v) storing, in a multi-tenant junction table, relationships between the first workspace, the collection of components of the first workspace, and respective objects from the plurality of data spaces.

In some embodiments, the junction table includes a plurality of data rows and a plurality of data columns. Each data row of the plurality of data rows corresponds to a respective component of a respective workspace. The plurality of data columns includes a first data column that references a primary key of a workspace database table and a second data column that bridges between multiple database tables, the multiple database tables including a dashboard table, a visualization table, and a semantic model table.

In some embodiments, the junction table includes a component usage type variable whose values are restricted to one of: a first value specifying that a respective component is created in the first workspace and a second value specifying that the respective component is created in another workspace but used in the first workspace.

In some embodiments, the junction table includes a component type variable whose values are restricted to a set of predefined values, each of the predefined values specifying a component type of a respective component.

In some embodiments, the component type comprises: an analytic component, a visualization component, a semantic component, or a data component.

In some embodiments, the method further comprises, for a component of the collection of components: storing, in the multi-tenant junction table, an indication of (i) whether the component is created in the first workspace or (ii) whether the component is used in the first workspace but created in a different workspace.

In some embodiments, generating the first workspace includes determining an access control policy that applies to a first user of the workspace.

In some embodiments, determining the access control policy that applies to the first user includes determining, for each component of the collection of components, a component-level access control policy, including: (i) determining a data space source corresponding to the respective component; (ii) determining an existing access control policy that applies to the first user with respect to the data space source; and (iii) applying the same existing access control policy as the component-level access control policy.

In accordance with some embodiments, a method of providing isolated work environments performed by a multi-tenant system that includes one or more processors and memory. The method includes storing, by the multi-tenant system, tenant data for a tenant in a data space of the multi-tenant system. The method includes receiving, by the multi-tenant system, a request from a user to generate an isolated workspace according to the tenant data stored in the data space. The user has non-administrative access control with respect to the data space of the multi-tenant system. The method includes in accordance with receiving the request: (i) provisioning an isolated organization to the user, including establishing administrative access control for the user with respect to the isolated organization while maintaining the non-administrative access control for the user with respect to the data space; (ii) replicating at least a subset of metadata from the data space to the isolated organization, where the subset of metadata is accessible to the user in the data space, the subset of metadata describing a corresponding subset of data; and (iii) storing, in the isolated organization, all components created in the isolated organization.

In some embodiments, establishing administrative access control for the user with respect to the isolated organization includes enabling options for the user to provision one or more workspaces within the isolated organization and manage workspaces within the isolated organization.

In some embodiments, the method further includes subsequent to provisioning the isolated organization, receiving a request from the user to promote a data dashboard from the isolated organization to a governed organization that is managed by an administrator; and in response to receiving the request: (i) identifying all metadata having dependencies with the data dashboard; and (ii) sending the request and the identification of the metadata to the administrator of the governed organization.

In some embodiments, the isolated organization references a synthetic data source. The method includes in accordance with a determination that the request to promote the data dashboard has been approved by the administrator of the governed organization, switching a data source from the synthetic data source to an actual data source.

In some embodiments, the method further includes in accordance with a determination that the request to promote the data dashboard has been approved by the administrator of the governed organization: (i) connecting the data dashboard to an actual data source; and (ii) generating and rendering contents for the dashboard according to data from the actual data source.

In some embodiments, sending the request and the identification of the metadata to the administrator of the governed organization includes: (i) executing a workspace management application that specifies a workflow having a plurality of steps for promote the data dashboard; (ii) rendering a user interface that includes the workflow with the plurality of steps; and (iii) causing the user interface to be displayed on a client device associated with the administrator of the governed organization.

In accordance with some embodiments, a computer system includes one or more processors and memory coupled to the one or more processors. The memory stores one or more programs configured for execution by the one or more processors. The one or more programs include instructions for performing any of the methods disclosed herein.

In accordance with some implementation, a non-transitory computer readable storage medium stores one or more programs configured for execution by a computer system having one or more processors, and memory. The one or more programs include instructions for performing any of the methods disclosed herein.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Detailed Description of Embodiments below, in conjunction with the following drawings in which like reference numerals refer to corresponding parts throughout the figures.

FIGS. 13A to 13D provide a flowchart of a method for contextual data analytics, in accordance with some embodiments.

FIGS. 14A to 14C provide a flowchart of a method for providing isolated work environments, in accordance with some embodiments.

Figure 1:
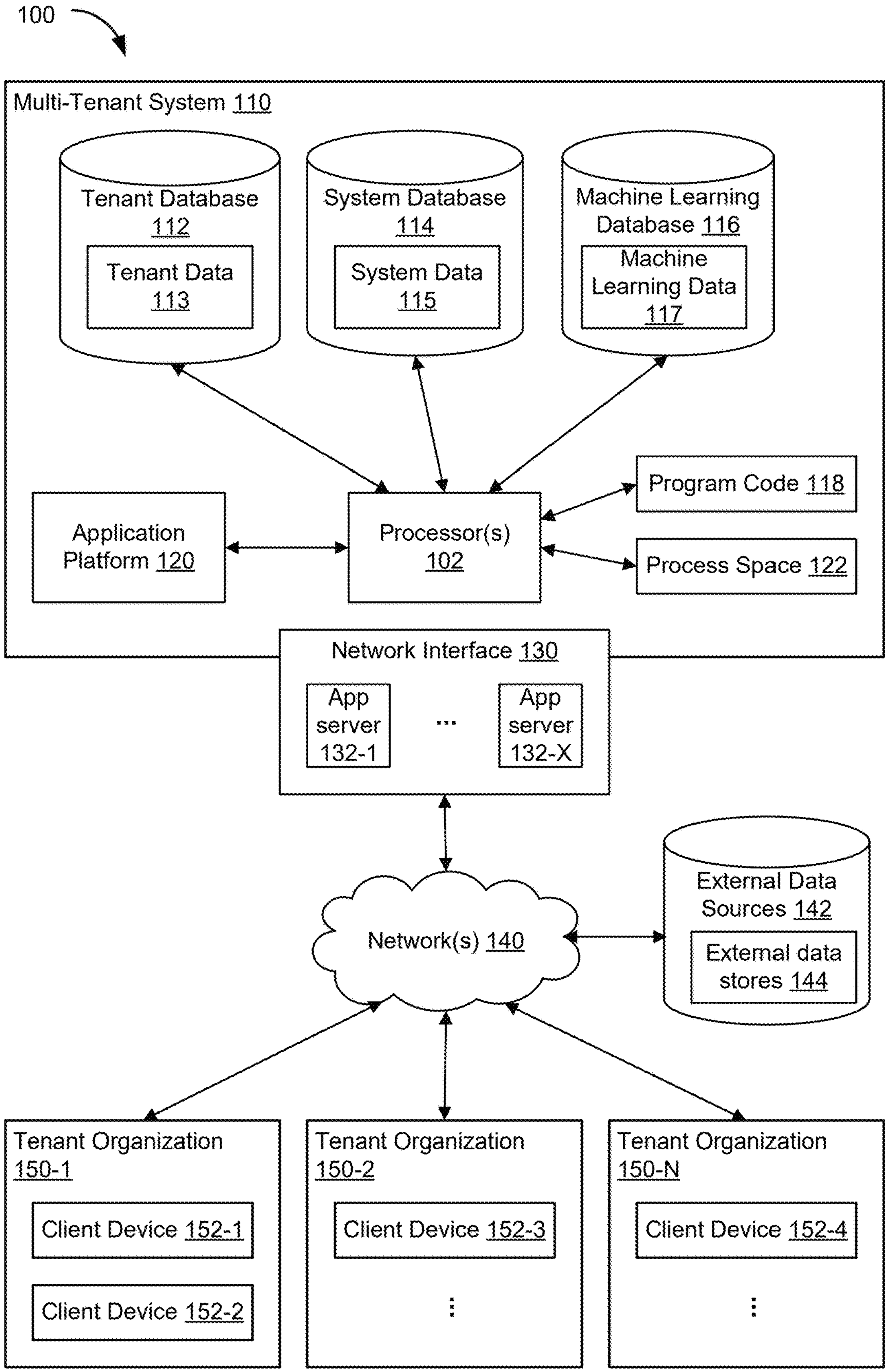
FIG. 1 illustrates an exemplary operating environment, in accordance with some embodiments.

Reference will now be made to embodiments, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DETAILED DESCRIPTION OF EMBODIMENTS

Some embodiments of the present disclosure are directed to systems and methods for organizing and visualizing related data and work data relationships. In accordance with some embodiments, a computer system that includes one or more processors is configured to provide contextual data analytics. In some embodiments, the computer system is a multi-tenant computer system. The computer system stores tenant data for a tenant (e.g., a tenant organization or a customer) in a plurality of data spaces of the computer system. The computer system receives (e.g., by a tenant organization) a request to generate a first workspace (e.g., governed workspace or a sharable container) according to at least a subset of the tenant data stored in the plurality of data spaces. The computer system, in accordance with receiving the request, generates the first workspace, including determining a collection of components of the first workspace, determining a respective data and/or metadata source for each component of the collection of components, the respective data and/or metadata source corresponding to a data space of the plurality of data spaces. The computer system receives, via the plurality of data spaces, data and/or metadata for each component of the collection of components. The computer system stores the data and/or metadata of the first workspace to each component. The computer system stores, in a multi-tenant junction table, relationships between the first workspace, the collection of components of the first workspace, and respective objects from the plurality of data spaces. In some embodiments, the computer system generates the multi-tenant junction table prior to storing the relationships in the multi-tenant junction table. In some embodiments, the junction table includes a plurality of data rows and a plurality of data columns. Each data row of the plurality of data rows corresponds to a respective component of a respective workspace of a tenant organization. The plurality of data columns includes a first data column that references a primary key of a workspace database table and a second data column that bridges between multiple database tables, the multiple database tables including a dashboard table, a visualization table, and a semantic model table. In some embodiments, the multiple database tables include a data model object table and a calculated insights table. In some embodiments, each database table of the multiple database tables includes fields (e.g., database entries) corresponding to a respective metadata source or a respective data source of a workspace component.

Some embodiments of the present disclosure are directed to systems and methods for providing isolated, administered environments for self-managed work encapsulation. In accordance with some embodiments, a computer system that includes one or more processors is configured to provide isolated work environment. In some embodiments, the computer system is a multi-tenant computer system. The computer system stores tenant data for a tenant (e.g., tenant organization) in a data space of the computer system. The computer system receives a request from a user (e.g., an analyst of the tenant organization) to generate an isolated (personal) workspace according to the tenant data stored in the data space. The user has non-administrative access control with respect to the data space of the multi-tenant system. The computer system, in accordance with receiving the request, provisions an isolated organization (e.g., ungoverned organization, a virtual space that contains a customer's data and applications) to the user, including establishing administrative access control for the user with respect to the isolated organization while maintaining the non-administrative access control for the user with respect to the data space (e.g., the user is still able to reuse the data artifacts that they have access to). The computer system replicates at least a subset of metadata from the data space to the isolated organization, wherein the subset of metadata is accessible to the user in the data space, the subset of metadata describing a corresponding subset of data. The computer system stores, in the isolated organization, all components created in the isolated organization.

FIG. 1 illustrates an exemplary operating environment 100, in accordance with some embodiments.

The operating environment 100 includes a multi-tenant system 110. The multi-tenant system 110 is a cloud computing system. In some embodiments, the multi-tenant system 110 implements a multi-tenant cloud computing architecture, which enables devices 152 (e.g., device 152-1 to device 152-4) associated with multiple tenant organizations 150 (e.g., customers, or tenants), such as tenant organization 150-1, tenant organization 150-2, and tenant organization 150-N, to share a single instance of a software application while keeping data isolated. In some embodiments, the multi-tenant system 110 hosts data for over 50,000 tenant organizations, 100,000 tenant organizations, 250,000 tenant organizations, or 500,000 tenant organizations.

The multi-tenant system 110 includes one or more processors 102.

In some embodiments, the multi-tenant system 110 includes a tenant database 112 for storing tenant data 113. The tenant data 113 may be divided into individual tenant storage areas, which may be either a physical arrangement and/or a logical arrangement of data. In some embodiments, within each tenant storage area, the customer storage and the application metadata may be similarly allocated for each customer.

In some embodiments, the multi-tenant system 110 includes a system database 114 for storing system data 115.

In some embodiments, the multi-tenant system 110 includes a machine learning database 116 for storing machine learning data 117. The machine learning data 117 can include data used by the multi-tenant system 110, the tenant organizations 150, or the client devices 152 to process data based on machine learning. For example, machine learning based data processing models and associated training data are stored in the machine learning database 116 as machine learning data 117.

In some embodiments, the multi-tenant system 110 includes program code 118 for implementing various functions of the multi-tenant system 110.

In some embodiments, the multi-tenant system 110 includes an application platform 120. The application platform 120 is a framework of services that provides an environment for developing and running applications. The application platform 120 allows the applications of the multi-tenant system 110 to run, such as the operating system, hardware and/or software. In some embodiments, the application platform 120 enables the creation, management, and execution of one or more applications developed by the multi-tenant system 110, customers accessing the multi-tenant system 110 via tenant organizations 150, or third-party application developers accessing the multi-tenant system 110 via the tenant organizations 150. In some embodiments, the application platform 120 includes a unified data analytics platform that empowers users of tenant organizations with self-service analytics capabilities, allowing users to explore and visualize data independently.

In some embodiments, the multi-tenant system 110 includes process space 122 for executing multi-tenant system-specific processes and tenant-specific processes, such as running applications as part of an application hosting service. Additional processes that may execute on the multi-tenant system 110 can include database indexing processes.

In the operating environment 100 of FIG. 1, the multi-tenant system 110 includes a network interface 130 that communicatively connects the multi-tenant system 110 with tenant organizations 150 and external data sources 142 via network(s) 140. In some embodiments, the network interface 130 is implemented as a set of application servers 132 (e.g., application server 132-1 to 132-X), the application platform 120, the tenant database 112, the system database 114, and the machine learning database 116. Each application server 132 may be communicably coupled to the databases, e.g., having access to the tenant data 113, system data 115, and machine learning data 117, via a different network connection.

Examples of the network(s) 140 include local area networks (LANs) and wide area networks (WANs) such as the Internet. In some implementations, the one or more networks 140 are implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some embodiments, the multi-tenant system 110 and/or a respective tenant organization 150 may process data obtained from external data sources 142. The external data sources 142 include data that is not managed by the multi-tenant system 110. In some embodiments, the external data sources 142 can include one or more external data stores 144. Examples of external data stores 144 include relational databases, data warehouses, external lake houses, file systems, and big data systems. In some embodiments, an external data source 142 may be a web service that provides data/information such as weather, traffic, events, demographic, location/address, and/or search data.

A tenant organization 150 includes devices 152 that are associated with departments or employees of the organization. In some embodiments, a tenant organization 150 can be associated with hundreds or thousands of devices 152. Exemplary client devices 152 can include handheld computers, wearable computing devices, personal digital assistants (PDAs), tablet computers, laptop computers, desktop computers, cellular telephones, smart phones, enhanced general packet radio service (EGPRS) mobile phones, media players, navigation devices, game consoles, televisions, remote controls, point-of-sale (POS) terminals, vehicle-mounted computers, ebook readers, or a combination of any two or more of these data processing devices or other data processing devices.

In some embodiments, the multi-tenant system 110 is a server system that is implemented on one or more standalone data processing devices or a distributed network of computers. In some implementations, the multi-tenant system 110 employs various virtual devices and/or services of third party service providers (e.g., third-party cloud service providers) to provide the underlying computing resources and/or infrastructure resources of the multi-tenant system 110. In some implementations, the multi-tenant system 110 includes handheld computers, tablet computers, laptop computers, desktop computers, or a combination of any two or more of these data processing devices or other data processing devices.

Figure 2:
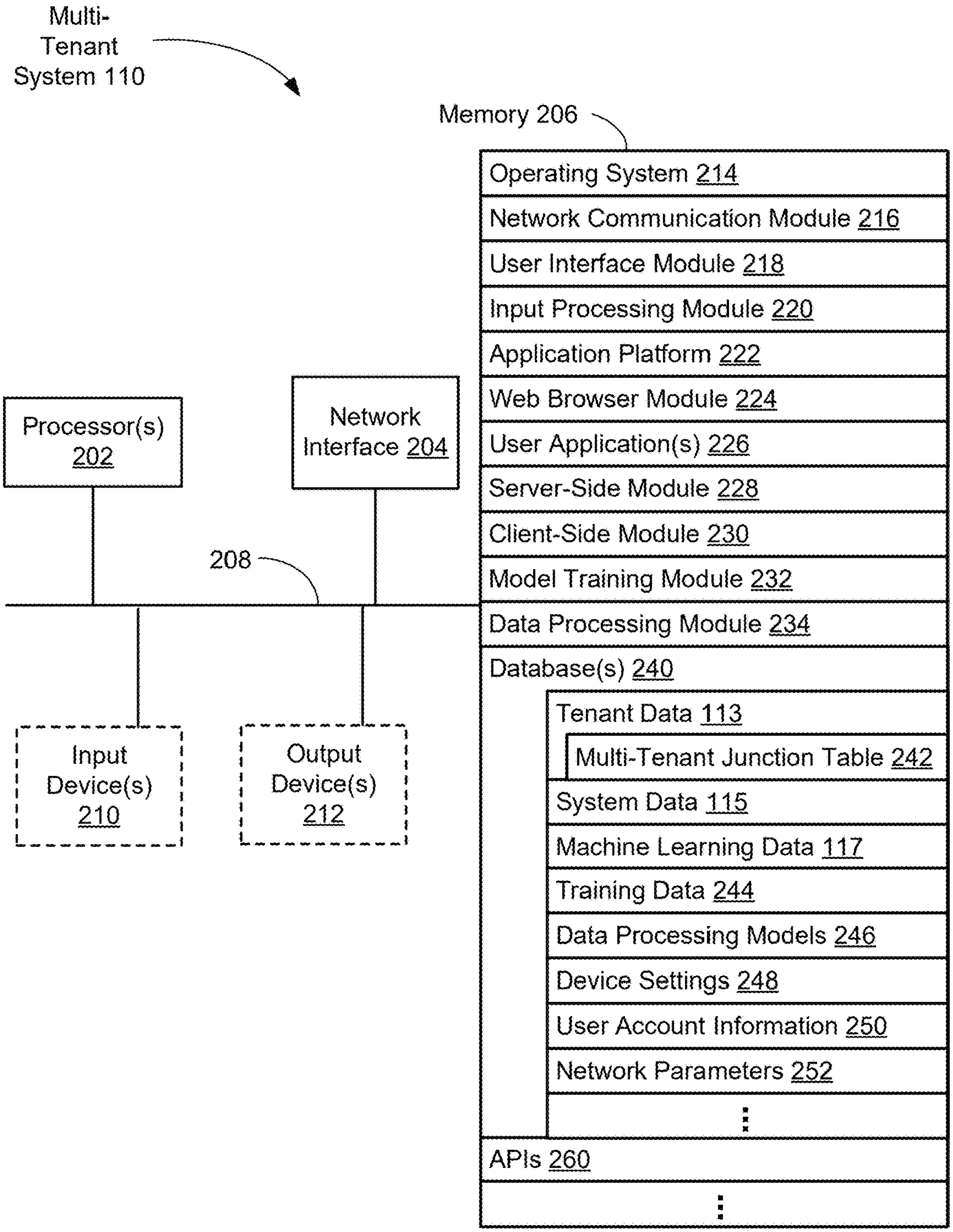
FIG. 2 provides a block diagram of a multi-tenant system, in accordance with some embodiments.

FIG. 2 is a block diagram of a multi-tenant system 110 (e.g., a computer system or a computer server), in accordance with some embodiments. The multi-tenant system 110 includes processor(s) 202 (e.g., one or more processing units or CPUs), one or more network interfaces 204, memory 306, and one or more communication buses 308 for interconnecting these components (sometimes called a chipset). In some implementations, the multi-tenant system 110 includes one or more input devices 210, which facilitate user input, such as a keyboard, a mouse, a voice-command input unit or microphone, a touch screen display, a touch-sensitive input pad, a gesture capturing camera, or other input buttons or controls. In some implementations, the multi-tenant system 110 uses a microphone and voice recognition or a camera and gesture recognition to supplement or replace the keyboard. In some implementations, the multi-tenant system 110 includes one or more cameras, scanners, or photo sensor units for capturing images. In some implementations, the multi-tenant system 110 includes one or more output devices 212, which enable presentation of user interfaces and display content, including one or more speakers and/or one or more visual displays.

The memory 206 includes high-speed random access memory, such as DRAM, SRAM, DDR RAM, or other random access solid state memory devices. In some implementations, the memory 206 includes non-volatile memory, such as one or more magnetic disk storage devices, one or more optical disk storage devices, one or more flash memory devices, or one or more other non-volatile solid state storage devices. In some implementations, the memory 206 includes one or more storage devices remotely located from the processing units 202. The memory 206, or alternatively the non-volatile memory within the memory 306206 includes a non-transitory computer readable storage medium. In some implementations, the memory 206, or the non-transitory computer readable storage medium of the memory 206, stores the following programs, modules, and data structures, or a subset or superset thereof:

- an operating system 214, which includes procedures for handling various basic system services and for performing hardware dependent tasks;
- a network communication module 216, which connects the multi-tenant system to other devices (e.g., various servers in the multi-tenant system, a client device 152, or an external data source 144) via one or more network interfaces 204 (wired or wireless) and one or more networks 140, such as the Internet, other wide area networks, local area networks, metropolitan area networks, and so on;
- a user interface module 218, which enables presentation of information (e.g., a graphical user interface for presenting applications, widgets, websites and web pages thereof, and/or games, audio and/or video content) at client device 152;
- an input processing module 220 for detecting one or more user inputs or interactions from one of the one or more input devices 210 and interpreting the detected input or interaction;
- an application platform 222 (e.g., application platform 120). In some embodiments, the application platform 222 is a framework of services that provides an environment for developing and running applications. In some embodiments, the application platform 222 enables the creation, management, and execution of one or more applications developed by the multi-tenant system 110, customers accessing the multi-tenant system 110 via tenant organizations 150, or third-party application developers accessing the multi-tenant system 110 via the tenant organizations 150. In some embodiments, the application platform 120 includes a unified data analytics platform that empowers users of tenant organizations with self-service analytics capabilities, allowing users to explore and visualize data independently for a multi-tenant cloud application;
- a web browser module 224 for navigating, requesting (e.g., via HTTP), and displaying websites and web pages thereof, including a web interface for logging into a user account associated with a client device 152 or another electronic device, controlling the client or electronic device if associated with the user account, and editing and reviewing settings and data that are associated with the user account;
- one or more user applications 226 for execution by the multi-tenant system 110 (e.g., customer relationship management (CRM) application, data analytics application, work applications, and/or other web or non-web based applications);
- a server-side module 228, which communicates both with operating environment 100 and with client-side module 230 and includes a plurality of individual programs, procedures, modules, and/or objects for performing a variety of functions;
- a client-side module 230, which communicates with the server-side module 228 in the operating environment 100 and includes a plurality of individual programs, procedures, modules, and/or objects for performing a variety of functions;
- model training module 232 for receiving training data and establishing one or more data processing models 246 for processing data from the multi-tenant system 110 and client devices 152;
- a data processing module 234 for processing data; and
- one or more databases 240 (e.g., tenant database 112, system database 114, machine learning database 116) for storing at least data including one or more of:
  - tenant data 113. In some embodiments, the tenant data 113 includes one or more multi-tenant junction tables 242;
  - system data 115;
  - machine learning data 117;
  - training data 244 for training one or more data processing models 246;

data processing model(s) 246 for processing data. In some embodiments, the data processing model(s) 246 can include artificial intelligence (AI) or machine learning (ML) models. In some embodiments, the data processing model(s) can include AI agents;

device settings 248 including common device settings (e.g., service tier, device model, storage capacity, processing capabilities, communication capabilities, etc.) of one or more servers or client devices;

user account information 250 for the one or more user applications 226, e.g., usernames, security questions, account history data, user preferences, and predefined account settings; and network parameters 252 for the one or more communication networks 140, e.g., IP address, subnet mask, default gateway, DNS server and host name; and APIs 260 for receiving API calls from one or more applications and application platforms, translating the API calls into appropriate actions, and performing one or more actions.

In various implementations, the models and/or modules described herein may be classification, predictive, generative, conversational, or another form of artificial intelligence (AI) technology, such as AI model(s), agents, etc., implementing one or more forms of machine learning, a neural network, statistical modeling, deep learning, automation, natural language processing, or other similar technology. The AI technology may be included as part of a network or system comprising a hardware- or software-based framework for training, processing, fine-tuning, or performing any other implementation steps. Furthermore, the AI technology may include a hardware- or software-based framework that performs one or more functions, such as retrieving, generating, accessing, transmitting, etc.

Moreover, the AI technology may be trained or fine-tuned using supervised, unsupervised, or other AI training techniques. In various implementations, the AI technology may be trained or fine-tuned using a set of general datasets or a set of datasets directed to a particular field or task. Additionally or alternatively, the AI technology may be intermittently updated at a set of interval or in real time based on resulting output or additional data to further train the AI technology. The AI technology may offer a variety of capabilities including text, audio, image, or content generation, translation, summarization, classification, prediction, recommendation, time-series forecasting, searching, matching, pairing, and more. These capabilities may be provided in the form of output produced by the AI technology in response to a particular prompt or other input. Furthermore, the AI technology may implement Retrieval-Augmented Generation (RAG) or other techniques after training or fine-tuning by accessing a set of documents or knowledge base directed to a particular field or website other than the training or fine-tuning data to influence the AI technology's output with the set of documents or knowledge base.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various embodiments. In some embodiments, the memory 206 stores a subset of the modules and data structures identified above. Furthermore, the memory 206 may store additional modules or data structures not described above. In some embodiments, a subset of the programs, modules, and/or data stored in the memory 206 is stored on and/or executed by client device 152.

Although FIG. 2 shows a multi-tenant system 110 (e.g., a computer system or server system), FIG. 2 is intended more as a functional description of the various features that may be present rather than as a structural schematic of the embodiments described herein. In practice, and as recognized by those of ordinary skill in the art, items shown separately could be combined and some items could be separated. In addition, some of the programs, functions, procedures, or data shown above with respect to a multi-tenant system may be stored or executed on a client device 152. In some embodiments, the functionality and/or data may be allocated between one or more client devices 152 and the multi-tenant system 110. Furthermore, one of skill in the art recognizes that FIG. 3 need not represent a single physical device. In some embodiments, the server functionality is allocated across multiple physical devices in a server system. As used herein, references to a "server" include various groups, collections, or arrays of servers that provide the described functionality, and the physical servers need not be physically colocated (e.g., the individual physical devices could be spread throughout the United States or throughout the world).

Figure 3:
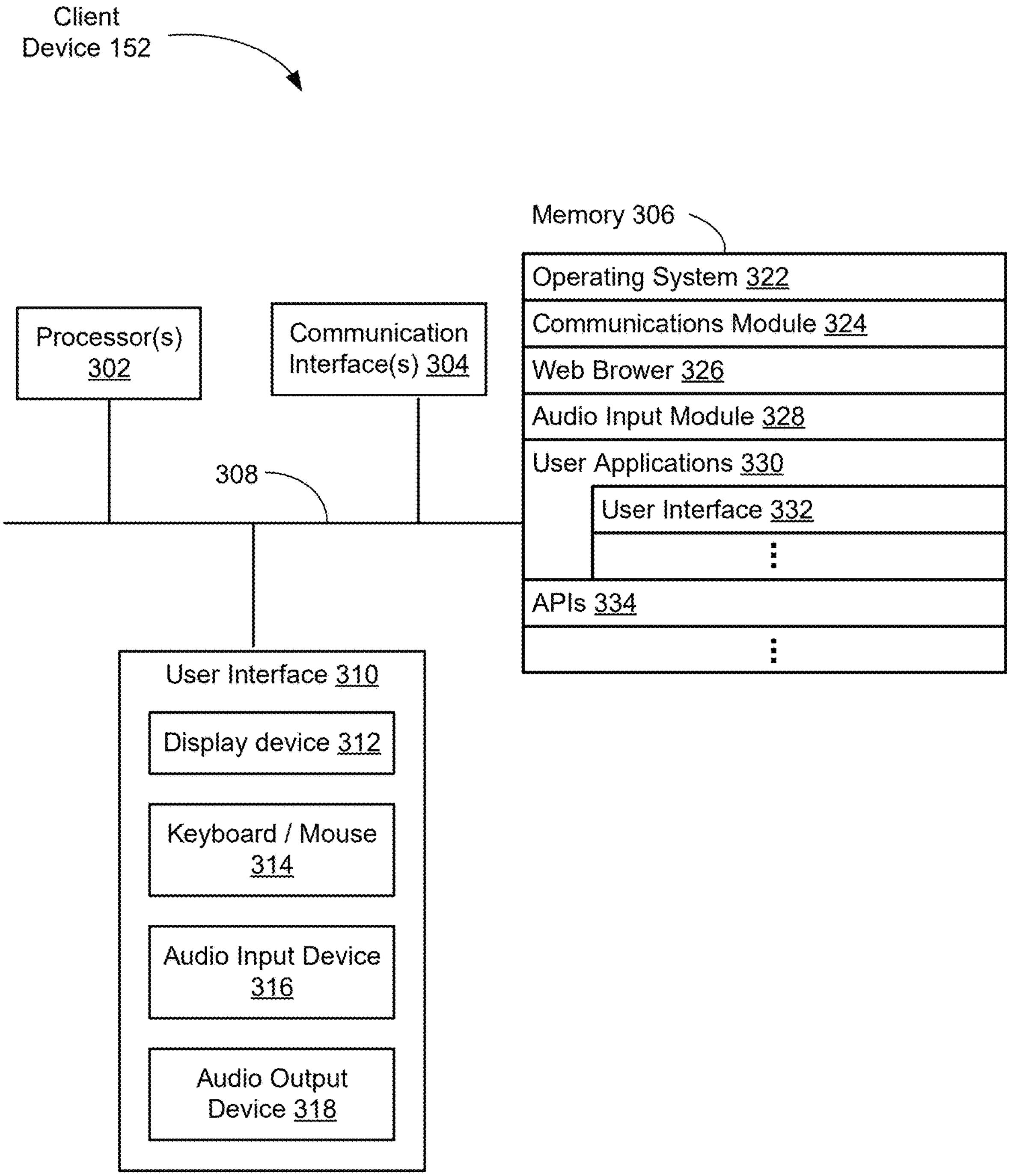
FIG. 3 provides a block diagram of a client device, in accordance with some embodiments.

FIG. 3 is a block diagram of a client device 152, in accordance with some embodiments. Various examples of the client device 152 include a desktop computer, a laptop computer, a tablet computer, and other computing devices that have a display and a processor capable of running user applications 330. In some embodiments, the client device 152 is a virtual reality (VR) device, an augmented reality (AR) device, or a spatial computing device that blends digital content with the physical world. The client device 152 typically includes one or more processing units (processors or cores) 302, one or more network or other communication interfaces 304, memory 306, and one or more communication buses 308 for interconnecting these components. In some embodiments, the communication buses 308 include circuitry (sometimes called a chipset) that interconnects and controls communications between system components.

The client device 152 includes a user interface 310. The user interface 310 typically includes a display device 312. Alternatively or in addition, in some embodiments, the display device 312 is a touch-sensitive display. In some embodiments, the touch-sensitive display is configured to detect various swipe gestures (e.g., continuous gestures in vertical and/or horizontal directions) and/or other gestures (e.g., single/double tap). In computing devices that have a touch-sensitive display, a physical keyboard is optional (e.g., a soft keyboard may be displayed when keyboard entry is needed). In some embodiments, the client device 152 includes input devices such as a keyboard or mouse 314. Some client devices 152 use a microphone voice recognition to supplement or replace the keyboard. In some embodiments, the client device 152 includes an audio input device 316 (e.g., a microphone) to capture audio (e.g., speech from a user). The client device 152 also includes an audio output device 318, such as speakers or an audio output connection connected to speakers, earphones, or headphones.

In some embodiments, the memory 306 includes high-speed random-access memory, such as DRAM, SRAM, DDR RAM, or other random-access solid-state memory devices. In some embodiments, the memory 206 includes non-volatile memory, such as one or more magnetic disk storage devices, optical disk storage devices, flash memory devices, or other non-volatile solid-state storage devices. In some embodiments, the memory 306 includes one or more storage devices remotely located from the processors 302. The memory 306, or alternatively the non-volatile memory devices within the memory 306, includes a non-transitory computer-readable storage medium. In some embodiments, the memory 306, or the computer-readable storage medium of the memory 306, stores the following programs, modules, and data structures, or a subset or superset thereof:

- an operating system 322, which includes procedures for handling various basic system services and for performing hardware dependent tasks;
- a communications module 324, which is used for connecting client device 152 to other client devices or the multi-tenant system 110 via the one or more communication interfaces 204 (wired or wireless), such as the Internet, other wide area networks, local area networks, metropolitan area networks, and so on;
- a web browser 326 (or other application capable of displaying web pages), which enables a user to communicate over a network with remote computers or devices;
- an audio input module 328 (e.g., a microphone module), which processes audio captured by the audio input device 220. The captured audio may be sent to a remote server (e.g., multi-tenant system 110) and/or processed by an application executing on the client device 152;
- one or more user applications 330. In some embodiments, the user applications 330 include one or more respective user interfaces 332 (e.g., also known as graphical user interfaces or GUIs); and
- APIs 334 for receiving API calls from one or more applications, translating the API calls into appropriate actions, and performing one or more actions.

In various implementations, the models and/or modules described herein may be classification, predictive, generative, conversational, or another form of artificial intelligence (AI) technology, such as AI model(s), agents, etc., implementing one or more forms of machine learning, a neural network, statistical modeling, deep learning, automation, natural language processing, or other similar technology. The AI technology may be included as part of a network or system comprising a hardware- or software-based framework for training, processing, fine-tuning, or performing any other implementation steps. Furthermore, the AI technology may include a hardware- or software-based framework that performs one or more functions, such as retrieving, generating, accessing, transmitting, etc.

Moreover, the AI technology may be trained or fine-tuned using supervised, unsupervised, or other AI training techniques. In various implementations, the AI technology may be trained or fine-tuned using a set of general datasets or a set of datasets directed to a particular field or task. Additionally or alternatively, the AI technology may be intermittently updated at a set of interval or in real time based on resulting output or additional data to further train the AI technology. The AI technology may offer a variety of capabilities including text, audio, image, or content generation, translation, summarization, classification, prediction, recommendation, time-series forecasting, searching, matching, pairing, and more. These capabilities may be provided in the form of output produced by the AI technology in response to a particular prompt or other input. Furthermore, the AI technology may implement Retrieval-Augmented Generation (RAG) or other techniques after training or fine-tuning by accessing a set of documents or knowledge base directed to a particular field or website other than the training or fine-tuning data to influence the AI technology's output with the set of documents or knowledge base.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various embodiments. In some embodiments, the memory 306 stores a subset of the modules and data structures identified above. Furthermore, the memory 306 may store additional modules or data structures not described above. In some embodiments, a subset of the programs, modules, and/or data stored in the memory 306 is stored on and/or executed by a server system (e.g., multi-tenant system 110).

Although FIG. 3 shows a client device 152, FIG. 3 is intended more as a functional description of the various features that may be present rather than as a structural schematic of the embodiments described herein. In practice, and as recognized by those of ordinary skill in the art, items shown separately could be combined and some items could be separated. In addition, some of the programs, functions, procedures, or data shown above with respect to client device 152 may be stored or executed on a server system such as the multi-tenant system 110.

I. Workspaces for Unified Data Analytics

A tenant organization (e.g., also referred to herein as an organization) can include personas such as an administrator (e.g., also known as an admin persona) and an analyst (e.g., analyst persona). The administrator is responsible for managing, maintaining, and securing the organization's databases. For example, the administrator ensures that data is stored correctly, is accessible to authorized users, and runs efficiently by setting up, configuring, monitoring, and optimizing database systems. In some instances, the administrator also implements security measures and backup procedures to protect sensitive information. The analyst's primary responsibility is to optimize the organization's data and its output. For example, the analyst can create and implement databases, ensure that databases are properly maintained, analyze data, create dashboards, reports, and visualizations to communicate findings to stakeholders.

In accordance with some embodiments, multi-tenant system 110 includes a unified data analytics platform (e.g., Data Cloud) that unifies all of a tenant organization's customer data from different sources. The unification creates a single, unified view of each customer across all channels, enabling better personalization, automation, and informed decision-making across different teams such as sales, marketing, and service. In some embodiments, the unified data analytics platform is used to implement semantic data models, enabling the integration of data from various sources and creating a unified view of customer information.

Figure 4:
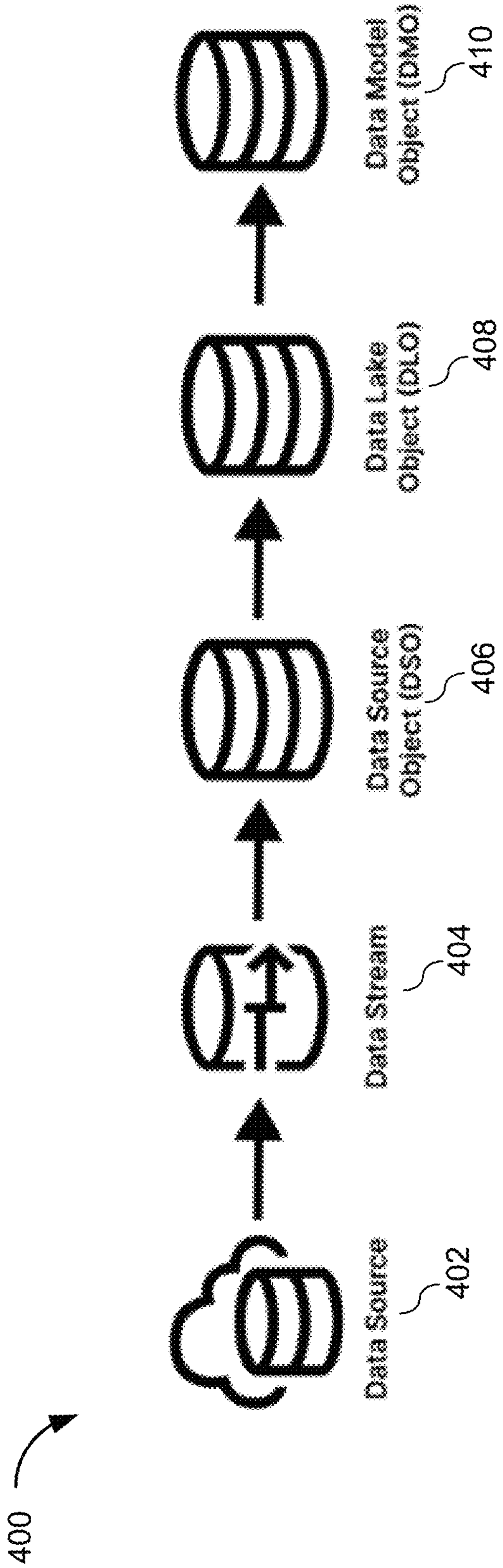
FIG. 4 illustrates an architecture for data flow in a unified data analytics platform, in accordance with some embodiments.

FIG. 4 illustrates an architecture 400 for data flow in a unified data analytics platform, in accordance with some embodiments. FIG. 4 is extracted from cloudkettle.com/blog/salesforce-data-cloud-model-explained, the contents of which are incorporated by reference herein in its entirety. In FIG. 4, a data source 402 is the initial data layer used by the unified analytics platform. In some embodiments, data source 402 represents a platform or system where the data originates from. These sources can be data analytics platforms (e.g., Salesforce platforms), object storage platforms (e.g., Amazon S3, Microsoft Azure Storage and Google Cloud Storage), ingestion APIs and connector software development kits (SDKs) to programmatically load data from websites, mobile apps and other systems, and secured FTP for file based transfer.

A data stream 404 is an entity that can be extracted from data source 402. A single data source 402 can contain multiple data streams 404. For instance, "Orders" and "Shipments" are example data streams that can be extracted from data source called Commerce Cloud. The data stream 404 is ingested to a data source object (DSO) 406. DSO 406 provides a physical, temporary staging data store that contains the data in its raw, native file format of the data stream 404 (e.g., a CSV file). Formulas can be applied to perform minor transformations on fields at time of data ingestion.

With continued reference to FIG. 4, the next data object in the data flow is the data lake object (DLO) 408. A DLO is a container that holds the data that is brought into the data cloud. DLO 408 is the first object that is available for inspection and enables users to prepare their data by mapping fields and applying additional transformations. DLO 408 provides a physical store and it forms the product of a DSO (and any transformation).

Data model objects (DMOs), such as DMO 410, are groupings of data created from data streams, insights, and other sources. Unlike DSO 406 and DLO 408, which use a physical data store, a DMO enables a virtual, non-materialized view into the data lake. The result from running a query associated with a view is not stored anywhere and is always based on the current data snapshot in the DLOs. Attributes within a DMO 410 can be created from different data streams 404, calculated insights (CI), and other sources.

In accordance with some embodiments, administrators and analysts can work in one or more "workspaces" within an organization (also known as a shared primary organization). As used herein, a "workspace" refers to a collaborative and dynamic analytic environment where all the different steps of an analytic process are assembled and accessible to meet a business outcome. In some embodiments, a workspace includes of entities relevant to the authoring experience of an analyst of the unified data analytics platform.

Figure 5:
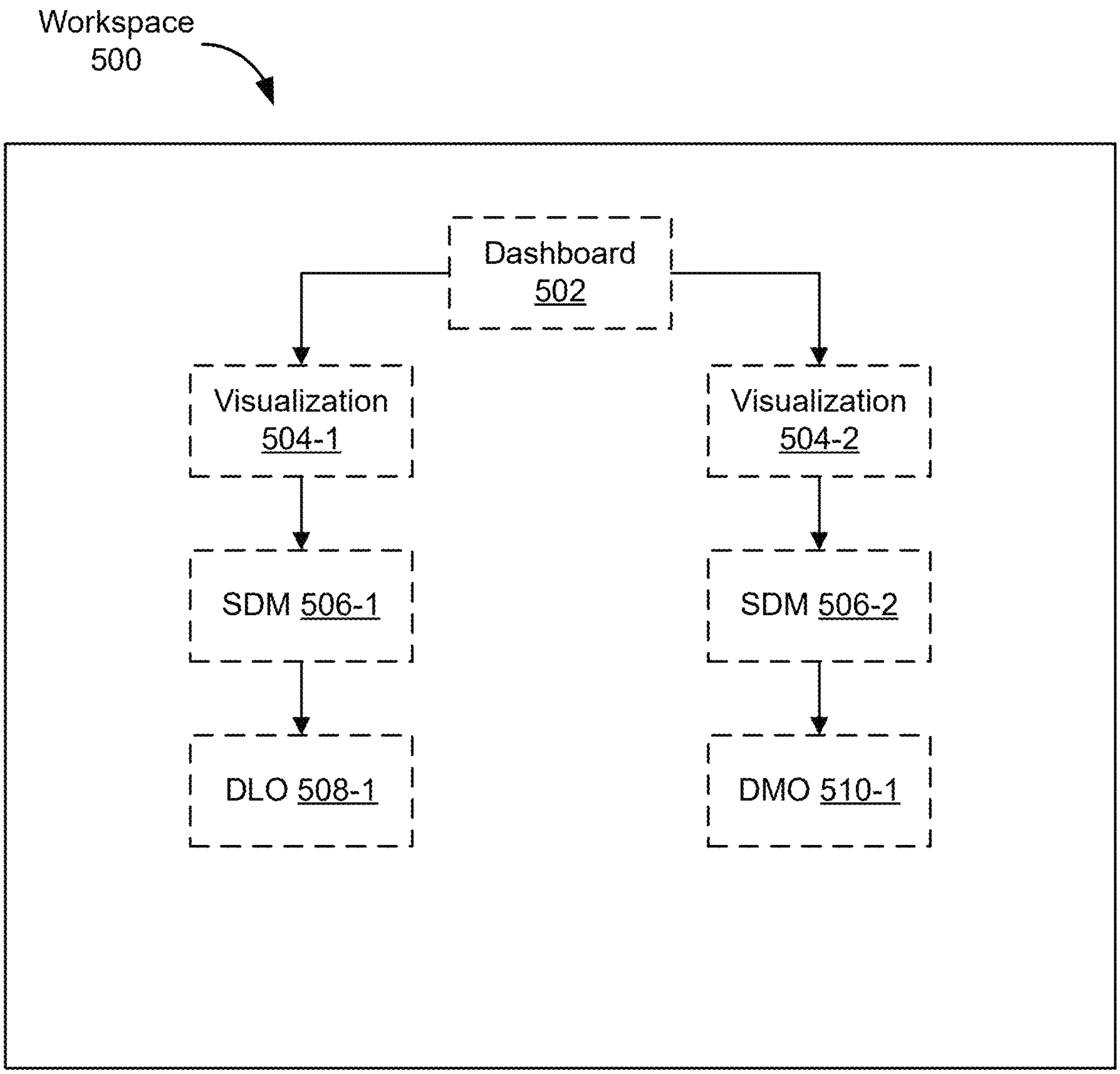
FIG. 5 is a block diagram illustrating an example metadata landscape for a workspace, in accordance with some embodiments.

FIG. 5 is a block diagram illustrating an example metadata landscape for a workspace 500, in accordance with some embodiments. A workspace is a collection of analytic components (e.g., data dashboards), visualization components (e.g., metrics and visualizations), semantic components (e.g., semantic data models and metric definitions), and data components (e.g., data model objects or data lake objects). As used herein, a visualization is single graphical representation of information and data. A dashboard (or data dashboard) is a way of displaying various types of visual data in one place. A dashboard can include one or more visualizations. A semantic model is a logical view of the data and relationships, and is separate from the physical data structure. A metric is a quantifiable measure that is used to track, compare, and assess performance or business processes. In the example of FIG. 5, workspace 500 includes a dashboard 502 having two visualizations 504-1 and 504-2. Visualization 504-1 is created according to data fields and data values whose meanings (e.g., semantics, relationships, and/or hierarchies) are assigned according to semantic data model (SDM) 506-1. A SDM provides a logical view of the data and relationships, and is separate from the physical data structure. SDM 506-1 is mapped to DLO 508-1, which provides the raw data for the visualization 504-1.

With continued reference to FIG. 5, visualization 504-2 is created according to data fields and data values whose meanings (e.g., semantics, relationships, and/or hierarchies) are assigned according to SDM 506-2. Note that SDM 506-1 and 506-2 may be the same SDM or they may be different SDMs. The source of the data for SDM 506-2 is DMO 510-1.

In some embodiments, a workspace is similar to a workbook (e.g., Tableau workbook) that organizes and stores data visualizations and models. However, unlike a notebook, a workspace promotes reuse of individual components inside the workspace. In some embodiments, a workspace is not an owner of the components it holds; the components are persisted at the organization level. Architecturally, workspaces are an organization construct that will contain state for collaborative editing.

In some embodiments, a workspace is a governed workspace that is created in an administrator-managed organization (e.g., governed organization). In some embodiments, a workspace is an ungoverned workspace that is created by an analyst in an analyst-managed organization.

Figure 6:
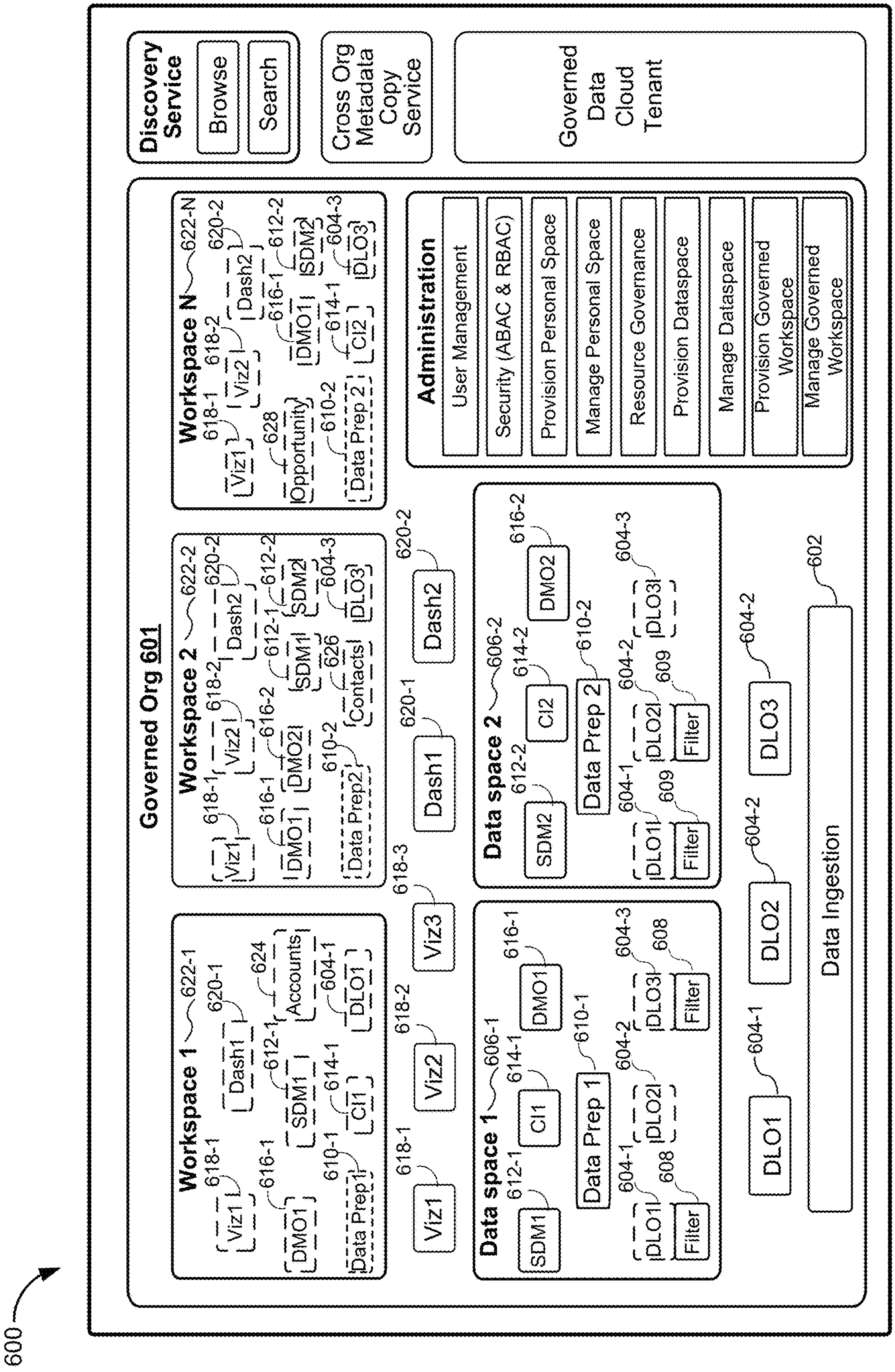
FIG. 6 is a block diagram illustrating the layout of a governed organization, in accordance with some embodiments.

FIG. 6 is a block diagram illustrating the layout 600 of a governed organization 601, in accordance with some embodiments. In FIG. 6, objects or components that are "owned" are represented by solid lines whereas objects that are referenced are represented by dashed lines.

In FIG. 6, data is ingested (602) into Data Cloud and represented as data lake objects (DLOs) such as a first DLO (DLO 1 604-1), a second DLO (DLO 2 604-2), and a third DLO (DLO 3 604-3). A DLO can be associated with (e.g., to) one or more data spaces, such as data space 1 606-1 and data space 2 606-2. A data space is a virtual grouping of data, allowing for logical separation and access control based on specific needs or projects. A data space is a logical partition to organize the data for profile unification, insights, and marketing in Data Cloud. In some embodiments, data spaces 606 can be used to segregate data, metadata, and processes into categories such as brand, region, or department. In some embodiments, Users can see and work on data only in the context of their category. In some embodiments, data can also be merged and analyzed in data spaces 606.

In the example of FIG. 6, DLO 604-1, DLO 604-2, and DLO 604-3 are associated with data space 606-1, with filters 608 being applied to DLO 604-1 and DLO 604-3. Data within data space 606-1 is prepared according to data preparation model 1 610-1. Data space 1 606-1 also includes semantic data model (SDM) 612-2, calculated insights (CI) 614-1, and DMO 616-1. A semantic data model provides the "meaning" behind the data within a data space, allowing for meaningful data exchange across different organizations and systems. A CI can be used to define and calculate multi-dimensional metrics from their digital state. As an example, if an organization has orders data coming from their website as well as from physical stores, the data can have slightly different schemas. The different order sources will comprise the DLOs, but the organization can map them to a single organized model called "sales order," which can be represented as a data model object representing sales data coming from both the sources.

In the example of FIG. 6, DLO 604-1, DLO 604-2, and DLO 604-3 are also associated with data space 606-2, with filters 609 being applied to DLO 604-1 and DLO 604-2. Data within data space 606-2 is prepared using data preparation model 610-2. Data space 606-2 also includes SDM 612-2, CI 614-2, and DMO 616-2.

In some embodiments, visualizations 618 (e.g., visualization 618-1 to 618-3) and dashboards 620 (e.g., dashboard 620-1 and dashboard 620-2) are stored at the organization level, as illustrated in FIG. 6.

In some embodiments, an organization can include or more workspaces 622, such as workspace 622-1, workspace 622-2, and workspace 622-N, as illustrated in FIG. 6. A workspace can include (e.g., reference) one or more workspace components, such as one or more DLOs 604, objects from one or more data spaces 606, visualizations 618, and/or dashboards 620 that are stored at the organization level, or other objects such as objects from one or more object models of the governed organization (e.g., accounts object 624, contacts object 626, and opportunity object 628). In some embodiments, each of the objects within a workspace is also referred to as a component or a workspace component.

Using the workspace 2 622-2 in FIG. 6 as an example, workspace 622-2 includes (e.g., references) DLO 604-3; SDM 612-1 and DMO 616-1 from data space 606-1; data preparation 610-2, SDM 612-2, and DMO 616-2, which originate from data space 606-2. Workspace 622-2 also includes visualization 618-1, visualization 618-2, and dashboard 620-2, which originate from the organization. Workspace 622-2 further includes a contacts object 626.

In accordance with some embodiments, workspaces are implemented to optimize the respective workspace components for reusability.

In some embodiments, a DMO 616 is stored in one and only one data space, but can be included (e.g., used or reused) in multiple workspaces. This is illustrated by DMO 616-1, which is included in only one data space (i.e., data space 606-1) but used in both workspace 622-1 and workspace 622-N.

In some embodiments, a SDM 612 is stored in one and only one data space, but can be included (e.g., used or reused) in multiple workspaces. This is illustrated by SDM 612-1, which is included in only one data space (i.e., data space 606-1) but used in both workspace 622-1 and workspace 622-2.

In some embodiments, a data preparation model 610 is stored in one and only one data space, but can be included (e.g., used or reused) in multiple workspaces. This is illustrated by data preparation model 610-2, which is included in only one data space (i.e., data space 606-2) but used in both workspace 622-2 and workspace 622-N.

In some embodiments, a data visualization 618 is stored at the organization level but can be included (e.g., used or reused) in multiple workspaces. For example, FIG. 6 shows that visualization 618-1 is included in multiple workspaces such as workspace 618-1, workspace 618-2, and workspace 618-N.

In some embodiments, a dashboard 620 is stored at the organizational level but can be included (e.g., used or reused) in multiple workspaces. For example, dashboard 620-2 is included in workspace 622-2 and workspace 622-N.

In some embodiments, to cater the authoring experience for unified analytics components through a workspace, the metadata of a workspace is stored at the component level (i.e., the metadata is stored to each component in the workspace).

In some embodiments, visualizations and dashboards can exist without a workspace since they are stored at the organization level. This is illustrated in FIG. 6. However, in some embodiments, the unified data analytics platform can be configured configure the workspaces product such that the process of editing a visualization start from the workspace or independently.

A workspace 622 is not a data space 606. This is illustrated in FIG. 6. A data space is a large container of all Data Cloud metadata, used to create large partitions that makes sense at a brand or department level.

Workspaces are not scoped to data space. The primary driver for this is dashboard use cases in the governed organization, where an analyst would like to see side by side views of data across multiple workspaces without joining them.

Workspaces do not have to be "aware" of dataspaces directly. But indirectly they will be aware of dataspaces, as the first step while working in a workspace is choosing an SDM which is a dataspace controlled entity.

In some embodiments, deleting a workspace will optionally delete all the components that were assigned to that primary workspace. In some embodiments, impact analysis or lineage views are integrated in the workspace view to educate the analyst on the impact of components outside the primary workspace. Some embodiments leverage data catalog or GraphQL for understanding the lineage.

In some embodiments, a workspace 622 is created by an administrator, and additional users can be invited (e.g., by the administrator) to collaborate on the same workspace. In some embodiments, a workspace 622 can be created by a user (e.g., an analyst) who does not have administrative rights. For example, an administrator can assign user permission to create workspaces. In some instances, the organization can create a policy to allow workspace creators access to the workspace they created. In some embodiments, inviting a user to collaborate in a workspace will mean inviting the user to a personal organization or a team space organization.

In some embodiments, a workspace can have its own access control mechanism. For example, if User A is granted access to a particular workspace, the administrator or owner of that workspace can control access of User A such that User A can only create new visual elements but cannot delete existing visual elements. In some embodiments, workspace access control will optionally be propagated to the components that originated in the workspace. In some embodiments, each component of the workspace can have its own access control.

In some embodiments, a workspace asset includes its own user-level access control for creating, reading, updating, and deleting. Assets will be managed via permission sets. Once a permission set for an asset type is assigned to the user, they would get that permission for all assets of that type. As an example, granting view on Visualization will grant the user ability to view all Visualizations.

In some embodiments, a workspace can include the concepts of versioning and publishing. Versioning workspaces requires versioning underlying components.

In some embodiments, workspaces in a governed organization can contain components across different data spaces. For example, FIG. 6 shows that workspace 622-N includes components from both data space 606-1 (e.g., DMO 1 616-2) and data space 606-2 (e.g., SDM 612-2). In some embodiments, at the data level, there is no support for cross data space queries. Workspaces can contain dashboard with visualizations built on top of SDM's contained in different data spaces. These do not join data, but allow a user to see visualizations side-by-side.

In some embodiments, a workspace 622 includes a respective graphical user interface (GUI) (e.g., user interface 332) that displays a list view and a lineage view of the underlying components of the workspace. In some embodiments, editing or viewing a component opens a new tab in the workspace GUI.

In some embodiments, workspaces include two entities "workspace" and "workspace component." "Workspace" is the setup entity and stores workspace metadata (e.g., name, description, and WorkspaceUsageType). WorkspaceUsageType is an enumeration (enum or user-defined) data type that that defines a set of named values (enumerators) that can be assigned to a variable.

Figure 7:
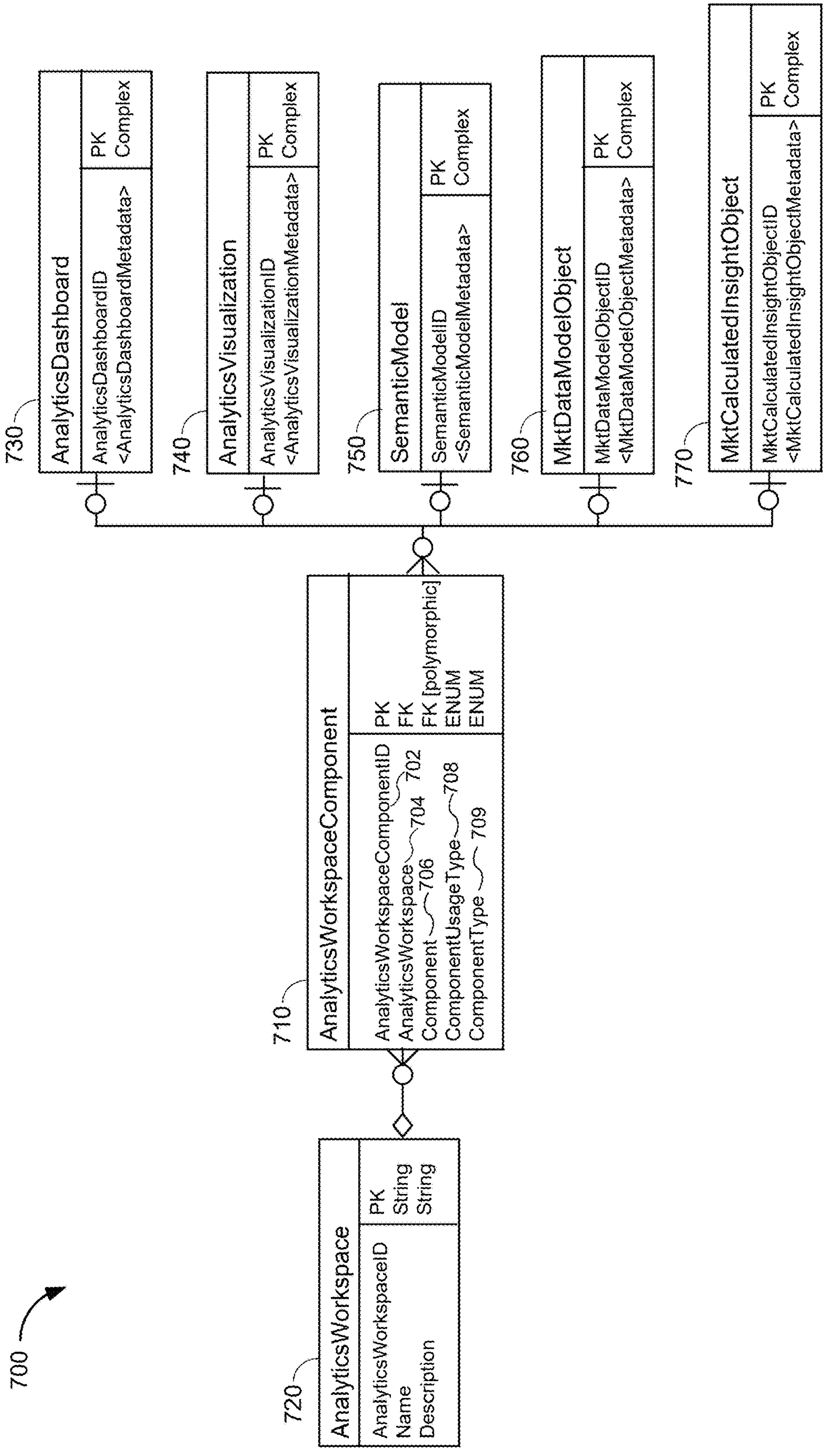
FIG. 7 is an entity relationship diagram illustrating relationships between various database tables, in accordance with some embodiments.

FIG. 7 is an entity relationship diagram (ERD) 700 illustrating relationships between the database tables Analytics WorkspaceComponent 710, Analytics Workspace 720, AnalyticsDashboard 730, Analytics Visualization 740, SemanticModel 750, MktDataModelObject 760, and MktCalculatedInsightObject 770. In some embodiments, the Analytics WorkspaceComponent 710 is a junction table that is implemented to store the membership information of the "Workspace component" entity. The database table Analytics WorkspaceComponent 710 (also referred to herein as "junction table 710") acts as an intermediary to link the database tables 720, 730, 740, 750, 760, and 770, and manages and tracks relationships between the various objects and entities in these tables.

The junction table 710 includes a Analytics WorkspaceComponentID column 702, an Analytics Workspace column 704, a Component column 706, a ComponentUsageType column 708, and a ComponentType column 709. The Analytics WorkspaceComponentID column 702 is a primary key that uniquely identifies each row in the junction table 710. The Analytics Workspace column 704 is a foreign key (FK) that references the primary key of the Analytics Workspace table 720. The Component column 706 is a polymorphic foreign key that can be associated with multiple types of records. In other words, the Component column 706 acts as a bridge between multiple tables (e.g., AnalyticsDashboard table 730, Analytics Visualization table 740, SemanticModel table 750, MktDataModelObject table 760, and MktCalculatedInsightObject table 770), enabling a record in the junction table 710 to be linked to records in the multiple other tables.

The ComponentUsageType column 708 has an enumeration (enum) data type that defines a set of values that can be assigned to the variable (e.g., data field) "component usage type." In accordance with some embodiments, the set of values that can be assigned to the data field "component usage type" includes the values "created" and "referenced." The value "created" refers to all the components that were created in the context of a current workspace. The value "referenced" refers to all the components that were created somewhere else but are used in the current workspace.

The ComponentType column 709 has an enumeration (enum) data type, which defines a set of values that can be assigned to the variable "component type." In some embodiments, the values include "Analytics Dashboard," "Analytics Visualization," "Semantic Model" (e.g., SDM), "Data Model Object" (e.g., DMO), "Data Lake Object" (e.g., DLO), "Calculated Insight" (e.g., CI), "Metrics," and "Scoped Metrics."

Figure 8:
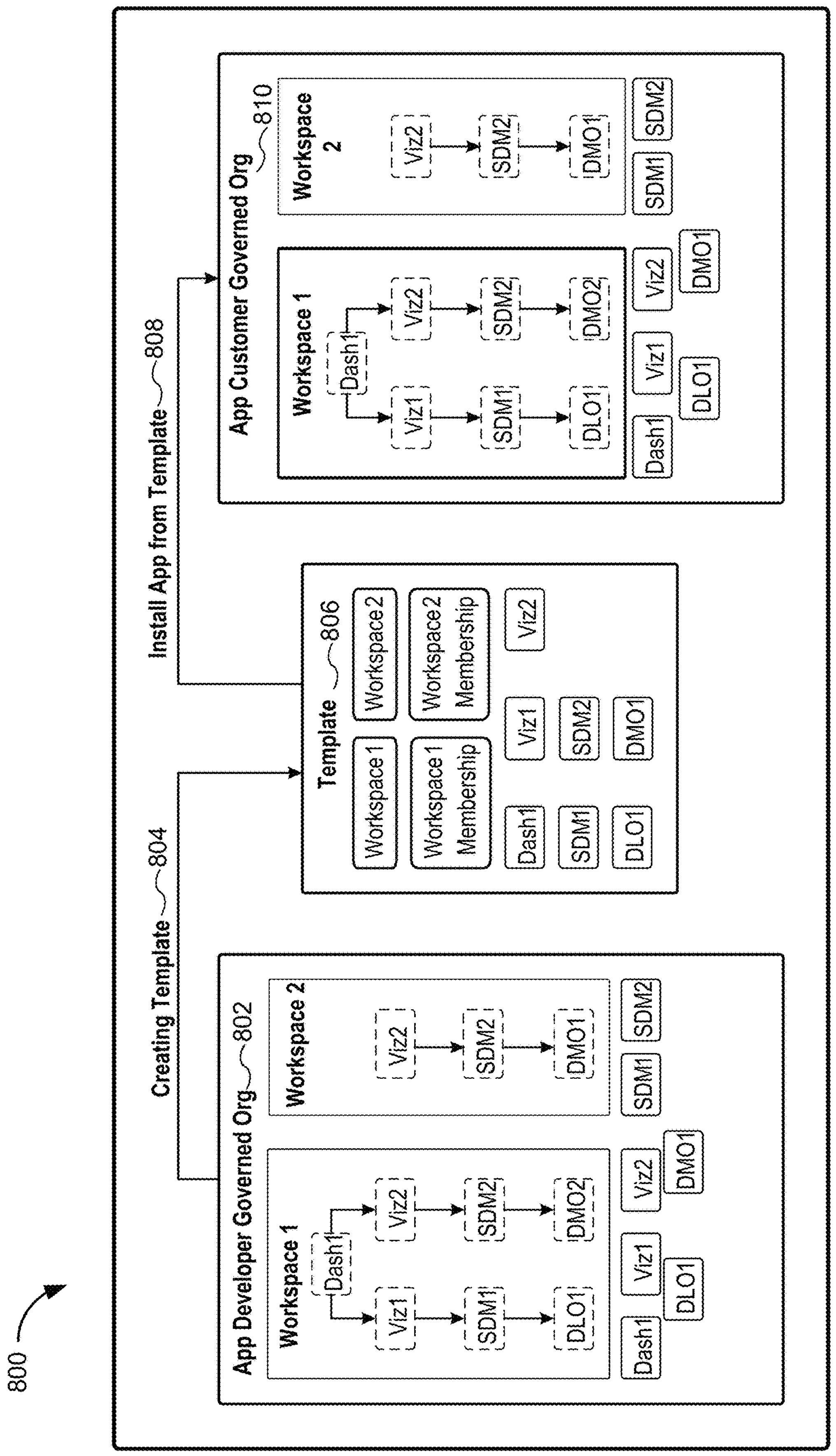
FIG. 8 illustrates an exemplary workflow for creating a workspace template, in accordance with some embodiments.

In some embodiments, a workspace can be created using a template. FIG. 8 illustrates an exemplary workflow 800 where a workspace template 806 is created (804) by an app developer governed organization. The template can be downloaded or installed (808) on one or more client devices (e.g. client devices 152) of an app customer governed organization 810 (e.g., tenant organization 150).

II. Isolated, Administered Environments for Self-Managed Work Encapsulation

In accordance with some embodiments of the present disclosure is the realization that there is a need for the multi-tenant system (e.g., unified data analytics platform) to provide tenant organizations with a single source of truth of data and metadata, which requires high administration.

At the same time, in some scenarios analysts within tenant organizations may require an isolated but connected environment. "Isolated" means that an analyst can bring in new data without fear of disrupting data in production or data or metadata that make up the single source of truth. "Connected" means that the analyst can access at least part of the data (e.g., visualization, dashboards, and/or other objects) from the tenant organization, reuse the data (e.g., without copying the data) in their isolated environment, and create new data artifacts (e.g., new data visualizations) from the data. In the isolated but connected environment, the analysts can develop and develop and build insights, which may be for personal use by the analysts or may be shared with others. In some instances, insights that are developed in the isolated environments can be promoted into that single source of truth.

As described above, a tenant organization can include personas such as an administrator (e.g., also known as an admin persona) and an analyst (e.g., analyst persona). In accordance with some embodiments, a multi-tenant system includes a unified data analytics platform that grants every employee in a tenant organization the ability to harness analytics through a self-service framework. For example, the unified data analytics platform can include improved self-service analytics capabilities in areas such as document management, sharing, and governance. The improved self-service analytics capabilities can empower analysts for self-service, without the need for approval from the administrators.

As disclosed, in some embodiments, the unified data analytics platform supports the creation of individual/team "spaces," which are equivalent to (e.g., correspond to) the isolated but connected environments as described above. In some embodiments, the individual/team spaces are also known as "ungoverned space", "personal space," "personal organization" "analyst organization" or "analyst managed organization." The individual/team spaces are separate from the central enterprise managed "space."

As used herein, in some embodiments, the term "admin managed organization" is the central enterprise managed space. In some embodiments, the "admin managed organization" is also known as super organization, main organization, governed organization or governed space. An organization, or "org", can include customer data, metadata, and integrated applications. Orgs can be made up of components like objects, fields, pages, Apex code, triggers, and business logic.

As disclosed, the benefits of the self-service framework include (i) lower barriers-to-entry for adopting the unified data analytics platform, (ii) lower barriers for establishing Copilot experiences, and (iii) simplification and improvement of the administrative experience.

Figure 9:
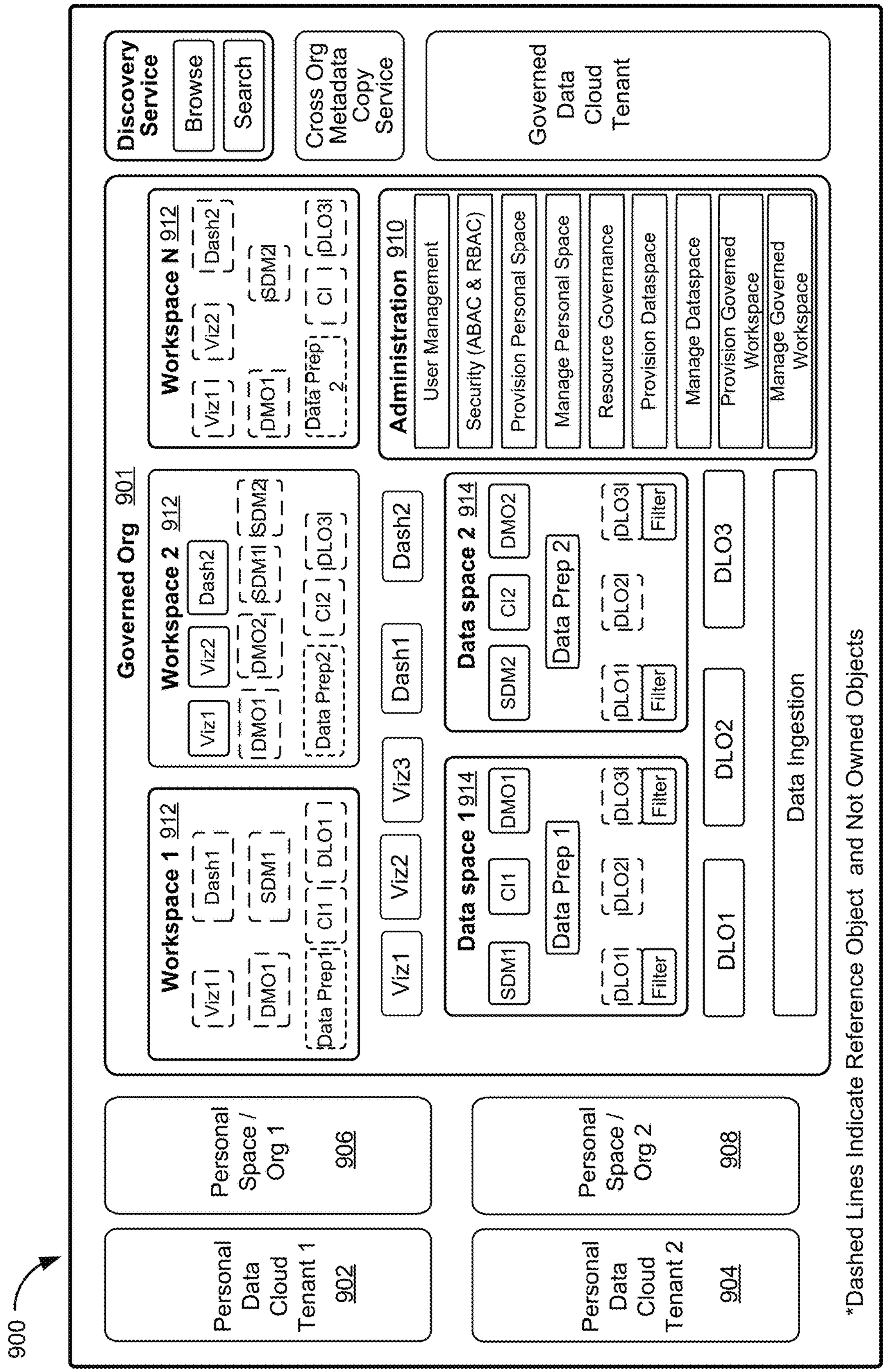
FIG. 9 is a block diagram illustrating a topology of an admin managed organization, in accordance with some embodiments.

FIG. 9 is a block diagram illustrating a topology 900 of an admin managed organization 901 (e.g., a governed organization), in accordance with some embodiments. The topology is similar to the layout 600 of a governed organization as described in FIG. 6. For example, the admin managed organization 901 includes workspaces 912 having the same functionalities as workspaces 622 and includes data spaces 914 having the same functionalities as data spaces 606. Unlike the layout 600, the topology 900 includes personal data clouds and personal spaces, such as Personal Data Cloud Tenant 1 902, Personal Data Cloud Tenant 2 904, Personal Space/Org 1 906, and Personal Space/Org 2 908.

In some embodiments, the admin managed organization is the main organization where the unified data analytics functionalities get provisioned. All users are be added as users to this organization. In the admin managed organization, analysts work within all the existing data access controls that has been established by the organization administrator. Analysts can create new DMOs/DLOs if they are additionally assigned data cloud admin permission set. Analysts follow existing conventions of an org and data clouds access controls mechanism. In some embodiments, analysts can create visualizations on existing SDMs. In some embodiments, analysts can create SDMs in the data spaces they have access to. In some embodiments, an admin managed organization can have one or more data spaces (e.g., data spaces 914 or 606). In some embodiments, an admin managed organization can have one or more workspaces (e.g., workspaces 912 or 622). In some embodiments, an admin managed organization can have at least 100, 500, 1000, 5000, 10000, or 50000 workspaces.

Figure 10:
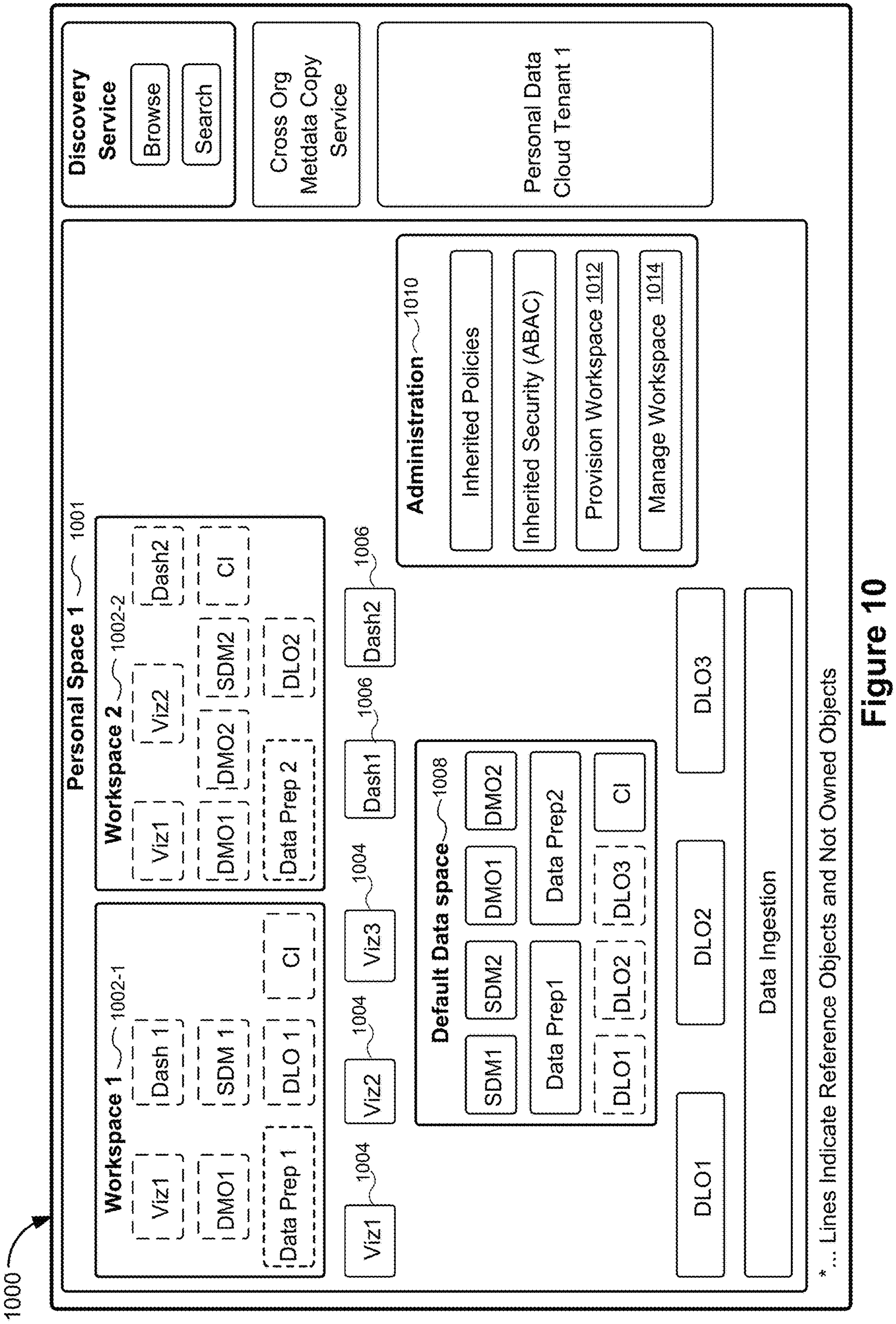
FIG. 10 is a block diagram illustrating a topology of a personal space, in accordance with some embodiments.

FIG. 10 is a block diagram illustrating a topology 1000 of a personal space 1001, in accordance with some embodiments. The personal space 1001 is also known as an ungoverned organization. The topology 1000 includes one or more workspaces 1002 (e.g., workspace 1002-1 and workspace 1002-2), one or more visualizations 1004, one or more dashboards 1006, and a default dataspace 1008 that includes data cloud DLOs, DMOs, SDMs, CIs, and metrics. Some of the DLOs, DMOs, SDMs, CIs, and metrics can be from the admin managed organization. In some embodiments, an analyst is the administrator of the personal space 1001. In some embodiments, the workspaces 1002 are also referred to as ungoverned workspaces (because they are workspaces in an ungoverned organization). In some embodiments, the personal space includes a set of administrative privileges 1010 that includes provisioning workspaces (1012) in the personal space and managing workspaces (1014) in the personal space. In some embodiments, the set of administrative privileges 1010 is more limited (e.g., has fewer privileges) compared to the set of administrative privileges 910 that are given to an administrator of an admin managed organization. In the personal space 1001, analysts can work in one or more "ungoverned" or "personal" organizations (e.g., personal space), where they can import their own data and use the resources offered by the unified data analytics platform without having to coordinate with the administrators. Work that is performed by the analyst in the ungoverned organizations do not impact other analysts or end-user flow of work in the organization.

In the ungoverned organization, the analyst has access to the datasets in the governed environment, and reuse them in the isolated environment of the ungoverned organization to build visualizations and dashboards.

Figure 11:
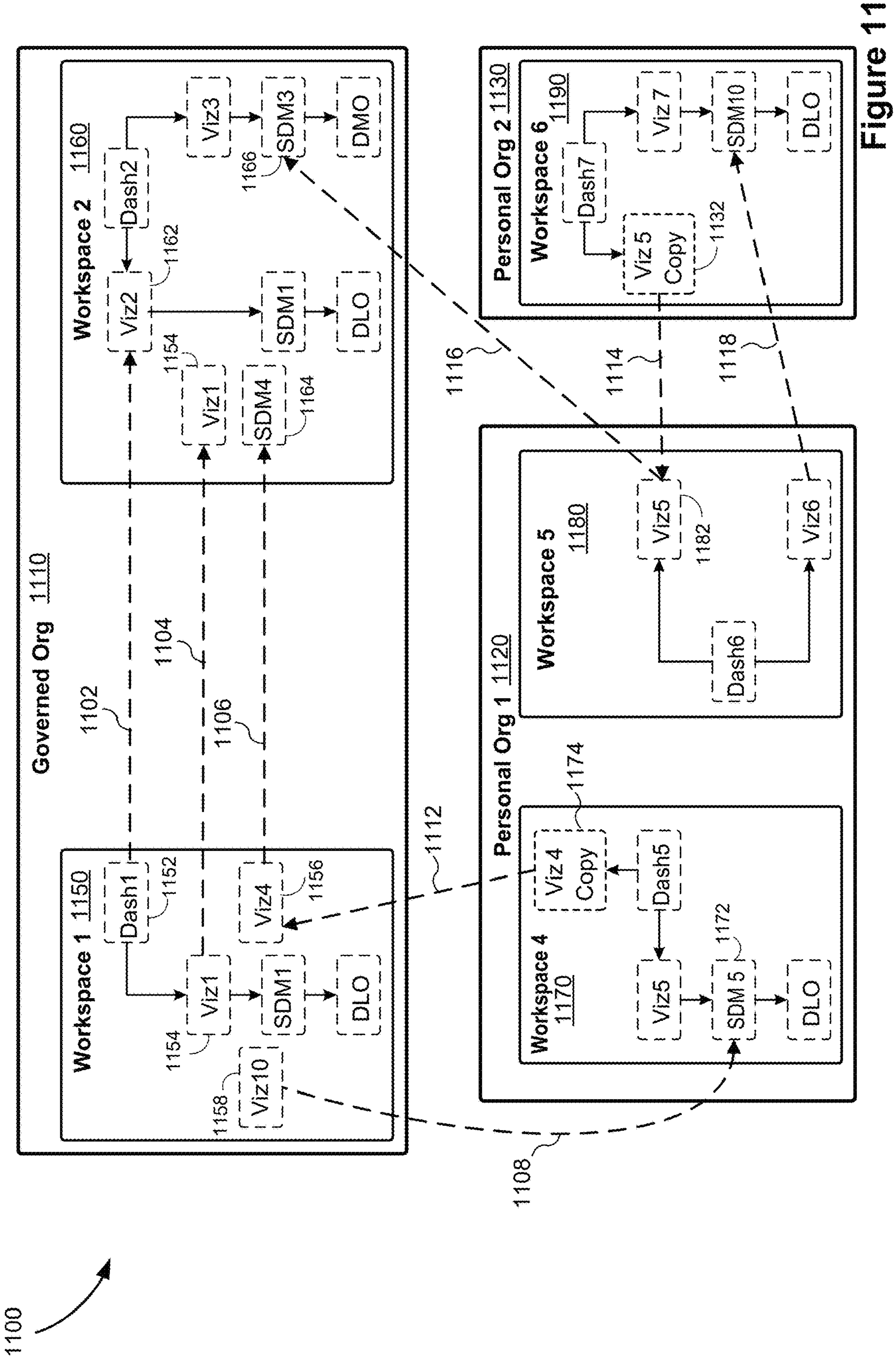
FIG. 11 is a block diagram illustrating rules for sharing across organizations, in accordance with some embodiments.

FIG. 11 is a block diagram 1100 illustrating rules for sharing across organizations, in accordance with some embodiments. The example of FIG. 11 shows a governed organization 1110, a personal organization 1120 and a personal organization 1130. The governed organization 1110 includes workspace 1150 and workspace 1160. The personal organization 1120 includes workspace 1170 and workspace 1180. The personal organization 1130 includes workspace 1190.

Arrow 1102 illustrates that dashboard 1152 in workspace 1150 reuses visualization 1162 in workspace 1160. This is permissible because visualization 1162 is reused across workspaces in the same organization (i.e., governed organization 1110).

Arrow 1104 illustrates that visualization 1154 is reused in both workspace 1150 and workspace 1160. This is permissible because workspace 1150 and workspace 1160 belong to the same organization (i.e., governed organization 1110).

Arrow 1106 illustrates that visualization 1156 in workspace 1150 is generated using semantics of semantic data model (SDM) 1164 that is included in workspace 1160. This is permissible because workspace 1150 and workspace 1160 belong to the same organization (i.e., governed organization 1110).

Arrow 1108 illustrates a scenario where visualization 1158 in workspace 1150 is generated using semantics of semantic data model (SDM) 1172 that is included in workspace 1170 of personal organization 1120. This is not permissible because a personal SDM from a personal organization, such as SDM 1172, should not be reused (e.g., shared) in a governed organization. Some embodiments introduce a promotion process where components from an ungoverned organization (e.g., SDM 1172) can be promoted to governed organization. In some embodiments, the promotion process includes re-importing and uploading data.

Arrow 1112 illustrates a scenario where a copy of visualization 1156 is created from workspace 1150 (as visualization 1174) and used in workspace 1170 of personal organization 1120. This is permissible.

Arrow 1114 illustrates a scenario where visualization 1182, which is created in workspace 1180 of personal organization 1120, is copied (the copy is visualization 1132) and used in workspace 1190 of personal organization 1130. This is allowed because one can make a copy of a data entity from one personal organization and use it in another personal organization.

Arrow 1116 illustrates a scenario where visualization 1182 from workspace 1180 points to SDM 1166 in workspace 1160 of governed organization 1110. This is permissible because a user is allowed to download entities (e.g., models or objects) from the governed organization 1110 and build visualizations on top of the downloaded entities.

Arrow 1118 illustrates entity sharing between personal organization 1120 and personal organization 1130. This is permissible.

Components from ungoverned spaces cannot be shared with governed spaces. Otherwise, metadata explosion would be created in the governed organization All data and schema objects created in the analyst organization must remain homed in the analyst organization unless promoted.

In some embodiments, example use cases of sharing prepared visualization includes (i) an analyst that created a visualization sets the access control as "viewable to all organizations (governed and ungoverned organizations). Because of the access control setting, the component shows in browse/search results; (ii) An analyst shares a link corresponding to the visualization that the analysts created; (iii) Metrics are created on the analyst semantic data models. These metrics however will exist only in the analyst space. They will be visible via search and browse services. However, they cannot have any platform integrations in the governed organization.

In some embodiments, for the above example use cases, the components will be visible live by default. Any changes done to any component will always be reflected to all users that have access to it irrespective of the org boundary. Some embodiments implement versioning, which is tied to a publishing step.

Creating visualizations, metrics should support two levels on configuration decided by the component author: (1) Run as Creator. This would be for the cases where an analyst is using live queries and needs to support embedded credentials. (2) Run as Executor. This would be for cases where row level filter.

In accordance with some embodiments, metadata can only be referenced if it is in the ungoverned organization. In some embodiments, items in the personal space should be able to refer to items in the governed organization. In some embodiments, there are workspaces for both governed and ungoverned organizations. Analysts can "share" any visualization for "viewing" by any other user of the primary organization. But it is a view, and not a reference that can be included in other workspaces or used to compose other visualizations, because other isolated environments and primary organizations can build upon the metadata in an isolated environment.

In some embodiments, metadata can be "promoted" from an analyst organization to a governed organization. But, data must be reimported and uploaded. The rationale for this is that analysts working in the "isolated environment" is working with a small subset or synthetic data and prove out their SDMs and visualizations. Once promoted, the admin, who controls what the actual data sources are, will connect data to the metadata of the unified data analytics platform. In some embodiments, this is not the case in the CSV import scenario, because that is production data. In some implementations, this may not be true if the analyst is working with a live (or real time) data connection.

Promotion is not the same as the metadata sync in remote data cloud. Metadata sync is a one-time copy and there is no reference to the metadata in the ungoverned organization. In the analyst organization, the analyst can select which metadata to "sync" to the analyst org so that work can further happen. The analyst needs to "select and sync." There can be a UX to simplify the metadata synchronization process. The analyst needs to specify (e.g., be explicit) about what to sync and when to sync. Sync is always manual (i.e., changes from governed organization are not auto pushed).

As discussed above, promotion is the process for bringing components from an ungoverned organization into a governed organization (e.g., where the ungoverned component is promoted into the single source of truth). In some embodiments, the promotion process includes re-importing and uploading data.

Figure 12A:
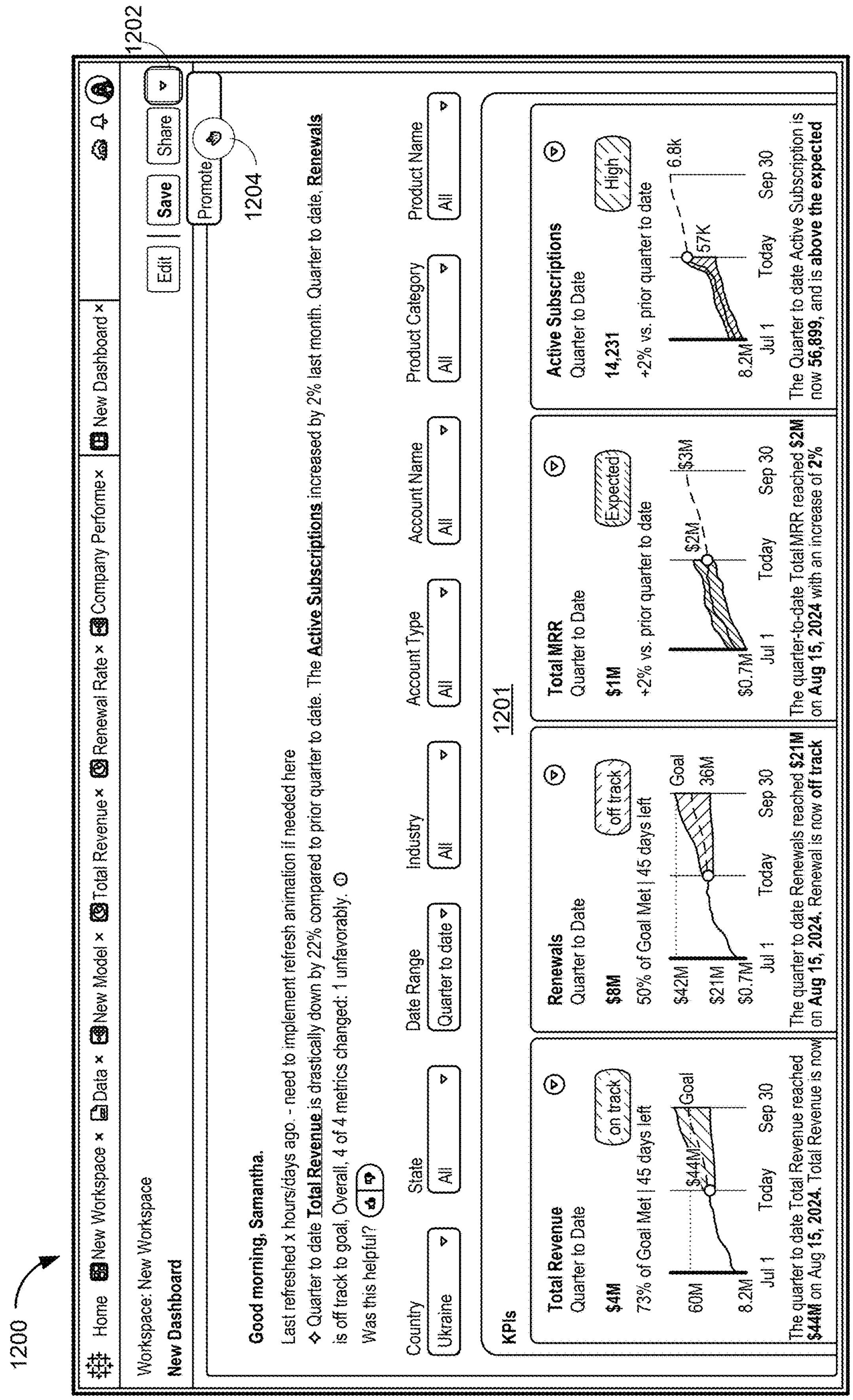
FIGS. 12A to 12O are screenshots illustrating a content promotion process from an ungoverned organization to a governed organization, in accordance with some embodiments.

FIGS. 12A to 120 are screenshots illustrating a content promotion process (e.g., component promotion process) from an ungoverned organization to a governed organization, in accordance with some embodiments. The screenshots show user interfaces of one or more client devices.

FIG. 12A shows a user interface 1200 of a client device corresponding to an analyst Samantha. In this example, Samantha wants to promote a dashboard 1201 from her ungoverned organization to the production organization (e.g., governed organization). Samantha clicks on the dropdown arrow 1202 to access the Promote action 1204 on the user interface 1200.

Figure 12B:
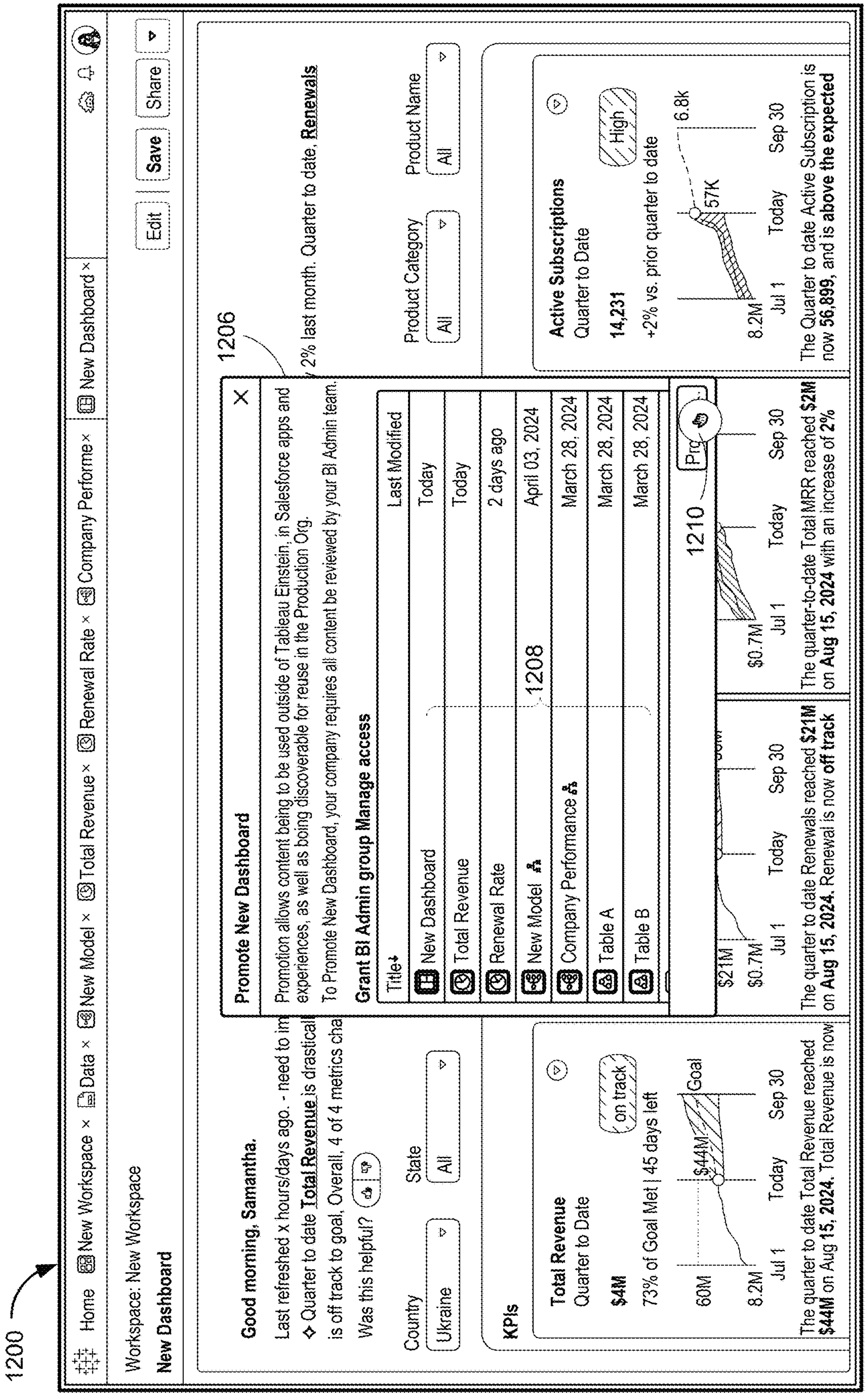

In FIG. 12B, a promotion dialogue 1206 shows a lineage of items 1208 to be submitted. Samantha reviews the list and clicks the "Promote" icon 1210.

Figure 12C:
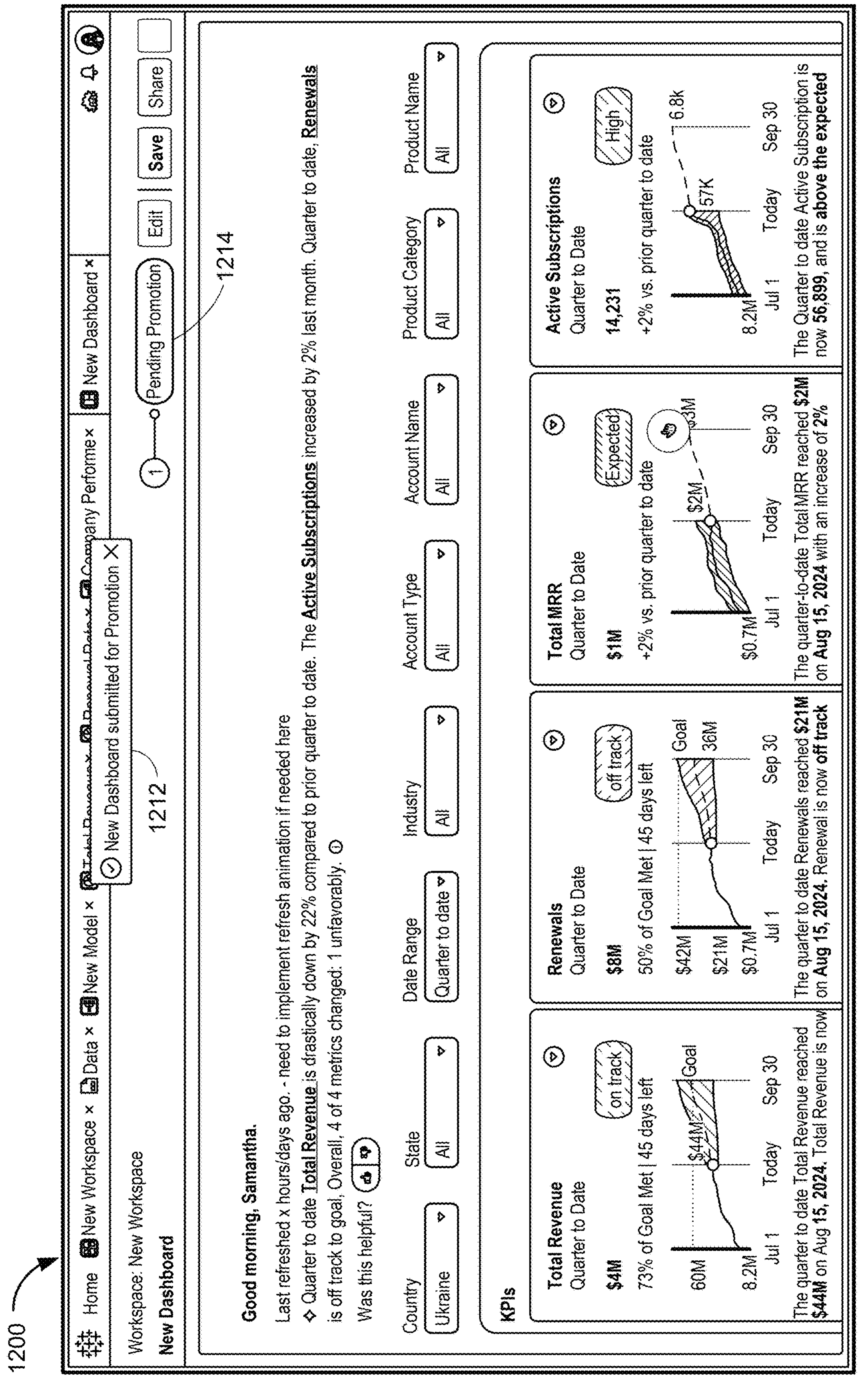

In FIG. 12C, the user interface 1200 displays a message 1212 that the dashboard has been submitted for promotion. The user interface 1200 also displays a "Pending Promotion" badge 1214.

FIG. 12D shows a user interface 1250 of a client device corresponding to an administrator Leah (administrator of the governed organization). In some embodiments, the user interface 1250 is a user interface of a production org. The user interface 1250 displays a promotion request as a notification 1252. Leah the administrator clicks on link 1254 to review the request.

Figure 12E:
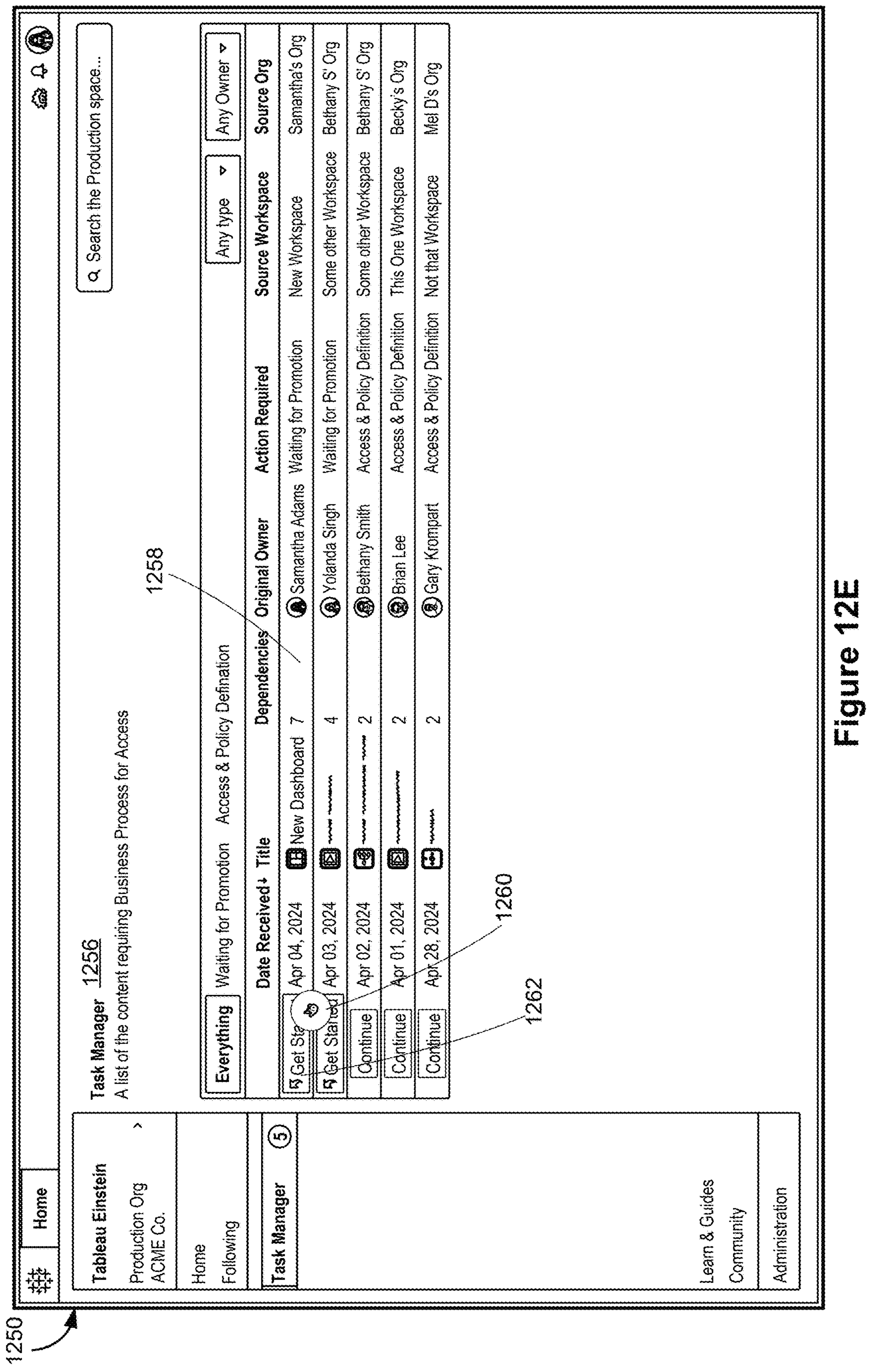

FIG. 12E shows that in response to selection of the link 1254, the user interface 1250 displays an action-oriented table 1256 called "Task Manager." The table 1256 displays all the available tasks assigned to her administrator's group. The table 1256 displays multiple rows of data. The first row 1258 is the new dashboard promotion request from Analyst Samantha. In FIG. 12E, Leah the administrator selects (1260) the "Get started" icon 1262.

FIG. 12F shows that the user interface 1250 displays a view 1264 of the workspace in Samantha's analyst organization. The workspace is pre-filtered to show the required content in the lineage of the dashboard Samantha submitted for promotion. In this example, the dashboard submitted for promotion includes two visualizations that are generated using two semantic models and using data from two tables. It also includes one connection to data. The administrator can select each of the items to review the content. In FIG. 12F, the user interface 1250 also displays a workflow 1266 of the content promotion process. The workflow 1266 includes the steps of "review content," "promote content." "DLO and DMO tagging," "policy definition," and "access management."

Figure 12H:
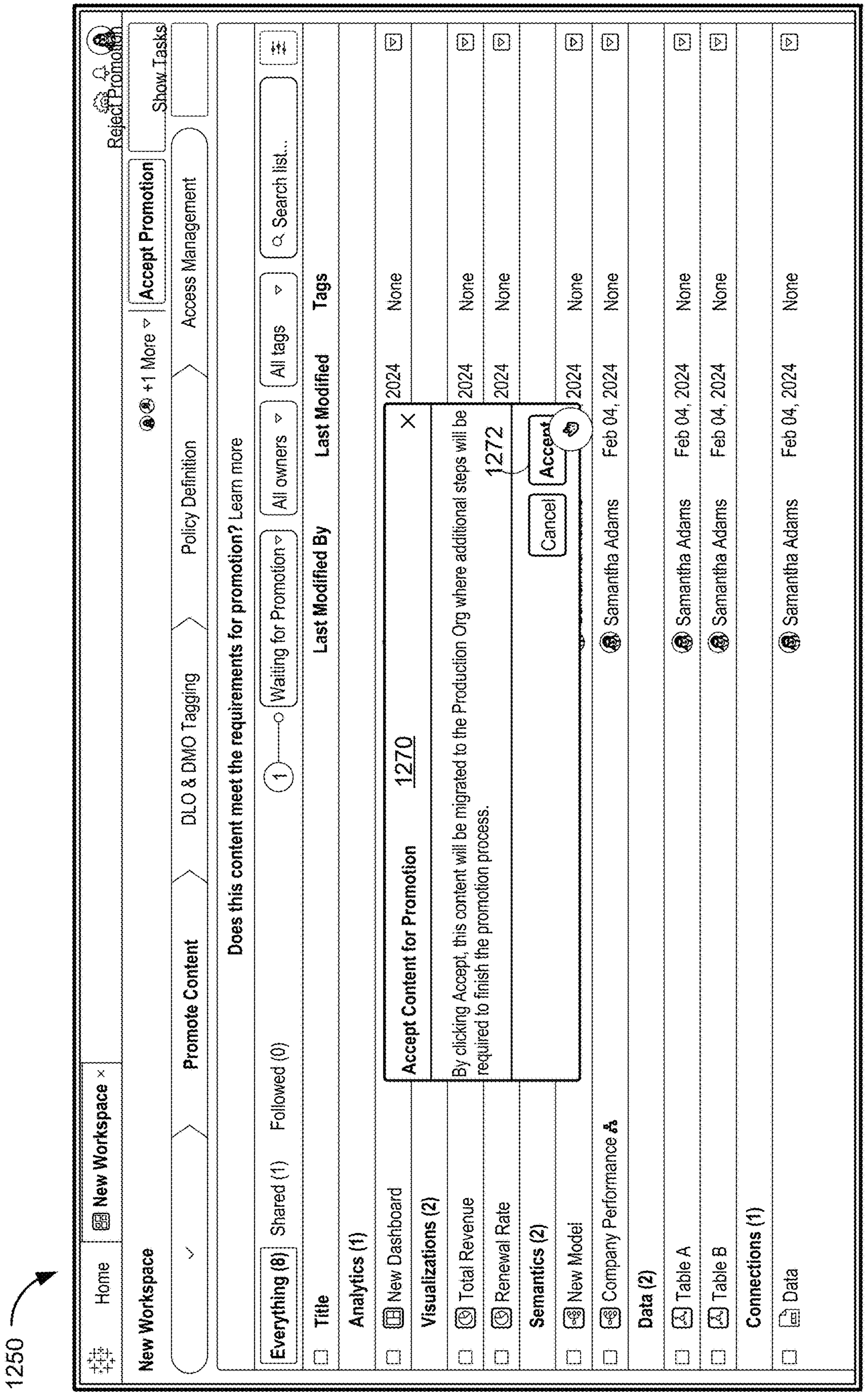

In FIG. 12G, the administrator selects the "Accept Promotion" icon 1268 to continue the workflow. In FIG. 12H. the user interface 1250 displays a confirmation dialogue 1270, explaining that promoting this content will copy it to the production org. The administrator selects the "accept" icon 1272.

In FIG. 12I, the user interface 1250 displays a notification 1274 that the content has been successfully promoted and that the process should be continued in the production org. The notification 1274 also includes a link to the production org, which is selected by the administrator.

Figure 12J:
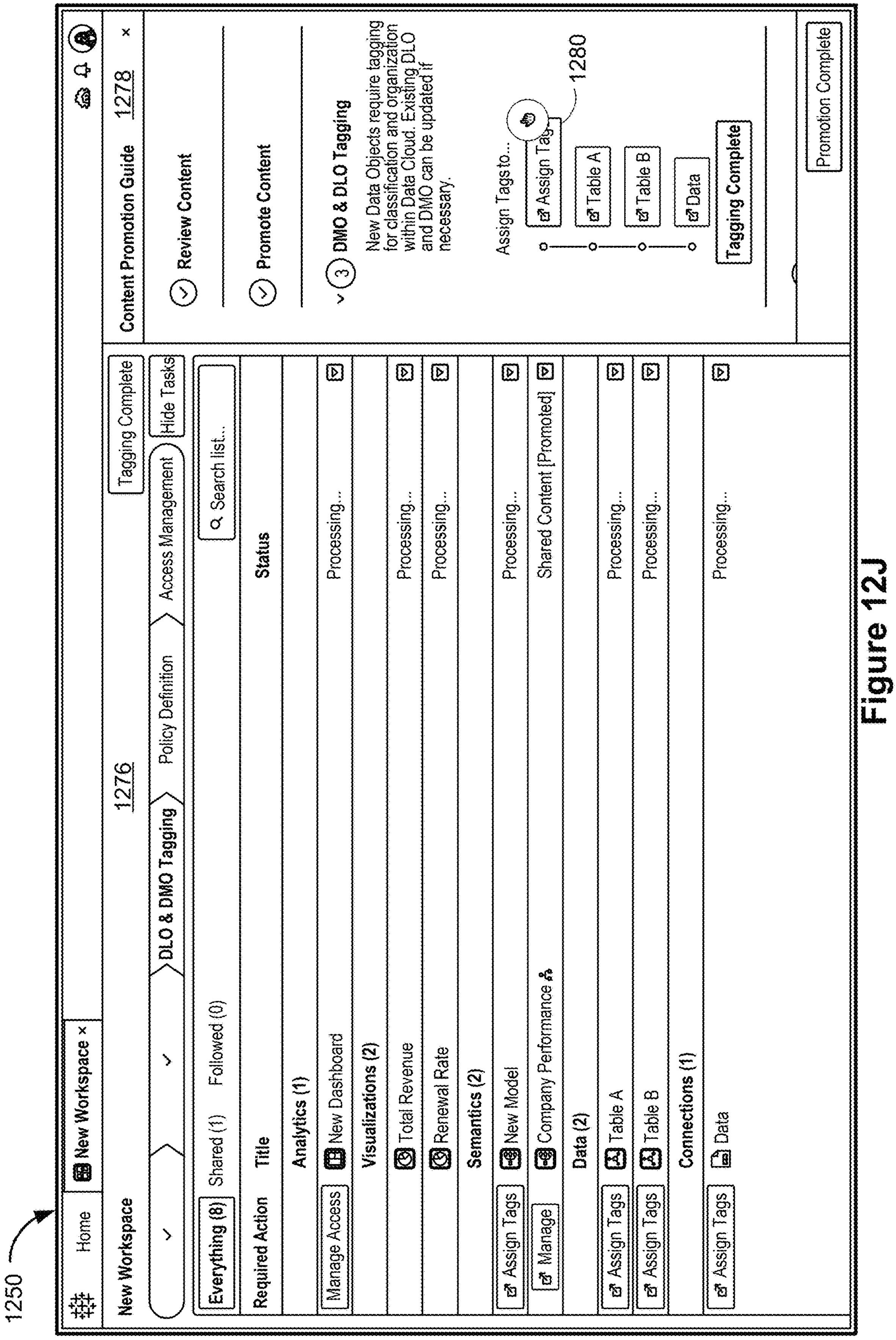

In FIG. 12J, the user interface 1250 displays a production org view 1276 of the promoted content, the user interface also displays a side pane 1278. From here the administrator is able to take the next steps necessary to ensure the promotion workflow is complete. First, the administrator instead a process for tagging the new data objects to ensure they are properly configured. For example, the administrator selects the "Assign Tags" button 1280, which opens a new tab deeplinked to that object in Data Cloud. This is illustrated in FIG. 12K, which shows a view of the Data Cloud interface 1282.

Figure 12L:
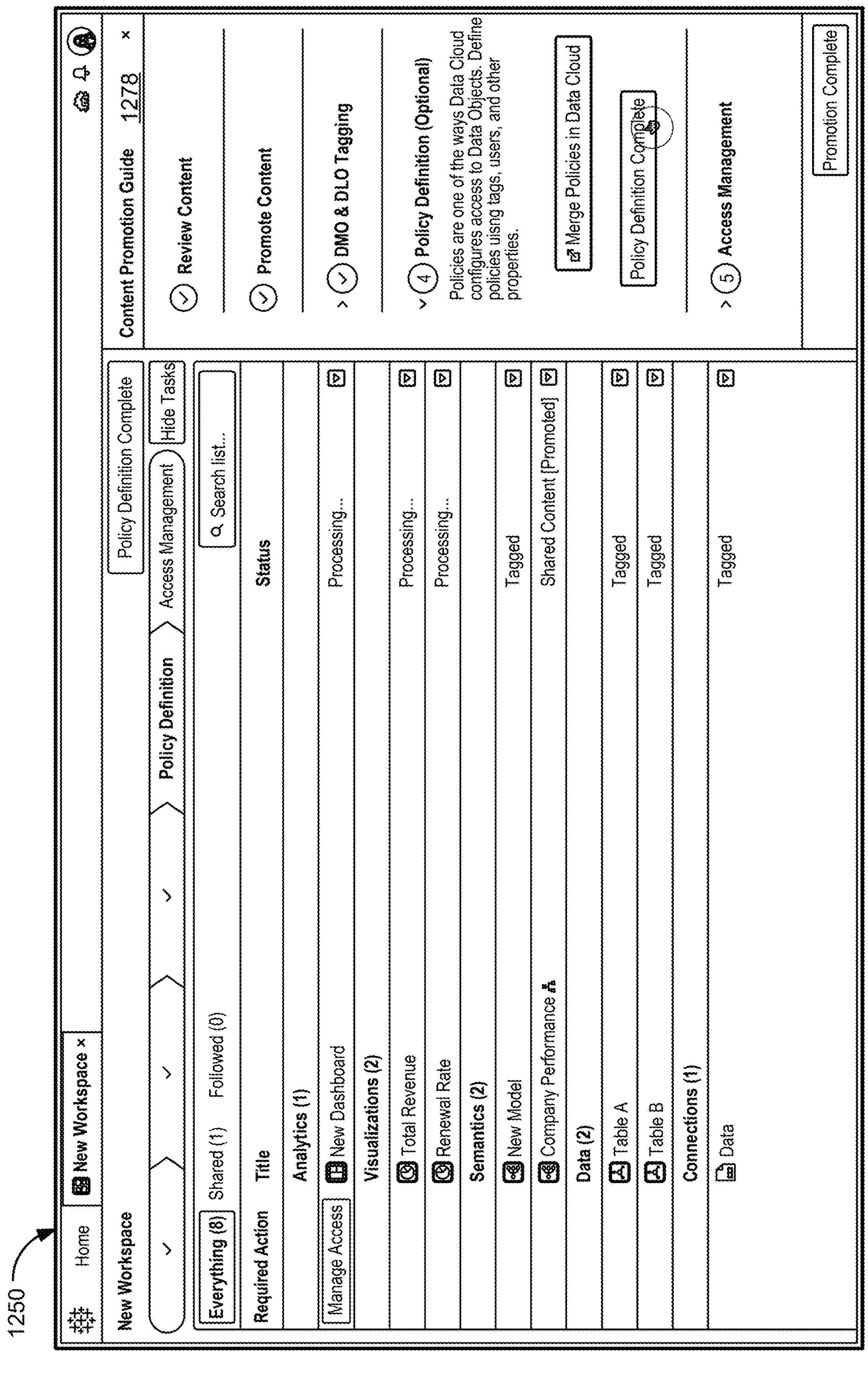

In some embodiments, while policy on Data Cloud objects can be inherited through tags and data spaces, sometimes the administrator may want to author additional policies. FIG. 12L shows the side pane 1278 of the user interface 1250 displaying options for policy definition.

Figure 12M:
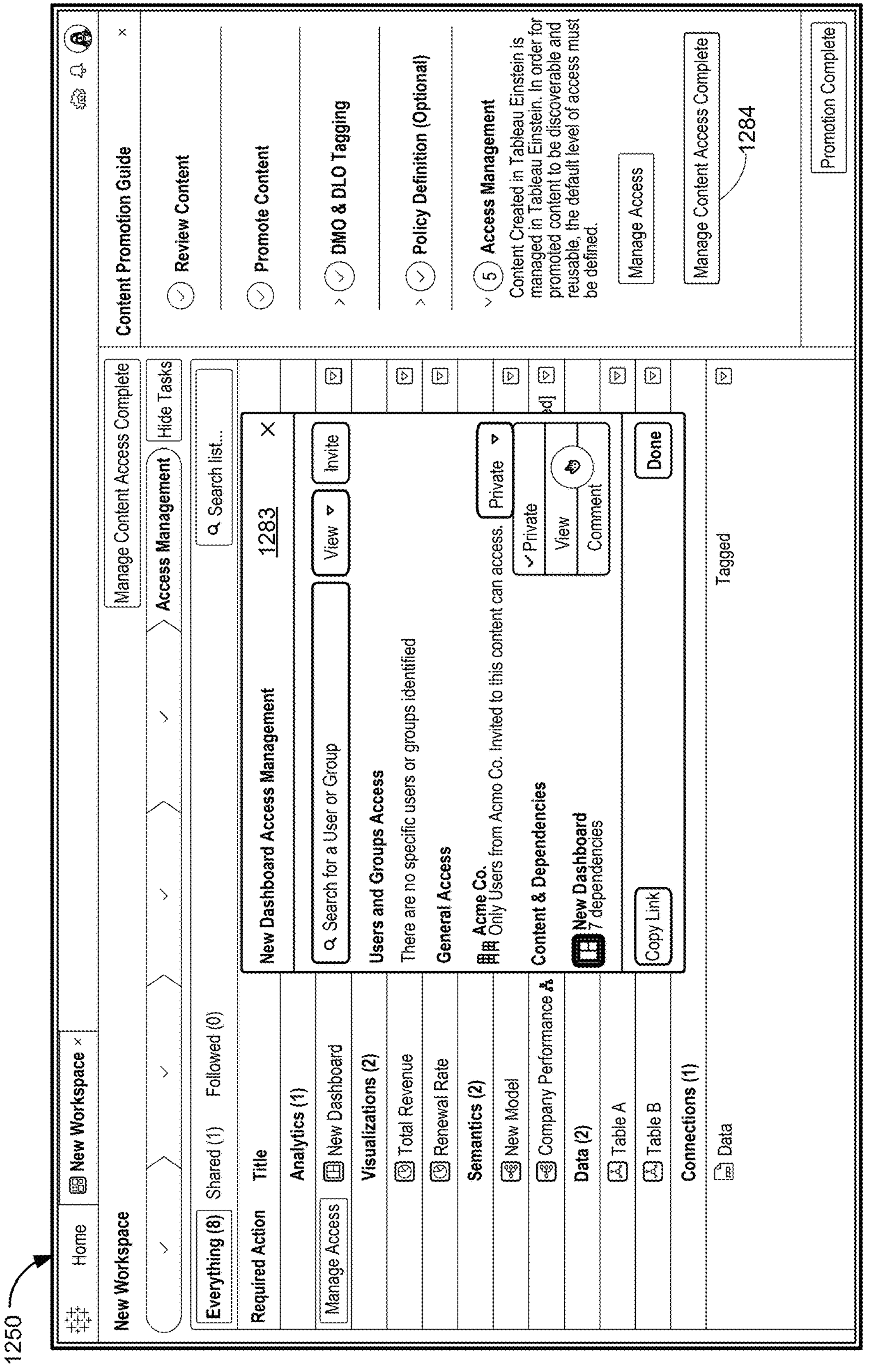
Figure 12N:
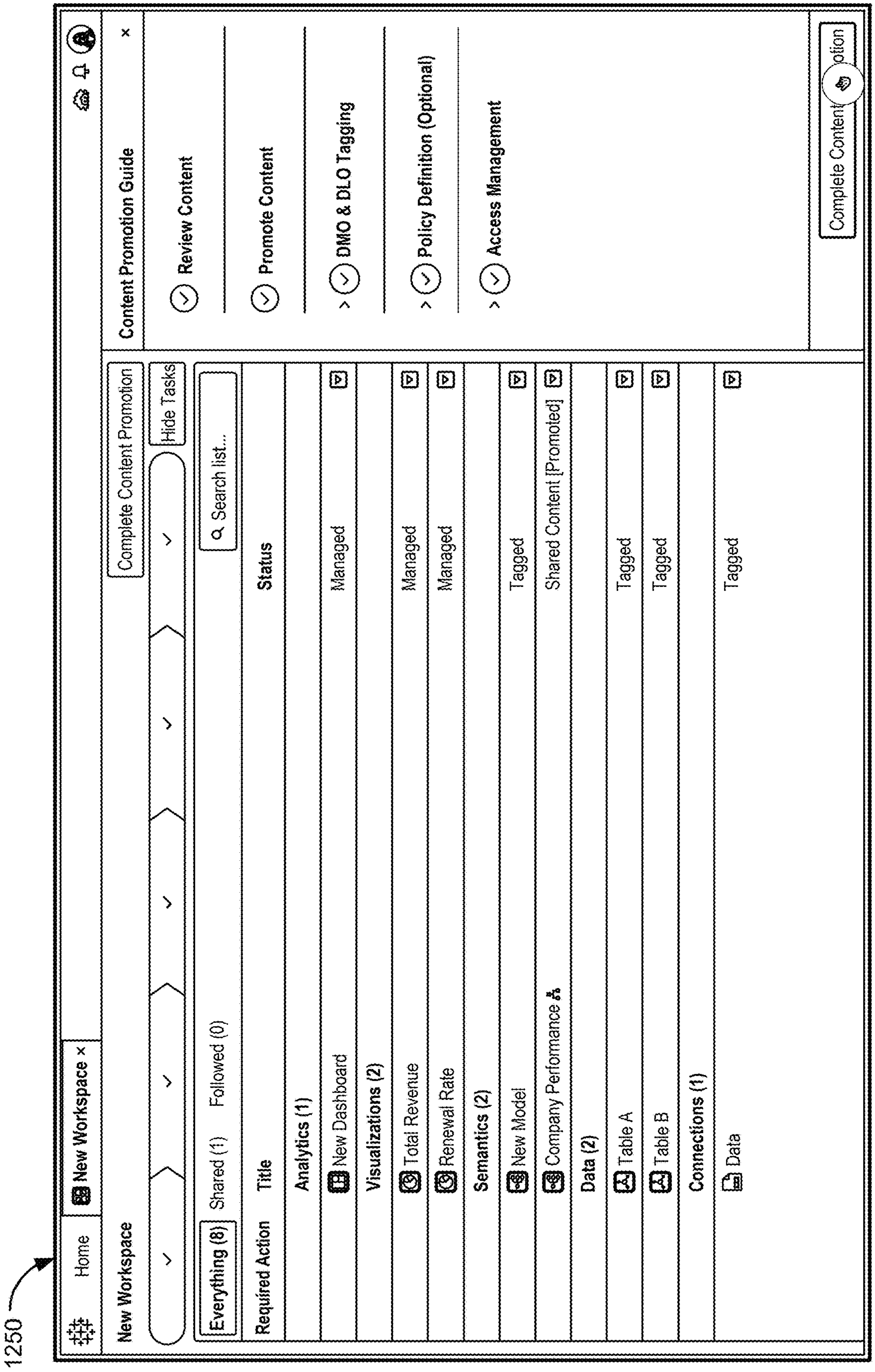

FIG. 12M illustrates the user interface 1250 displaying a dialogue box 1283 for configuring access of the newly promoted dashboard. Similar to sharing, the content that is created and managed in Tableau Einstein has its access permissions managed in access management modal. When managing promoted content however, the administrator will most likely be focused on granting access through the "General Access" area of the modal, so as to grant all licensed users a set level of access by default, in accordance with some embodiments. The administrator marks the Access Management step as complete (e.g., by selecting icon 1284). In FIG. 12N, the user interface 1250 displays a view and the administer has one final opportunity to review the actions taken on the prior steps before completing the promotion cycle.

Figure 12O:
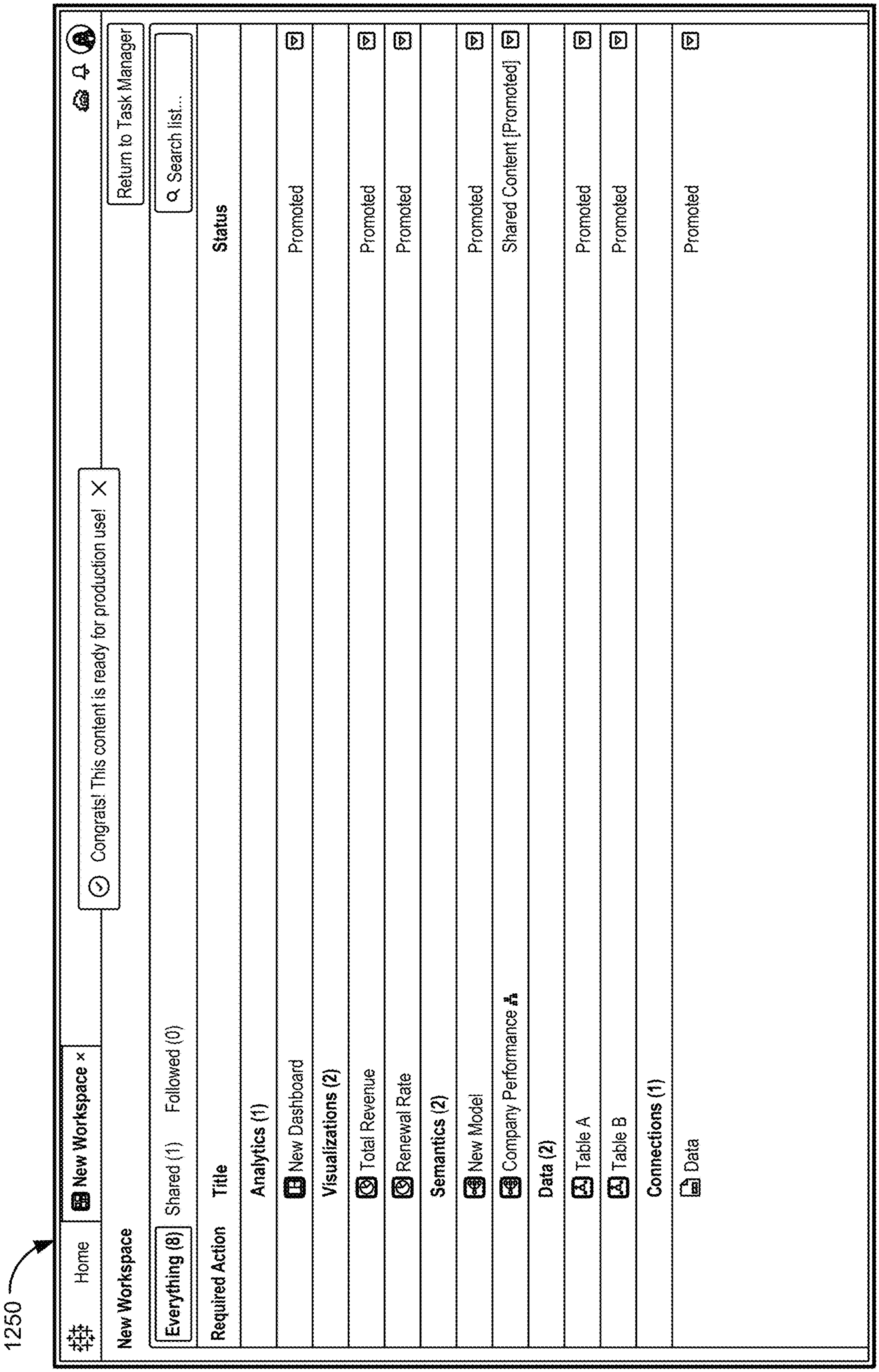

FIG. 12O shows that the content has been promoted. After the steps are complete, the content is now promoted and ready for reuse both in and out of production org.

In accordance with some embodiments, metadata in the ungoverned organization is linked to synthetic data. When content is promoted from the ungoverned organization to the governed organization, the admin has the authority to bring in the corresponding real data corresponding to the synthetic data.

In some embodiments, similar to workspace components of a governed organization, a multi-tenant junction table such as junction table 710 is implemented to store the membership information of workspace components in ungoverned workspaces. In some embodiments, the columns of an ungoverned workspace component in the junction table (e.g., columns 704, 706, 708, and 709) have values that reference synthetic data instead of real production data. In some embodiments, when an ungoverned workspace component is promoted to the governed organization, the data row in the junction table corresponding to the promoted workspace component is updated such that the columns have values that reference (e.g., correspond to) the actual production data stream (i.e., the single source of truth data).

FIGS. 13A to 13D provide a flowchart of an example process for providing contextual data analytics, in accordance with some embodiments. The method 1300 is performed at a computer system that includes one or more processors (e.g., processor(s) 202) and memory (e.g., memory 206). The memory stores one or more programs configured for execution by the one or more processors. In some embodiments, the operations shown in FIGS. 1, 4, 5, 6, 7, 8, 9, 10, 11, and 12A-12O correspond to instructions stored in the memory or other non-transitory computer-readable storage medium. In some embodiments, the computer system is a multi-tenant system. In a multi-tenant system, data for multiple tenants may be stored in the same physical database object; however, tenant data typically is arranged so that data of one tenant is kept logically separate from that of other tenants so that one tenant does not have access to another tenant's data, unless such data is expressly shared. In some embodiments, the multi-tenant system stores tenant data in one or more external data sources additionally to the plurality of data spaces. A technical advantage of a multi-tenant system is that multi-tenant hosting solutions are offered by cloud service providers typically as a lower-cost alternative to single-tenant or dedicated hosting solutions. The computer-readable storage medium may include a magnetic or optical disk storage device, solid state storage devices such as Flash memory, or other non-volatile memory device or devices. In some embodiments, the instructions stored on the computer-readable storage medium include one or more of: source code, assembly language code, object code, or other instruction format that is interpreted by one or more processors. Some operations in the method 1300 may be combined with the method 1400 and/or the order of some operations may be changed.

Figure 13A:
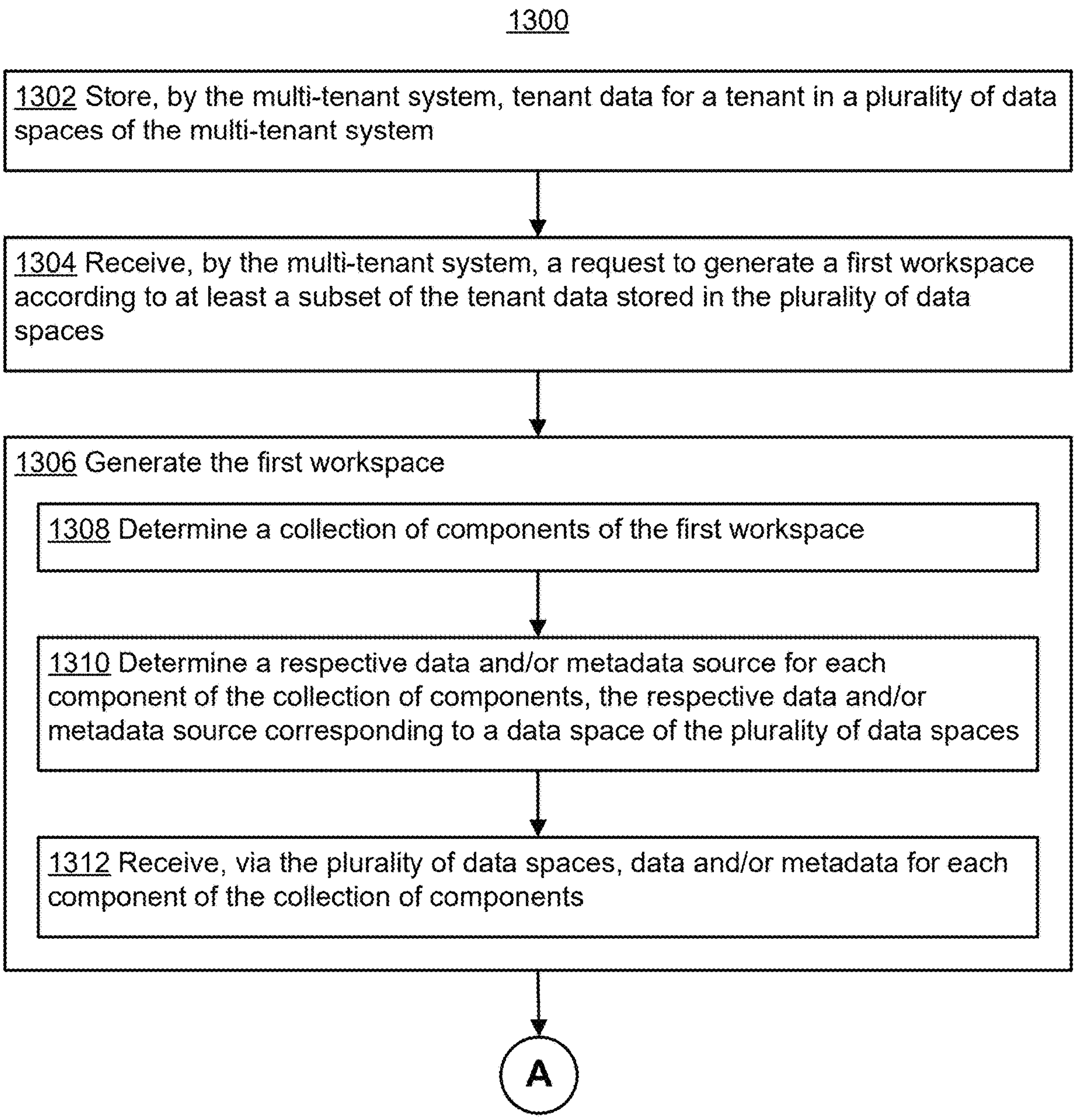

Referring to FIG. 13A, the computer system stores (1302) tenant data for a tenant in a plurality of data spaces In some embodiments, the plurality of data spaces collectively contains the single source of truth of data.

The computer system receives (1304) a request to generate a first workspace (e.g., a governed workspace or sharable container) according to at least a subset of the tenant data stored in the plurality of data spaces.

The computer system, in accordance with receiving the request, generates (1306) the first workspace.

The computer system determines (1308) a collection of components of the first workspace.

The computer system determines (1310) a respective data and/or metadata source (data source or metadata source) for each component of the collection of components, the respective data and/or metadata source corresponding to a data space of the plurality of data spaces.

The computer system receives (1312), via the plurality of data spaces, data and/or metadata for each component of the collection of components.

Figure 13B:
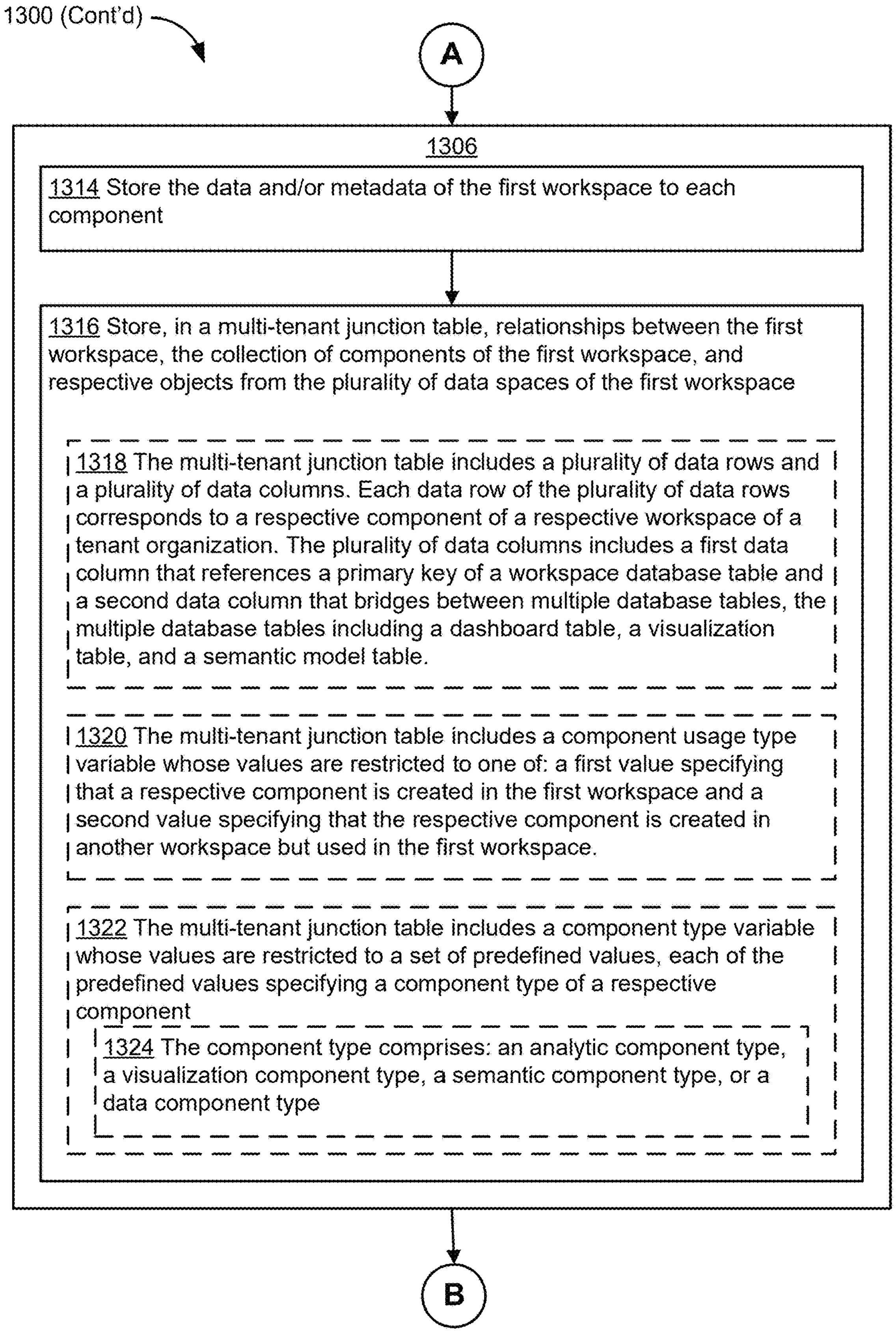

Referring to FIG. 13B, the computer system stores (1314) the data and/or metadata of the first workspace to each component.

The computer system stores, in a multi-tenant junction table (e.g., junction table 710, AnalyticsWorkspaceComponent database table 710), relationships between the first workspace, the collection of components of the first workspace, and respective objects from the plurality of data spaces.

In some embodiments, the multi-tenant junction table includes a plurality of data rows and a plurality of data columns. Each data row of the plurality of data rows corresponds to a respective component of a respective workspace of a tenant organization. For example, each data row of the plurality of data rows is identified by a respective AnalyticsWorkspaceComponentID 702. The plurality of data columns includes a first data column (e.g., column 704) that references a primary key of a workspace database table and a second data column (e.g., column 706) that bridges between multiple database tables, the multiple database tables including a dashboard table (e.g., AnalyticsDashboard database table 730), a visualization table (e.g., Analytics Visualization database table 740), and a semantic model table (e.g., SemanticModel database table 750). In some embodiments, the multiple database tables further include a data model object table (e.g., MktDataModelObject database table 760) and a calculated insights object table (e.g., MktCalculatedInsightObject 770).

In some embodiments, the multi-tenant junction table includes (1320) a component usage type variable (e.g., ComponentUsageType column 708) whose values are restricted to one of: a first value specifying that a respective component is created in the first workspace and a second value specifying that the respective component is created in another workspace but used in the first workspace.

In some embodiments, the multi-tenant junction table includes a component type variable (e.g., ComponentType 709) whose values are restricted to a set of predefined values, each of the predefined values specifying a component type of a respective component.

In some embodiments, the component type comprises (1324) an analytic component (e.g., dashboards), a visualization component (e.g., metrics and visualizations), a semantic component (e.g., semantic models and metric definitions), or a data component (e.g., DMOs or DLOs).

Referring to FIG. 13C, in some embodiments, generating the first workspace includes determining (1326) an access control policy that applies to a first user of the workspace. For example, in some embodiments, a workspace can have its own access control mechanism. In some embodiments workspace access control may be propagated to the components that originated in the workspace.

In some embodiments, determining the access control policy that applies to the first user includes: determining (1328), for each component of the collection of components, a component-level access control policy, including determining a data space source corresponding to the respective component; determining an existing access control policy that applies to the first user with respect to the data space source; and applying (e.g., using, implementing, or replicating) the same existing access control policy as the component-level access control policy.

For example, in some embodiments, the computer system determines the source (e.g., a data space, or an object within the data space) for a respective component, determines an existing access control policy that applies to the first user with respect to the source, and replicates the existing access control policy for the component. In some embodiments, workspace access controls are co-existent with the other access control policies from data spaces (e.g., workspace does not override the existing policies of DMOs and SDMs). In some embodiments, access to a respective component is controlled by tags (e.g., a user may only be able to access a resource if the user and the component have the same value for a specific tag.

In some embodiments, generating the first workspace includes executing (1330) a workspace management application (e.g., user applications 226 or user applications 330), including causing a user interface (e.g., user interface 332) to be displayed on a client device (e.g., client device 152) that is communicatively connected with the multi-tenant system. In some embodiments, the user interface view will be created from Lightning components and re-consumes several shared structures from other teams to provide a consistent look and feel while limiting code duplication.

In some embodiments, the computer system causes (1332) display of one or more workspace options in the user interface, including one or more of: an option to create a new component in the first workspace, an option to add an existing component from another workspaces, an option to save the first workspace, an option to share the first workspace, an option to view details of the first workspace, an option to delete the first workspace, and an option to display one or more components shared from the first workspace.

In some embodiments, the computer system causes (1334) display of one or more component options in the user interface, including one or more of: an option to open a component for viewing; an option to open a component for editing; an option to view details of a component; an option to share a component; an option to delete a component, and an option to filter and search within the collection of components.

Referring to FIG. 13D, in some embodiments, for a component of the collection of components, the computer system stores (1336), in the multi-tenant junction table, an indication of (i) whether the component is created in the first workspace or (ii) whether the component is used in the first workspace but created in a different workspace.

In some embodiments, after generating the first workspace, the computer system receives (1338) a request to share (e.g., reuse) a first component of the first workspace in a second workspace that is different from the first workspace. The computer system, in response to receiving the request, replicates (1340) metadata for the first component from the first workspace to the second workspace.

In some embodiments, the plurality of data spaces includes (1342) a first data space having a first data model object (DMO), and the first DMO is utilized in at least two workspaces. This is illustrated in FIG. 6. For example, DMO 616-1 is included in data space 606-1 but utilized in workspace 622-1 and workspace 622-2.

Although FIGS. 13A to 13D illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

FIGS. 14A to 14C provide a flowchart of an example process for providing isolated work environments, in accordance with some embodiments. The method 1400 is performed at a computer system (e.g., multi-tenant system 110) that includes one or more processors (e.g., processor(s) 202) and memory (e.g., memory 206). The memory stores one or more programs configured for execution by the one or more processors. In some embodiments, the operations shown in FIGS. 1, 4, 5, 6, 7, 8, 9, 10, 11, and 12A-12O correspond to instructions stored in the memory or other non-transitory computer-readable storage medium. The computer-readable storage medium may include a magnetic or optical disk storage device, solid state storage devices such as Flash memory, or other non-volatile memory device or devices. In some embodiments, the instructions stored on the computer-readable storage medium include one or more of: source code, assembly language code, object code, or other instruction format that is interpreted by one or more processors. Some operations in the method 1400 may be combined with the method 1300 and/or the order of some operations may be changed.

The computer system stores (1602) tenant data for a tenant in a data space. In some embodiments, the data space is a default data space of an ungoverned organization. In some embodiments, the difference between the isolated organization and the governed organization org is that there is only one (e.g., default) data space in the ungoverned organization.

The computer system receives (1404) a request from a user (e.g., an analyst) to generate an isolated (personal) workspace according to the tenant data stored in the data space, wherein the user has non-administrative access control with respect to the data space of the multi-tenant system;

The computer system, in accordance with receiving the request, provisions (1406) an isolated organization (e.g., ungoverned organization) to the user, including establishing administrative access control for the user with respect to the isolated organization while maintaining the non-administrative access control for the user with respect to the data space. For example, the user is still able to reuse the data artifacts that they have access to.

In some embodiments, establishing administrative access control for the user with respect to the isolated organization includes enabling (1408) options for the user to provision one or more workspaces within the isolated organization (e.g., personal to the user) and manage workspaces within the isolated organization.

The computer system replicates (1410) at least a subset of metadata from the data space to the isolated organization, wherein the subset of metadata is accessible to the user in the data space, the subset of metadata describing a corresponding subset of data. For example, in some embodiments, a discovery service that lets user find what they have access to).

The computer system stores (1412), in the isolated organization, all components created in the isolated organization. For example, all data and schema objects created in the analyst org must remained home in the analyst organization unless promoted.

Referring to FIG. 14B, in some embodiments, subsequent to provisioning the isolated organization, the compute system receives (1414) a request from the user to promote a data dashboard from the isolated organization to a governed organization (governed org, governed workspace) that is managed by an administrator (promotion allows content to be used outside the isolated organization). The computer system, in response to receiving the request, identifies (1416) all metadata having dependencies with the data dashboard. The computer system sends (1418) the request and the identification of the metadata to the administrator of the governed organization.

In some embodiments, sending the request and the identification of the metadata to the administrator of the governed organization includes: (i) executing (1420) a workspace management application that specifies a workflow (e.g., workflow 1266) having a plurality of steps for promote the data dashboard (e.g., the plurality of steps includes reviewing content of the dashboard, promoting the content, DLO and DMO Tagging, Policy Definition, and Access management. This is illustrated in FIG. 12F); (ii) rendering a user interface (e.g., user interface 1250) that includes the workflow with the plurality of steps; and (iii) causing the user interface to be displayed on a client device (e.g., client device 152) associated with the administrator of the governed organization.

In some embodiments, the plurality of steps includes tagging (1422) (e.g., DMO and DLO tagging) one or more data objects in the dashboard for classification and organization within a data cloud. This is illustrated in FIG. 12J.

In some embodiments, the tagging includes assigning (1424) respective tags to a new model of the data dashboard, one or more tables of the data dashboard, and data of the data dashboard. This is illustrated in FIG. 12J.

In some embodiments, the plurality of steps includes defining (1426) a set of rules for accessing and managing data objects in the data dashboard within a data cloud. This is illustrated in FIG. 12M.

Referring to FIG. 14C, in some embodiments, the isolated organization references (1428) a synthetic data source (e.g., a computer-generated dataset that mimics real-world data, used as a substitute when accessing actual data is restricted due to privacy concerns or other limitations). The computer system, in accordance with a determination that the request to promote the data dashboard has been approved by the administrator of the governed organization, switches a data source from the synthetic data source to an actual data source.

In some embodiments, the computer system, in accordance with a determination that the request to promote the data dashboard has been approved by the administrator of the governed organization: connects (1430) the data dashboard to an actual data source; and generates and renders contents for the dashboard according to data from the actual data source. For example, once the content is promoted, the administrator that controls the actual data sources will connect data to the metadata.

In some embodiments, the computer system, in accordance with a determination that the request to promote the data dashboard has been approved by the administrator of the governed organization, updates (1432) references in a multi-tenant junction table (e.g., junction table 710) to reflect the governed organization while maintaining a lineage of artifacts from the isolated organization. For example, in some embodiments, a multi-tenant junction table such as junction table 710 is implemented to store the membership information of workspace components in ungoverned workspaces. For an ungoverned workspace component in the junction table, the data columns (e.g., columns 704, 706, 708, and 709) may have values that reference synthetic data instead of real production data. When the ungoverned workspace component is promoted to the governed organization, the data row in the junction table, corresponding to the promoted workspace component, can be updated so that the data columns comprise values that reference (e.g., correspond to) the actual production data stream (e.g., the single source of truth data).

Turning now to some example embodiments:

(A1) In accordance with some embodiments, a method for providing contextual data analytics is performed by a multi-tenant system that includes one or more processors and memory. The method includes (i) storing, by the multi-tenant system, tenant data for a tenant in a plurality of data spaces of the multi-tenant system; (ii) receiving, by the multi-tenant system, a request to generate a first workspace according to at least a subset of the tenant data stored in the plurality of data spaces; and (iii) in accordance with receiving the request, generating the first workspace, including: (a) determining a collection of components of the first workspace; (b) determining a respective data and/or metadata source for each component of the collection of components, the respective data and/or metadata source corresponding to a data space of the plurality of data spaces; (c) receiving, via the plurality of data spaces, data and/or metadata for each component of the collection of components; (d) storing the data and/or metadata of the first workspace to each component; and (e) storing, in a multi-tenant junction table, relationships between the first workspace, the collection of components of the first workspace, and respective objects from the plurality of data spaces.

(A2) In some embodiments of A1, the junction table includes a plurality of data rows and a plurality of data columns; each data row of the plurality of data rows corresponds to a respective component of a respective workspace; and the plurality of data columns includes a first data column that references a primary key of a workspace database table and a second data column that bridges between multiple database tables, the multiple database tables including a dashboard table, a visualization table, and a semantic model table.

(A3) In some embodiments of A1 or A2, the junction table includes a component usage type variable whose values are restricted to one of: a first value specifying that a respective component is created in the first workspace and a second value specifying that the respective component is created in another workspace but used in the first workspace.

(A4) In some embodiments of any of A1-A3, the junction table includes a component type variable whose values are restricted to a set of predefined values, each of the predefined values specifying a component type of a respective component.

(A5) In some embodiments of A4, the component type comprises: an analytic component type, a visualization component type, a semantic component type, or a data component type.

(A6) In some embodiments of any of A1-A5, the method further comprises, for a component of the collection of components: storing, in the multi-tenant junction table, an indication of (i) whether the component is created in the first workspace or (ii) whether the component is used in the first workspace but created in a different workspace.

(A7) In some embodiments of any of A1-A6, generating the first workspace includes determining an access control policy that applies to a first user of the workspace.

(A8) In some embodiments of A7, determining the access control policy that applies to the first user includes determining, for each component of the collection of components, a component-level access control policy, including: (i) determining a data space source corresponding to the respective component; (ii) determining an existing access control policy that applies to the first user with respect to the data space source; and (iii) applying the same existing access control policy as the component-level access control policy.

(A9) In some embodiments of any of A1-A8, the method further includes: (i) after generating the first workspace, receiving a request to share a first component of the first workspace in a second workspace that is different from the first workspace; and (ii) in response to receiving the request, replicating metadata for the first component from the first workspace to the second workspace.

(A10) In some embodiments of any of A1-A9, generating the first workspace includes executing a workspace management application, including causing a user interface to be displayed on a client device that is communicatively connected with the multi-tenant system.

(A11) In some embodiments of A10, the method includes causing display of one or more workspace options in the user interface, including one or more of: (i) an option to create a new component in the first workspace; (ii) an option to add an existing component from another workspaces; (iii) an option to save the first workspace; (iv) an option to share the first workspace; (v) an option to view details of the first workspace; (vi) an option to delete the first workspace; and (vii) an option to display one or more components shared from the first workspace.

(A12) In some embodiments of A10 or A11, the method includes causing display of one or more component options in the user interface, including one or more of: (i) an option to open a component for viewing; (ii) an option to open a component for editing; (iii) an option to view details of a component; (iv) an option to share a component; (v) an option to delete a component; and (vi) an option to filter and search within the collection of components.

(A13) In some embodiments of any of A1-A12, the plurality of data spaces includes a first data space having a first data model object (DMO), and the first DMO is utilized in at least two workspaces.

(B1) In accordance with some embodiments, a method of providing isolated work environments performed by a multi-tenant system that includes one or more processors and memory, the method comprising: (i) storing, by the multi-tenant system, tenant data for a tenant in a data space of the multi-tenant system; (ii) receiving, by the multi-tenant system, a request from a user to generate an isolated workspace according to the tenant data stored in the data space, wherein the user has non-administrative access control with respect to the data space of the multi-tenant system; (iii) in accordance with receiving the request: (a) provisioning an isolated organization to the user, including establishing administrative access control for the user with respect to the isolated organization while maintaining the non-administrative access control for the user with respect to the data space; (b) replicating at least a subset of metadata from the data space to the isolated organization, wherein the subset of metadata is accessible to the user in the data space, the subset of metadata describing a corresponding subset of data; and (c) storing, in the isolated organization, all components created in the isolated organization.

(B2) In some embodiments of B1, establishing administrative access control for the user with respect to the isolated organization includes enabling options for the user to provision one or more workspaces within the isolated organization and manage workspaces within the isolated organization.

(B3) In some embodiments of B1 or B2, the method further includes, subsequent to provisioning the isolated organization: (i) receiving a request from the user to promote a data dashboard from the isolated organization to a governed organization that is managed by an administrator; and (ii) in response to receiving the request: (a) identifying all metadata having dependencies with the data dashboard; and (b) sending the request and the identification of the metadata to the administrator of the governed organization (B4) In some embodiments of B3, the isolated organization references a synthetic data source; and the method includes in accordance with a determination that the request to promote the data dashboard has been approved by the administrator of the governed organization, switching a data source from the synthetic data source to an actual data source.

(B5) In some embodiments of B3 or B4, the method includes, in accordance with a determination that the request to promote the data dashboard has been approved by the administrator of the governed organization: (i) connecting the data dashboard to an actual data source; and (ii) generating and rendering contents for the dashboard according to data from the actual data source.

(B6) In some embodiments of any of B3-B5, sending the request and the identification of the metadata to the administrator of the governed organization includes: (i) executing a workspace management application that specifies a workflow having a plurality of steps for promote the data dashboard; (ii) rendering a user interface that includes the workflow with the plurality of steps; and (iii) causing the user interface to be displayed on a client device associated with the administrator of the governed organization.

(B7) In some embodiments of B6, the plurality of steps includes tagging one or more data objects in the dashboard for classification and organization within a data cloud.

(B8) In some embodiments of B7, the tagging includes assigning respective tags to a new model of the data dashboard, one or more tables of the data dashboard, and data of the data dashboard.

(B9) In some embodiments of any of B6-B8, the plurality of steps includes defining a set of rules for accessing and managing data objects in the data dashboard within a data cloud.

(B10) In some embodiments of any of B3-B9, the method further includes: in accordance with a determination that the request to promote the data dashboard has been approved by the administrator of the governed organization, updating references in a multi-tenant junction table to reflect the governed organization while maintaining a lineage of artifacts from the isolated organization.

(C1) In accordance with some embodiments, a computer system includes one or more processors and memory coupled to the one or more processors. The memory stores instructions that, when executed by the one or more processors, cause the computer system to perform the method of any of A1-A13 or B1-B10.

(D1) In accordance with some embodiments, a computer-readable storage medium stores one or more programs that, when executed by one or more processors of a computer system, cause the computer system to perform the method of any of A1-A13 or B1-B10.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

As used herein, the term "exemplary" means "serving as an example, instance, or illustration," and does not necessarily indicate any preference or superiority of the example over any other configurations or embodiments.

As used herein, the term "and/or" encompasses any combination of listed elements. For example, "A, B, and/or C" entails each of the following possibilities: A only, B only, C only, A and B without C, A and C without B, B and C without A, and a combination of A, B, and C.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for providing contextual data analytics performed by a multi-tenant system that includes one or more processors and memory, the method comprising:

storing, by the multi-tenant system, tenant data for a tenant in a plurality of data spaces of the multi-tenant system, wherein a data space in the plurality of data spaces includes two or more of: (i) a data preparation model that is configured to prepare data within the data space, (ii) a semantic data model that is configured to provide semantics underlying the data within the data space, (iii) one or more calculated insights that are configured to define and calculate multi-dimensional metrics, and (iv) one or more filters for filtering one or more data lake objects;

receiving, by the multi-tenant system, a request to generate a first workspace according to at least a subset of the tenant data stored in the plurality of data spaces; and in accordance with receiving the request, generating the first workspace, including:

determining a collection of components of the first workspace;

determining a respective data and/or metadata source for each component of the collection of components, the respective data and/or metadata source corresponding to a data space of the plurality of data spaces;

receiving, via the plurality of data spaces, data and/or metadata for each component of the collection of components;

storing the data and/or metadata of the first workspace to each component; and storing, in a multi-tenant junction table, many-to-many relationships between different data tables corresponding to the first workspace, the collection of components of the first workspace, and respective objects from the plurality of data spaces.

2. The method of claim 1, wherein:

the multi-tenant junction table includes a plurality of data rows and a plurality of data columns;

each data row of the plurality of data rows corresponds to a respective component of a respective workspace; and the plurality of data columns includes a first data column that references a primary key of a workspace database table and a second data column that bridges between multiple database tables, the multiple database tables including a dashboard table, a visualization table, and a semantic model table.

3. The method of claim 1, wherein the multi-tenant junction table includes a component usage type variable whose values are restricted to one of: a first value specifying that a respective component is created in the first workspace and a second value specifying that the respective component is created in another workspace but used in the first workspace.

4. The method of claim 1, wherein the multi-tenant junction table includes a component type variable whose values are restricted to a set of predefined values, each of the predefined values specifying a component type of a respective component.

5. The method of claim 4, wherein the component type comprises: an analytic component type, a visualization component type, a semantic component type, or a data component type.

6. The method of claim 1, further comprising:

for a component of the collection of components:

storing, in the multi-tenant junction table, an indication of (i) whether the component is created in the first workspace or (ii) whether the component is used in the first workspace but created in a different workspace.

7. The method of claim 1, wherein generating the first workspace includes determining an access control policy that applies to a first user of the first workspace.

8. The method of claim 7, wherein determining the access control policy that applies to the first user includes:

determining, for each component of the collection of components, a component-level access control policy, including:

determining a data space source corresponding to the respective component;

determining an existing access control policy that applies to the first user with respect to the data space source; and applying the same existing access control policy as the component-level access control policy.

9. The method of claim 1, further comprising:

after generating the first workspace, receiving a request to share a first component of the first workspace in a second workspace that is different from the first workspace; and in response to receiving the request:

replicating metadata for the first component from the first workspace to the second workspace.

10. The method of claim 1, wherein generating the first workspace includes:

executing a workspace management application, including causing a user interface to be displayed on a client device that is communicatively connected with the multi-tenant system.

11. The method of claim 10, further comprising:

causing display of one or more workspace options in the user interface, including one or more of:

an option to create a new component in the first workspace;

an option to add an existing component from another workspace;

an option to save the first workspace;

an option to share the first workspace;

an option to view details of the first workspace;

an option to delete the first workspace; and an option to display one or more components shared from the first workspace.

12. The method of claim 10, further comprising:

causing display of one or more component options in the user interface, including one or more of:

an option to open a component for viewing;

an option to open a component for editing;

an option to view details of a component;

an option to share a component;

an option to delete a component; and an option to filter and search within the collection of components.

13. The method of claim 1, wherein the plurality of data spaces includes a first data space having a first data model object (DMO), and the first DMO is utilized in at least two workspaces.

14. The method of claim 1, wherein the multi-tenant junction table comprises a column configured as a polymorphic foreign key that can be associated with multiple types of records.

15. A computer system, comprising:

one or more processors; and memory coupled to the one or more processors, the memory storing one or more programs configured to be executed by the one or more processors, the one or more programs including instructions for:

storing tenant data for a tenant in a plurality of data spaces, wherein a data space in the plurality of data spaces includes two or more of: (i) a data preparation model that is configured to prepare data within the data space, (ii) a semantic data model that is configured to provide semantics underlying the data within the data space, (iii) one or more calculated insights that are configured to define and calculate multi-dimensional metrics, and (iv) one or more filters for filtering one or more data lake objects;

receiving, by the computer system, a request to generate a first workspace according to at least a subset of the tenant data stored in the plurality of data spaces; and in accordance with receiving the request, generating the first workspace, including:

determining a collection of components of the first workspace;

determining a respective data and/or metadata source for each component of the collection of components, the respective data and/or metadata source corresponding to a data space of the plurality of data spaces;

receiving, via the plurality of data spaces, data and/or metadata for each component of the collection of components;

storing the data and/or metadata of the first workspace to each component; and storing, in a multi-tenant junction table, many-to-many relationships between different data tables corresponding to the first workspace, the collection of components of the first workspace, and respective objects from the plurality of data spaces.

16. The computer system of claim 15, the one or more programs further comprising instructions for:

for a component of the collection of components:

storing, in the multi-tenant junction table, an indication of (i) whether the component is created in the first workspace or (ii) whether the component is used in the first workspace but created in a different workspace.

17. The computer system of claim 15, wherein the instructions for generating the first workspace include instructions for determining an access control policy that applies to a first user of the first workspace.

18. A non-transitory computer-readable storage medium storing one or more programs, the one or more programs comprising instructions that, when executed by a computer system that includes one or more processors and memory, cause the computer system to perform operations comprising:

storing tenant data for a tenant in a plurality of data spaces, wherein a data space in the plurality of data spaces includes two or more of: (i) a data preparation model that is configured to prepare data within the data space, (ii) a semantic data model that is configured to provide semantics underlying the data within the data space, (iii) one or more calculated insights that are configured to define and calculate multi-dimensional metrics, and (iv) one or more filters for filtering one or more data lake objects;

receiving, by the computer system, a request to generate a first workspace according to at least a subset of the tenant data stored in the plurality of data spaces; and in accordance with receiving the request, generating the first workspace, including:

determining a collection of components of the first workspace;

determining a respective data and/or metadata source for each component of the collection of components, the respective data and/or metadata source corresponding to a data space of the plurality of data spaces;

receiving, via the plurality of data spaces, data and/or metadata for each component of the collection of components;

storing the data and/or metadata of the first workspace to each component; and storing, in a multi-tenant junction table, many-to-many relationships between different data tables corresponding to the first workspace, the collection of components of the first workspace, and respective objects from the plurality of data spaces.

19. The non-transitory computer-readable storage medium of claim 18, wherein:

the multi-tenant junction table includes a plurality of data rows and a plurality of data columns;

each data row of the plurality of data rows corresponds to a respective component of a respective workspace; and the plurality of data columns includes a first data column that references a primary key of a workspace database table and a second data column that bridges between multiple database tables, the multiple database tables including a dashboard table, a visualization table, and a semantic model table.

20. The non-transitory computer-readable storage medium of claim 18, wherein;

the multi-tenant junction table includes a component usage type variable whose values are restricted to one of: a first value specifying that a respective component is created in the first workspace and a second value specifying that the respective component is created in another workspace but used in the first workspace; or the multi-tenant junction table includes a component type variable whose values are restricted to a set of predefined values, each of the predefined values specifying a component type of a respective component.

* * * * *